United States Patent
Parsons et al.

(10) Patent No.: US 11,436,598 B2
(45) Date of Patent: Sep. 6, 2022

(54) SOCIAL DATA TRACKING DATASTRUCTURES, APPARATUSES, METHODS AND SYSTEMS

(71) Applicant: FMR LLC, Boston, MA (US)

(72) Inventors: Christopher Parsons, Mansfield, MA (US); Michael Thibodeau, Bellingham, MA (US); Randal J. August, Nashua, NH (US); Kersing Huang, Chesthill, MA (US); Vladimir Tsitrin, Acton, MA (US); Matthew Ryan George, Scituate, MA (US)

(73) Assignee: FMR LLC, Boston, MA (US)

( * ) Notice: Subject to any disclaimer, the term of this patent is extended or adjusted under 35 U.S.C. 154(b) by 480 days.

(21) Appl. No.: 15/844,404

(22) Filed: Dec. 15, 2017

(65) Prior Publication Data
US 2019/0188701 A1  Jun. 20, 2019

(51) Int. Cl.
*G06Q 20/38* (2012.01)
*G06Q 20/06* (2012.01)
(Continued)

(52) U.S. Cl.
CPC ....... *G06Q 20/3829* (2013.01); *G06Q 20/065* (2013.01); *G06Q 20/3827* (2013.01);
(Continued)

(58) Field of Classification Search
None
See application file for complete search history.

(56) References Cited

U.S. PATENT DOCUMENTS 9,076,290 B2   7/2015 Griffin
9,082,113 B2   7/2015 Shea et al.
(Continued)

FOREIGN PATENT DOCUMENTS

CA    2870844 A1   5/2015
CA    2843034 A1   8/2015
(Continued)

OTHER PUBLICATIONS

Vitalik Buterin, "Vitalik Buterin: On Public and Private Blockchains", Aug. 7, 2015 (Year: 2015).*
Third party submission filed in related U.S. Appl. No. 14/799,242.

* cited by examiner

*Primary Examiner* — Jacob C. Coppola
*Assistant Examiner* — Timothy Paul Sax
(74) *Attorney, Agent, or Firm* — Hanchuk Kheit LLP.; Walter G. Hanchuk

(57) ABSTRACT

The Social Data Tracking Datastructures, Apparatuses, Methods and Systems ("SDTD") transforms brokerage order request, blockchain transaction request, agency action request inputs via SDTD components into brokerage order confirmation, transaction confirmation, agency action notification outputs. An order of a user for an order processing entity is obtained. A blockchain data node, which facilitates access to user-owned read data, associated with the order is determined. A blockchain identifier of the blockchain data node and a blockchain identifier of the order processing entity is provided to an access control node and the user-owned read data is obtained. The order is executed using the user-owned read data. A write access blockchain node, which grants the order processing entity permission from the user to create one or more blockchain data nodes, is determined. A new blockchain data node is created that facilitates access to the user-owned write data associated with the executed order.

19 Claims, 20 Drawing Sheets

SDTD USER DATA MODEL

(51) Int. Cl.
  *H04L 9/06* (2006.01)
  *H04L 9/32* (2006.01)
  *H04L 9/14* (2006.01)
  *H04L 9/30* (2006.01)
  *G06Q 40/04* (2012.01)

(52) U.S. Cl.
  CPC .......... *H04L 9/0637* (2013.01); *H04L 9/0643* (2013.01); *H04L 9/14* (2013.01); *H04L 9/30* (2013.01); *H04L 9/3239* (2013.01); *H04L 9/3247* (2013.01); *G06Q 20/3825* (2013.01); *G06Q 40/04* (2013.01); *G06Q 2220/00* (2013.01); *H04L 2209/38* (2013.01); *H04L 2209/56* (2013.01)

(56) References Cited

U.S. PATENT DOCUMENTS

| | | | |
|---|---|---|---|
| 9,087,326 | B2 | 7/2015 | Shea et al. |
| 9,098,190 | B2 | 8/2015 | Zhou |
| 9,098,387 | B1 | 8/2015 | Curtis et al. |
| 9,098,874 | B2 | 8/2015 | Chandra et al. |
| 9,117,341 | B2 | 8/2015 | Marantelli |
| 9,122,749 | B2 | 9/2015 | Elmore et al. |
| 9,129,338 | B2 | 9/2015 | Liu |
| 9,129,339 | B2 | 9/2015 | Liu |
| 9,135,616 | B2 | 9/2015 | Hirson et al. |
| 9,135,787 | B1 | 9/2015 | Russell |
| 9,144,742 | B1 | 9/2015 | Curtis et al. |
| 9,153,088 | B2 | 10/2015 | Spencer, II |
| 9,160,717 | B2 | 10/2015 | Bhanoo et al. |
| 10,833,843 | B1* | 11/2020 | Vijayvergia ............ H04L 9/30 |
| 10,990,693 | B1* | 4/2021 | Newman ................ G06Q 40/02 |
| 2002/0059263 | A1* | 5/2002 | Shima .................... G06F 16/10 |
| 2003/0191709 | A1 | 10/2003 | Elston |
| 2003/0233554 | A1* | 12/2003 | Litai .................... G06F 21/6209 713/182 |
| 2005/0165627 | A1* | 7/2005 | Fotsch .................. G16H 10/60 707/999.009 |
| 2007/0215695 | A1 | 9/2007 | Trane |
| 2009/0106125 | A1 | 4/2009 | Rock |
| 2013/0046794 | A1* | 2/2013 | De Magalhaes .... G06F 16/9027 707/797 |
| 2014/0074497 | A1 | 3/2014 | Griffin |
| 2015/0018084 | A1 | 1/2015 | Gatto |
| 2015/0195099 | A1 | 7/2015 | Imes |
| 2015/0205929 | A1 | 7/2015 | Brama |
| 2015/0206106 | A1 | 7/2015 | Yago |
| 2015/0206240 | A1 | 7/2015 | Baker |
| 2015/0213008 | A1 | 7/2015 | Orsini et al. |
| 2015/0213351 | A1 | 7/2015 | Wyatt |
| 2015/0213419 | A1 | 7/2015 | Lyons et al. |
| 2015/0213437 | A1 | 7/2015 | Wyatt |
| 2015/0220892 | A1 | 8/2015 | Allen |
| 2015/0220928 | A1 | 8/2015 | Allen |
| 2015/0227897 | A1 | 8/2015 | Loera |
| 2015/0227898 | A1 | 8/2015 | Ballout |
| 2015/0227913 | A1 | 8/2015 | Ballout |
| 2015/0245084 | A1 | 8/2015 | Downing et al. |
| 2015/0248672 | A1 | 9/2015 | Bayer |
| 2015/0254640 | A1 | 9/2015 | Cassano et al. |
| 2015/0254768 | A1 | 9/2015 | Menon et al. |
| 2015/0261269 | A1 | 9/2015 | Bruscoe |
| 2015/0262137 | A1 | 9/2015 | Armstrong |
| 2015/0262138 | A1 | 9/2015 | Hudon |
| 2015/0262139 | A1 | 9/2015 | Shtylman |
| 2015/0262140 | A1 | 9/2015 | Armstrong |
| 2015/0262141 | A1 | 9/2015 | Rebernik et al. |
| 2015/0262168 | A1 | 9/2015 | Armstrong |
| 2015/0262171 | A1 | 9/2015 | Langschaedel et al. |
| 2015/0262172 | A1 | 9/2015 | Rebernik |
| 2015/0262173 | A1 | 9/2015 | Durbin et al. |
| 2015/0262176 | A1 | 9/2015 | Langschaedel et al. |
| 2015/0262251 | A1 | 9/2015 | Knobel |
| 2015/0269538 | A1 | 9/2015 | Stanchfield |
| 2015/0269539 | A1 | 9/2015 | MacGregor et al. |
| 2015/0269541 | A1 | 9/2015 | MacGregor et al. |
| 2015/0269570 | A1 | 9/2015 | Phan |
| 2015/0271183 | A1 | 9/2015 | MacGregor et al. |
| 2015/0278820 | A1 | 10/2015 | Meadows |
| 2015/0286995 | A1 | 10/2015 | Korosec |
| 2015/0287026 | A1 | 10/2015 | Yang et al. |
| 2015/0294308 | A1 | 10/2015 | Pauker et al. |
| 2015/0294424 | A1 | 10/2015 | Hakim |
| 2015/0294425 | A1 | 10/2015 | Benson |
| 2015/0302357 | A1 | 10/2015 | Chandra |
| 2015/0302400 | A1 | 10/2015 | Metral |
| 2015/0302401 | A1 | 10/2015 | Metral |
| 2015/0302441 | A1 | 10/2015 | Katsuyama et al. |
| 2015/0302446 | A1 | 10/2015 | Park et al. |
| 2015/0332283 | A1* | 11/2015 | Witchey ................ H04W 12/02 705/3 |
| 2016/0019522 | A1 | 1/2016 | Granbery et al. |
| 2016/0210632 | A1 | 7/2016 | Li |
| 2017/0300627 | A1* | 10/2017 | Giordano ............ G06F 21/6245 |
| 2018/0018647 | A1* | 1/2018 | Fredman ............ G06Q 20/207 |
| 2018/0062835 | A1* | 3/2018 | Hamel .................. H04L 9/0891 |
| 2018/0157825 | A1* | 6/2018 | Eksten .................... G06F 21/51 |
| 2019/0028277 | A1* | 1/2019 | Jayachandran ......... H04L 9/085 |

FOREIGN PATENT DOCUMENTS

| | | |
|---|---|---|
| CA | 2845648 A1 | 9/2015 |
| EP | 2820797 A1 | 1/2015 |
| EP | 2831823 A1 | 2/2015 |
| EP | 2874112 A1 | 5/2015 |
| EP | 2896001 A1 | 7/2015 |
| WO | 2008065345 A1 | 6/2008 |
| WO | 2012142521 A2 | 10/2012 |
| WO | 2013078990 A1 | 6/2013 |
| WO | 2014201059 A1 | 12/2014 |
| WO | 2015004820 A1 | 1/2015 |
| WO | 2015016356 A1 | 2/2015 |
| WO | 2015024129 A1 | 2/2015 |
| WO | 2015051692 A1 | 4/2015 |
| WO | 2015058282 A1 | 4/2015 |
| WO | 2015059669 A1 | 4/2015 |
| WO | 2015077378 A1 | 5/2015 |
| WO | 2015085393 A1 | 6/2015 |
| WO | 2015095761 A1 | 6/2015 |
| WO | 2015106285 A1 | 7/2015 |
| WO | 2015113519 A1 | 8/2015 |
| WO | 2015116998 A2 | 8/2015 |
| WO | 2015120606 A1 | 8/2015 |
| WO | 2015134890 A1 | 9/2015 |
| WO | 2015135018 A1 | 9/2015 |
| WO | 2015142765 A1 | 9/2015 |
| WO | 2015143068 A1 | 9/2015 |
| WO | 2015144971 A1 | 10/2015 |
| WO | 2015148725 A2 | 10/2015 |
| WO | 2016025990 | 2/2016 |

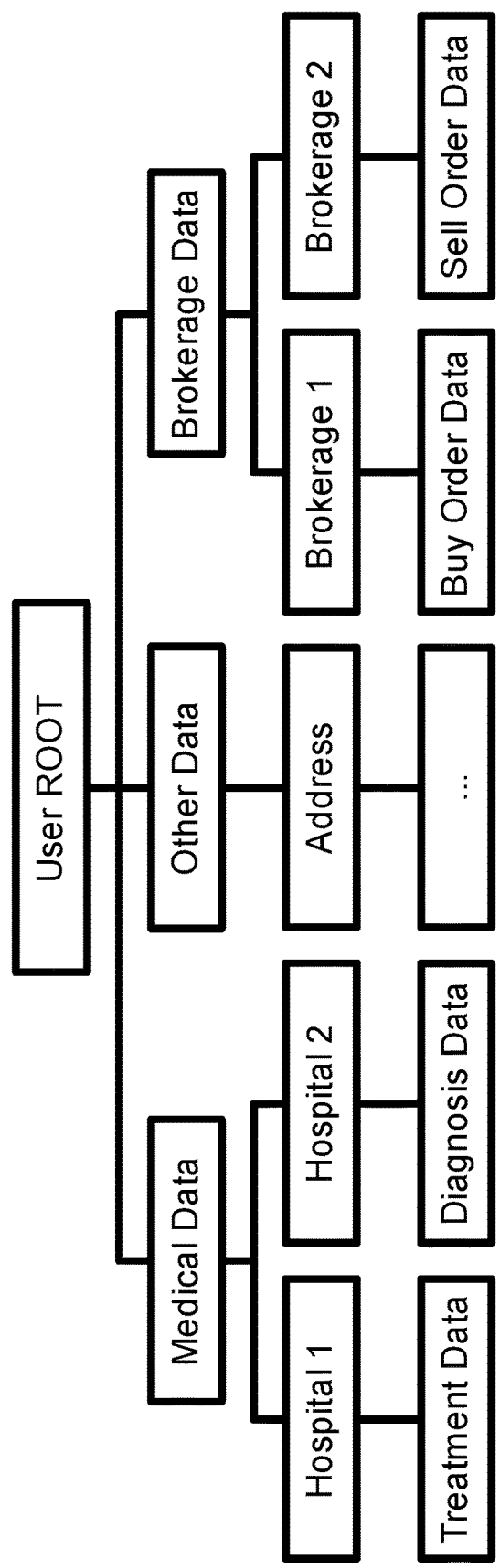
FIGURE 1: SDTD USER DATA MODEL

FIGURE 2A: SDTD TRANSACTIONS
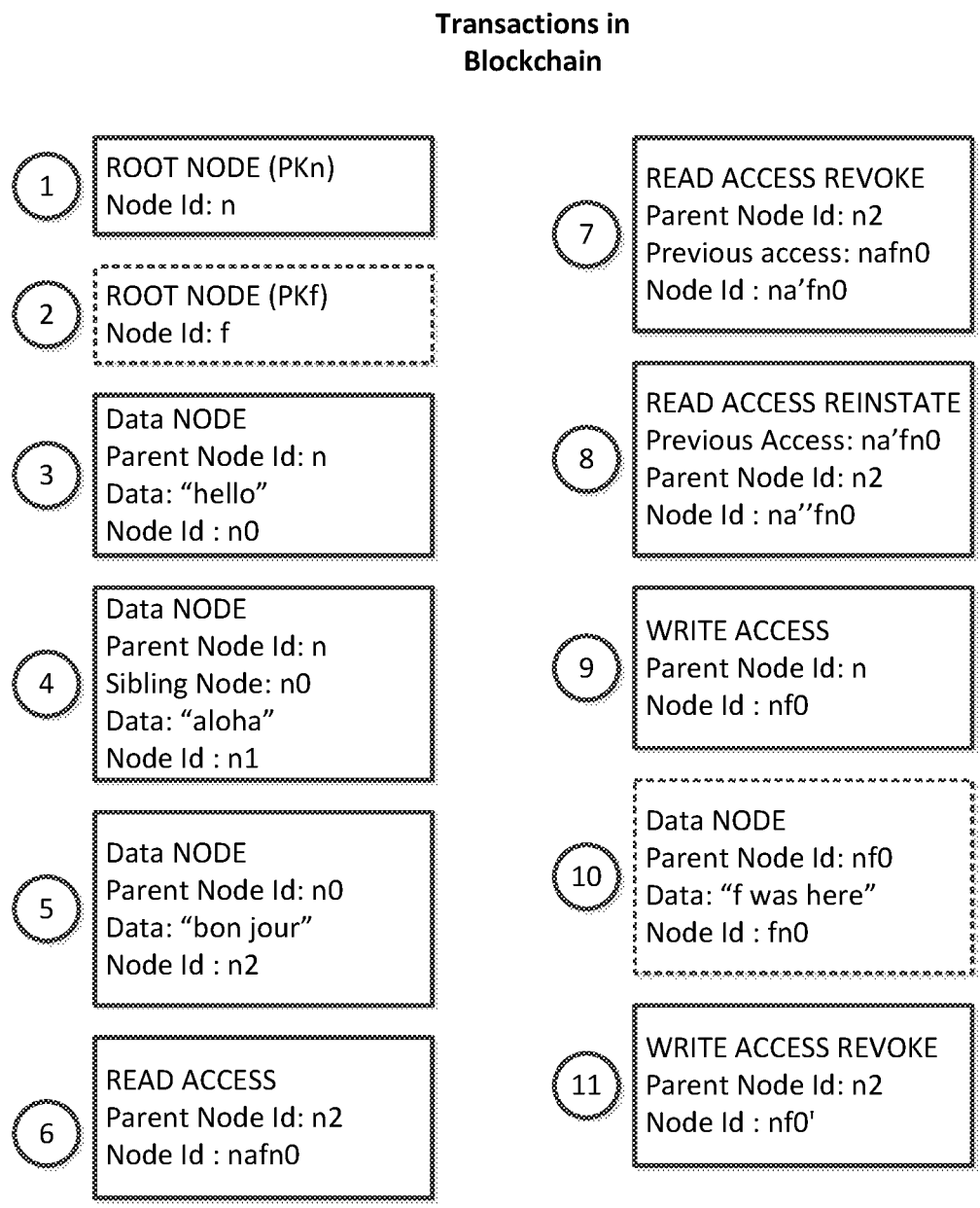

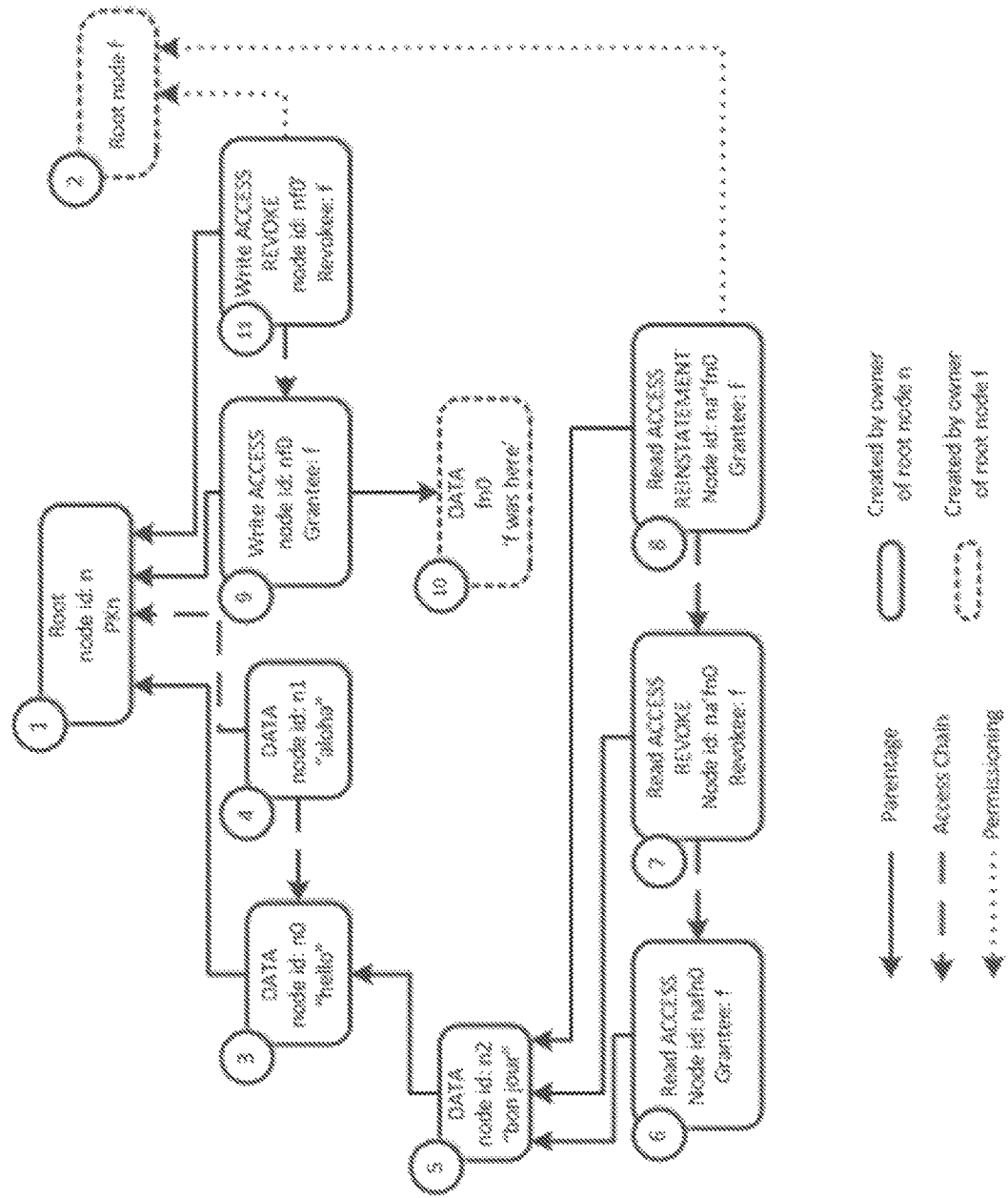
FIGURE 2B: SDTD TREE STATE

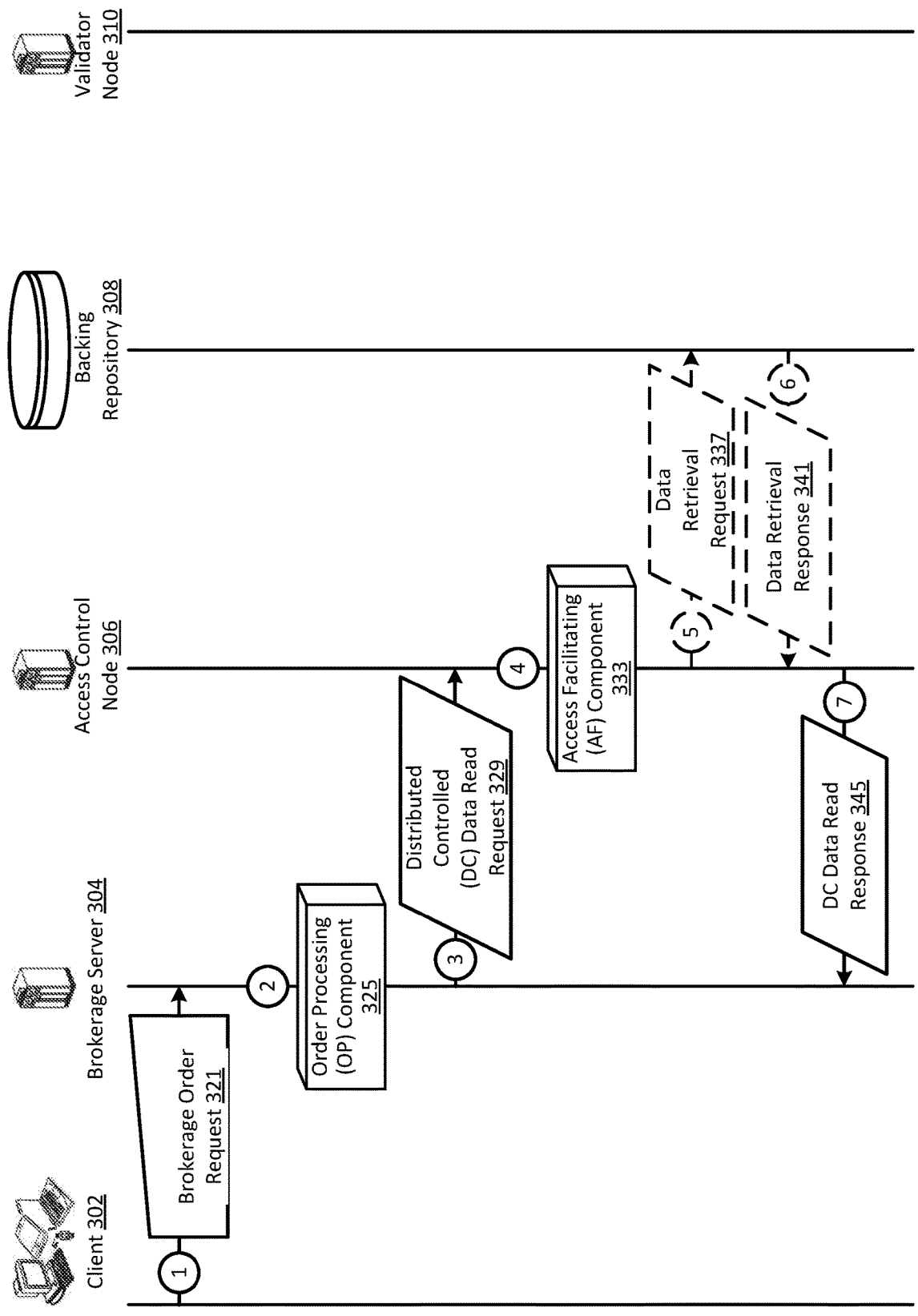
FIGURE 3A: SDTD DATA FLOW

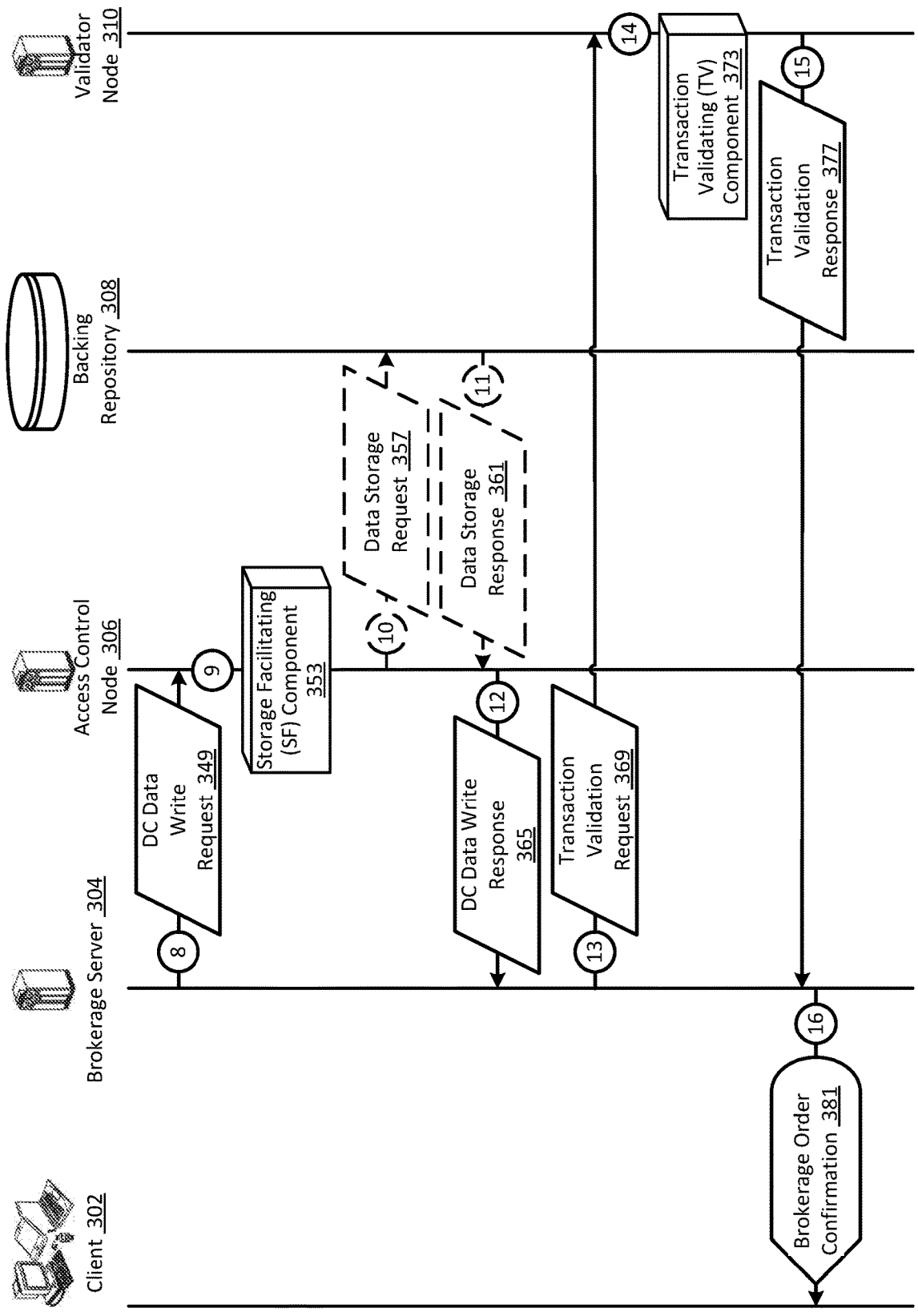
FIGURE 3B: SDTD DATA FLOW

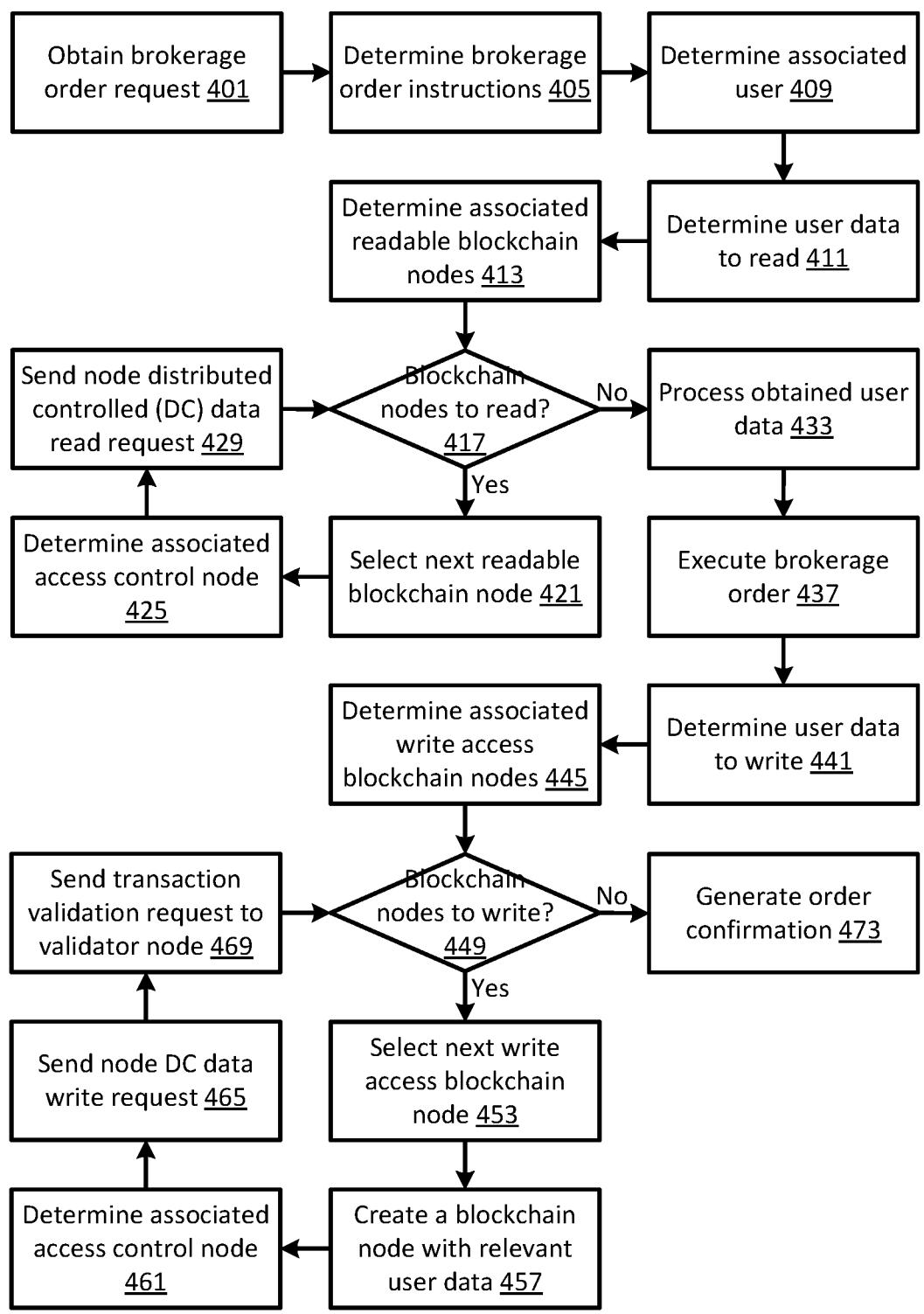
FIGURE 4: SDTD OP COMPONENT

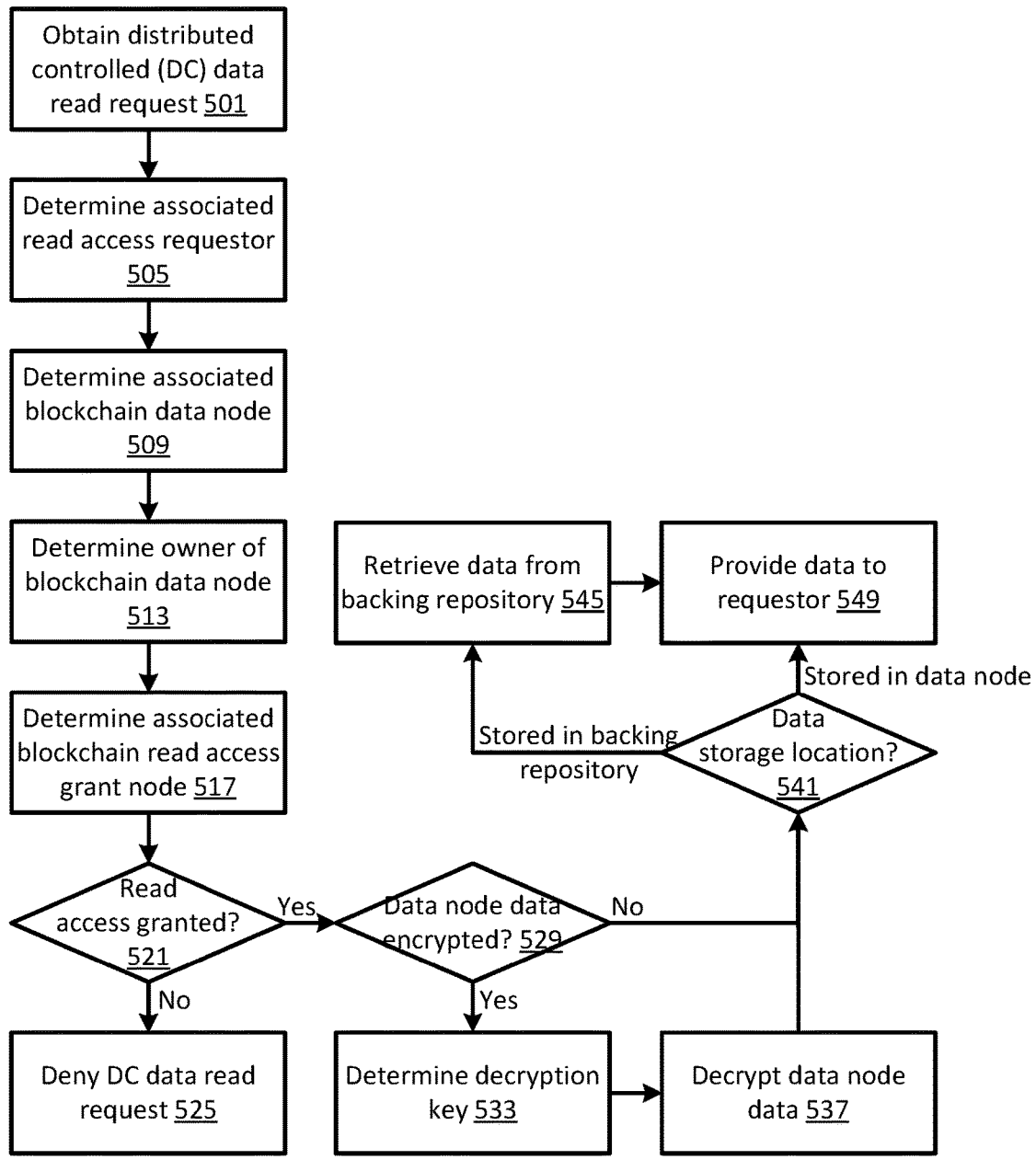
FIGURE 5: SDTD AF COMPONENT

FIGURE 6: SDTD SF COMPONENT
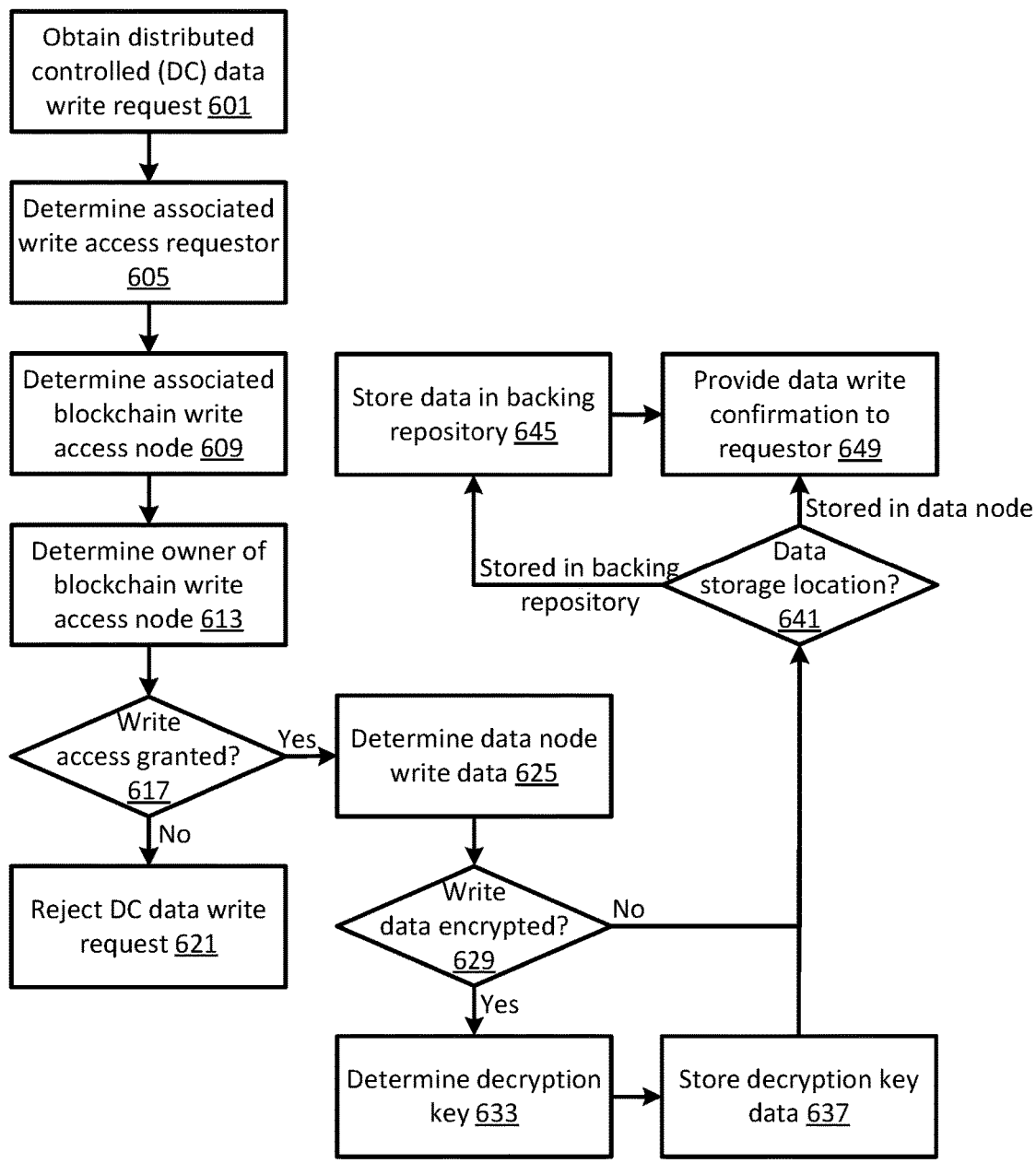

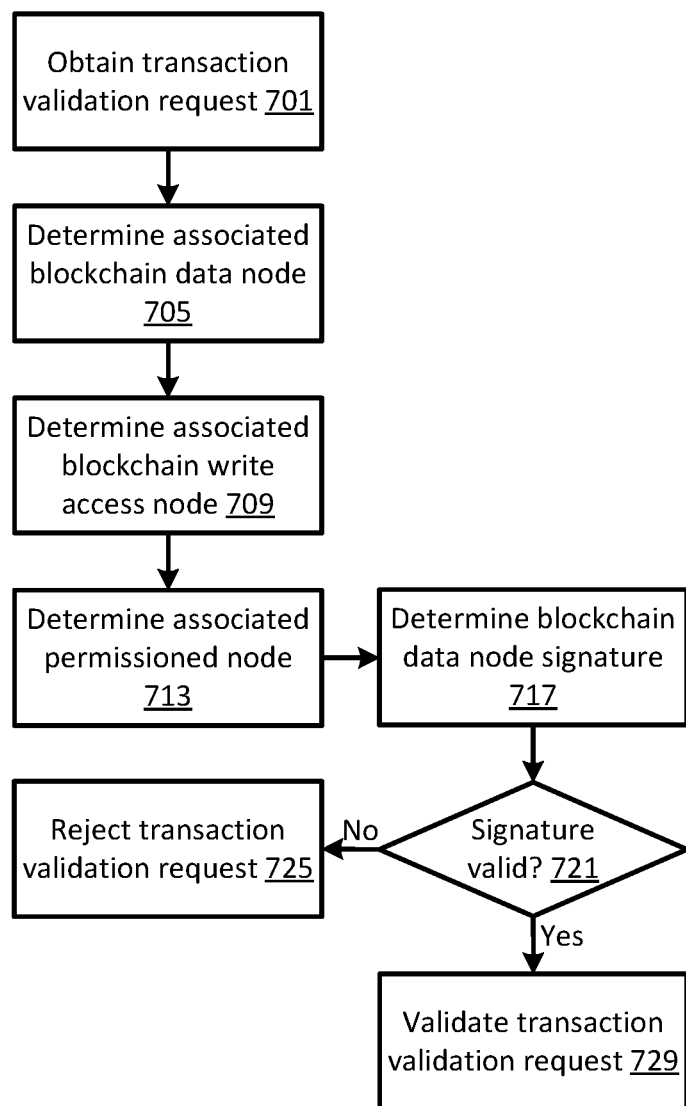
FIGURE 7: SDTD TV COMPONENT

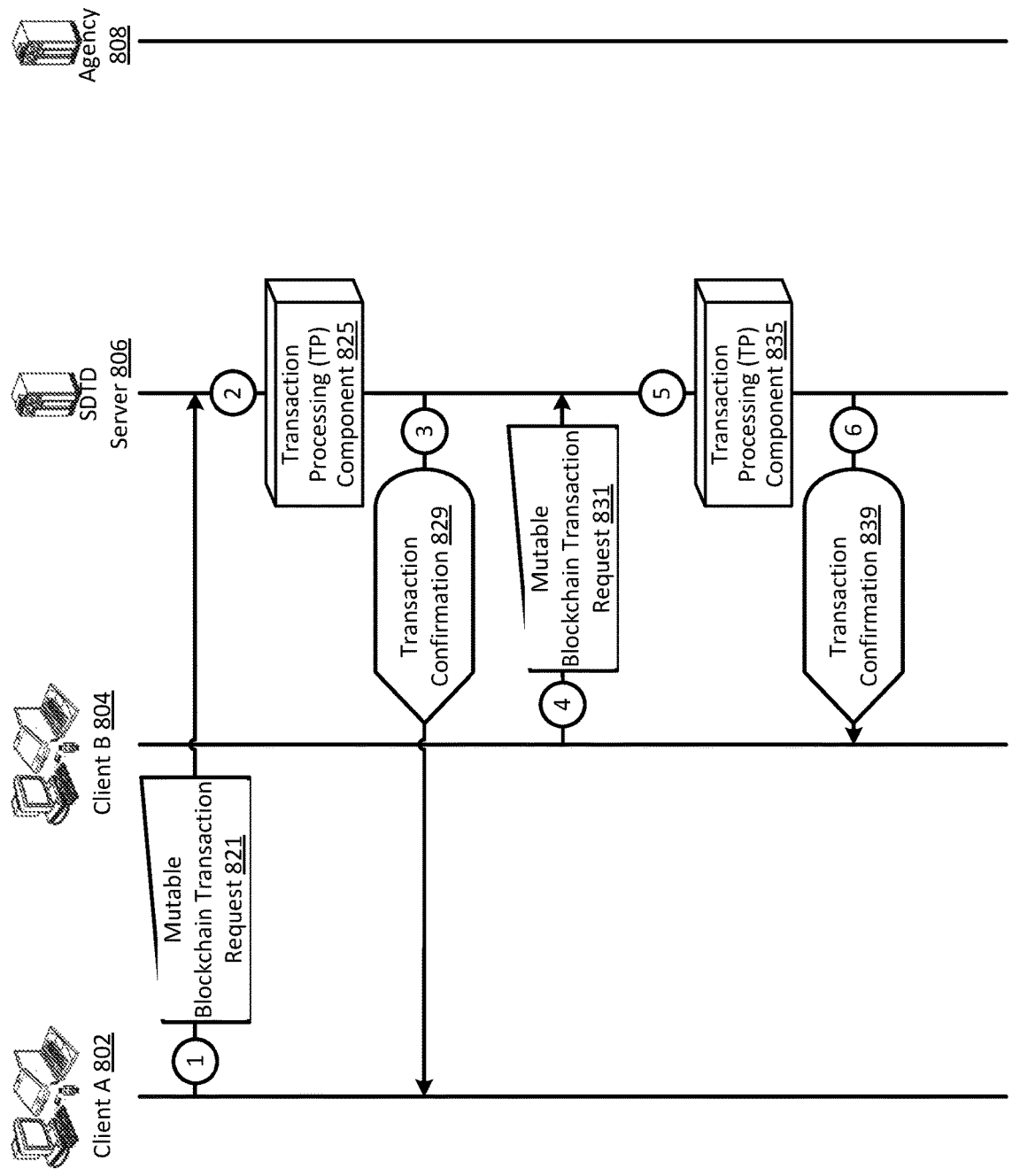
FIGURE 8A: SDTD DATA FLOW

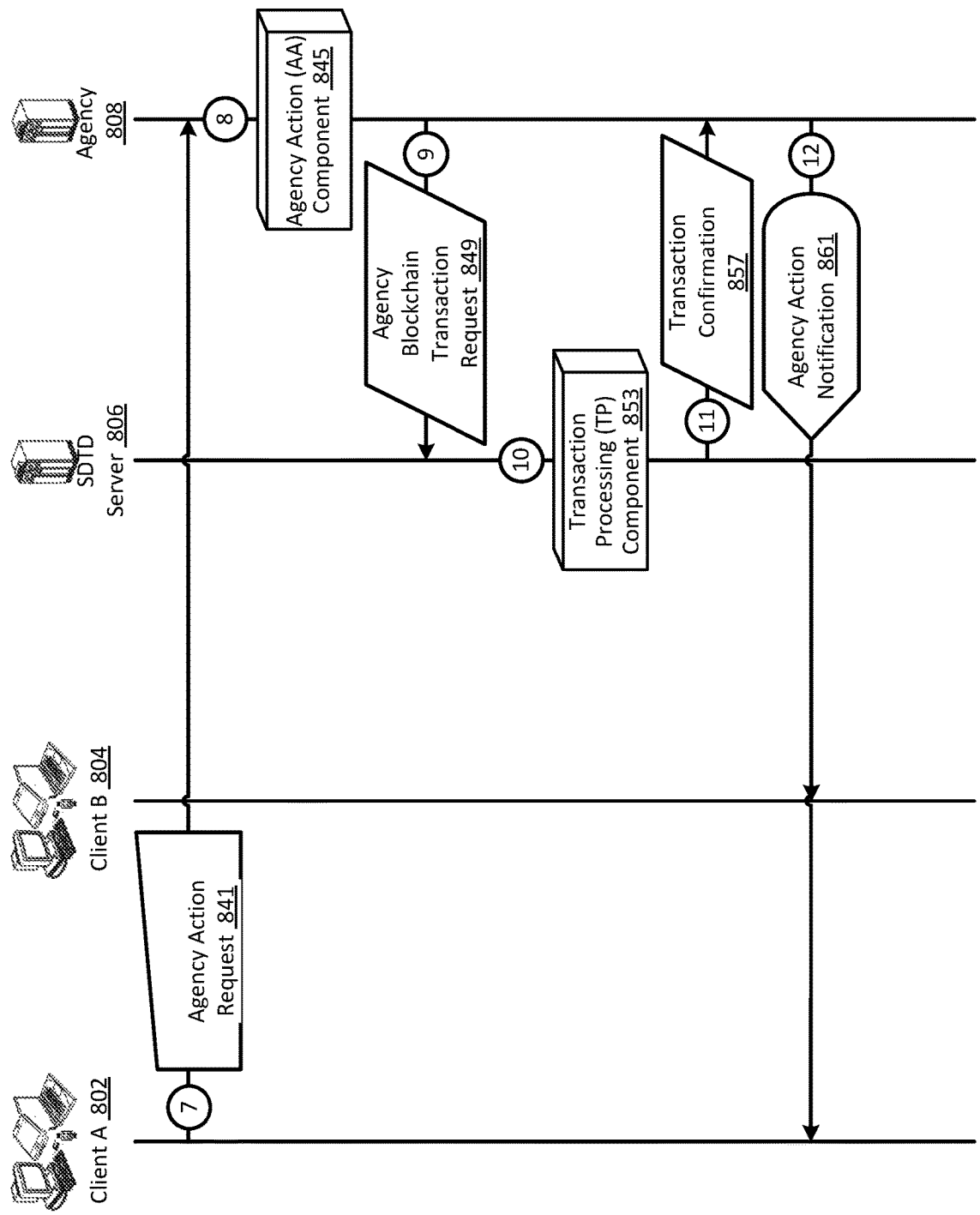
FIGURE 8B: SDTD DATA FLOW

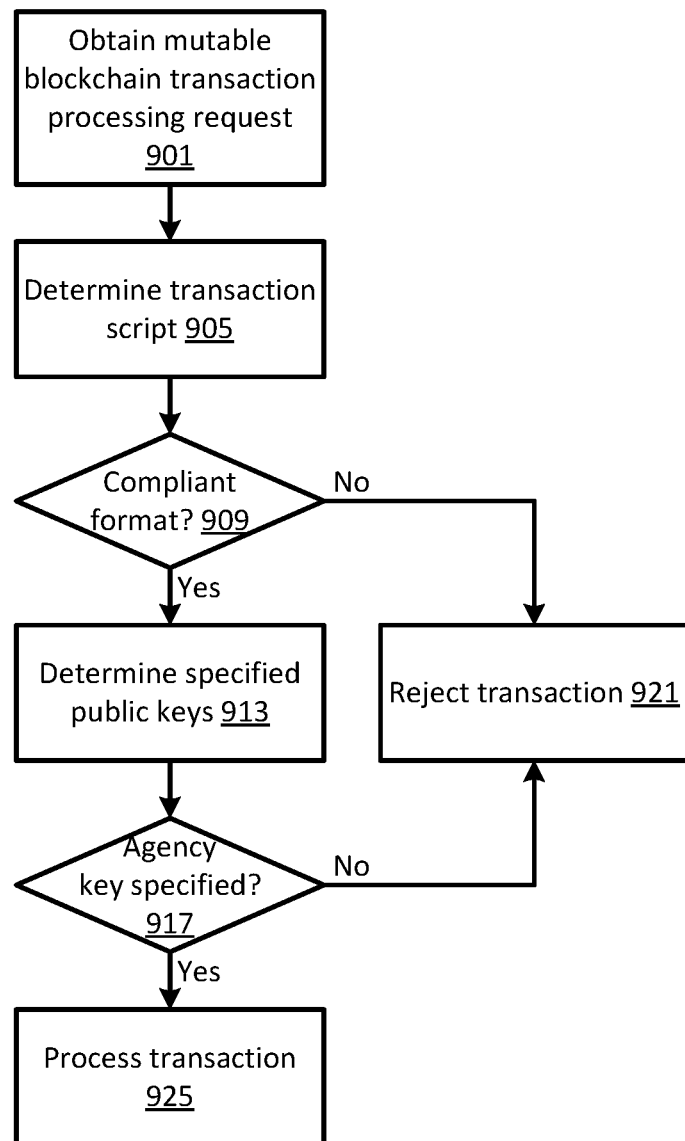
FIGURE 9: SDTD TP COMPONENT

FIGURE 10: SDTD AA COMPONENT
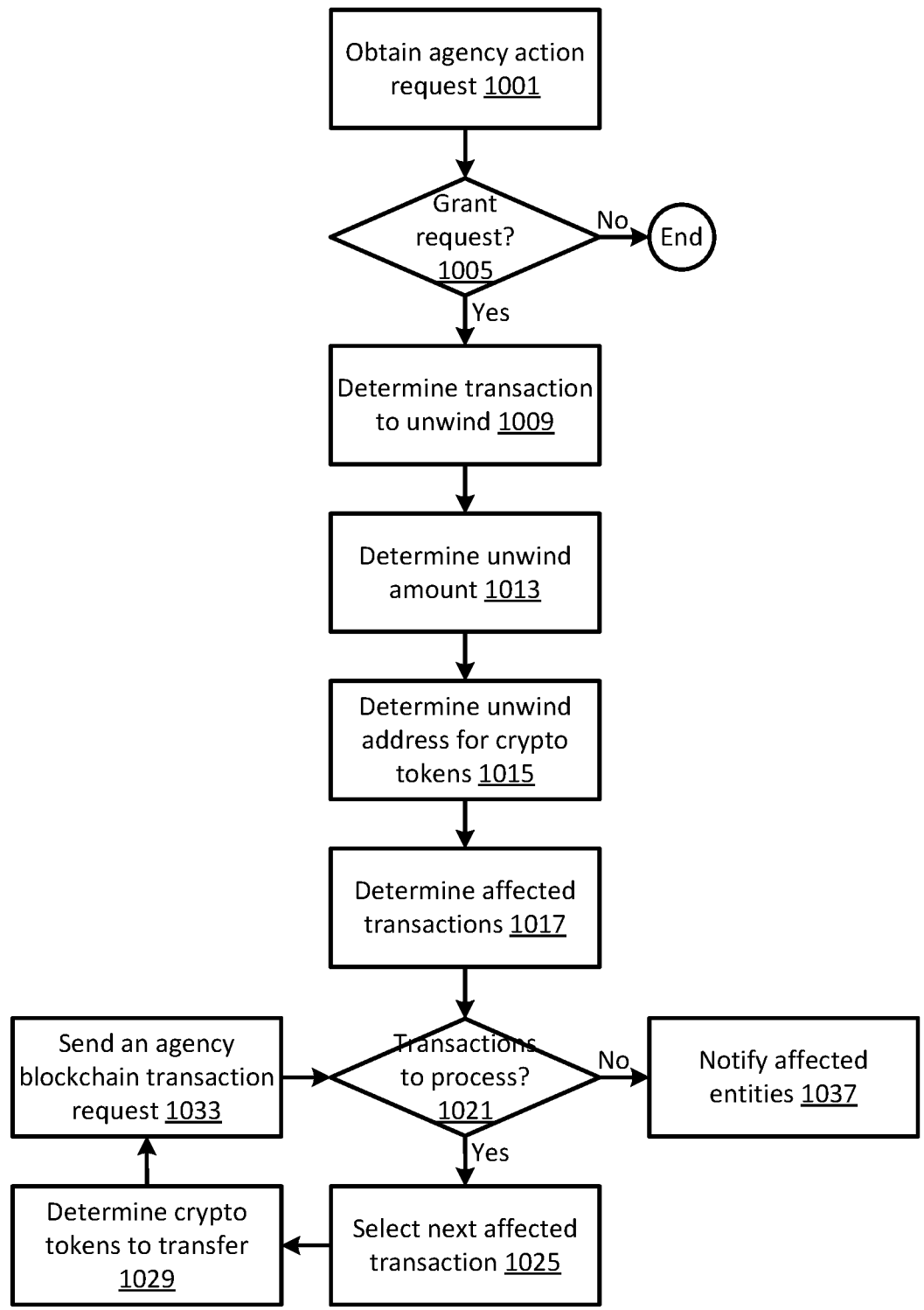

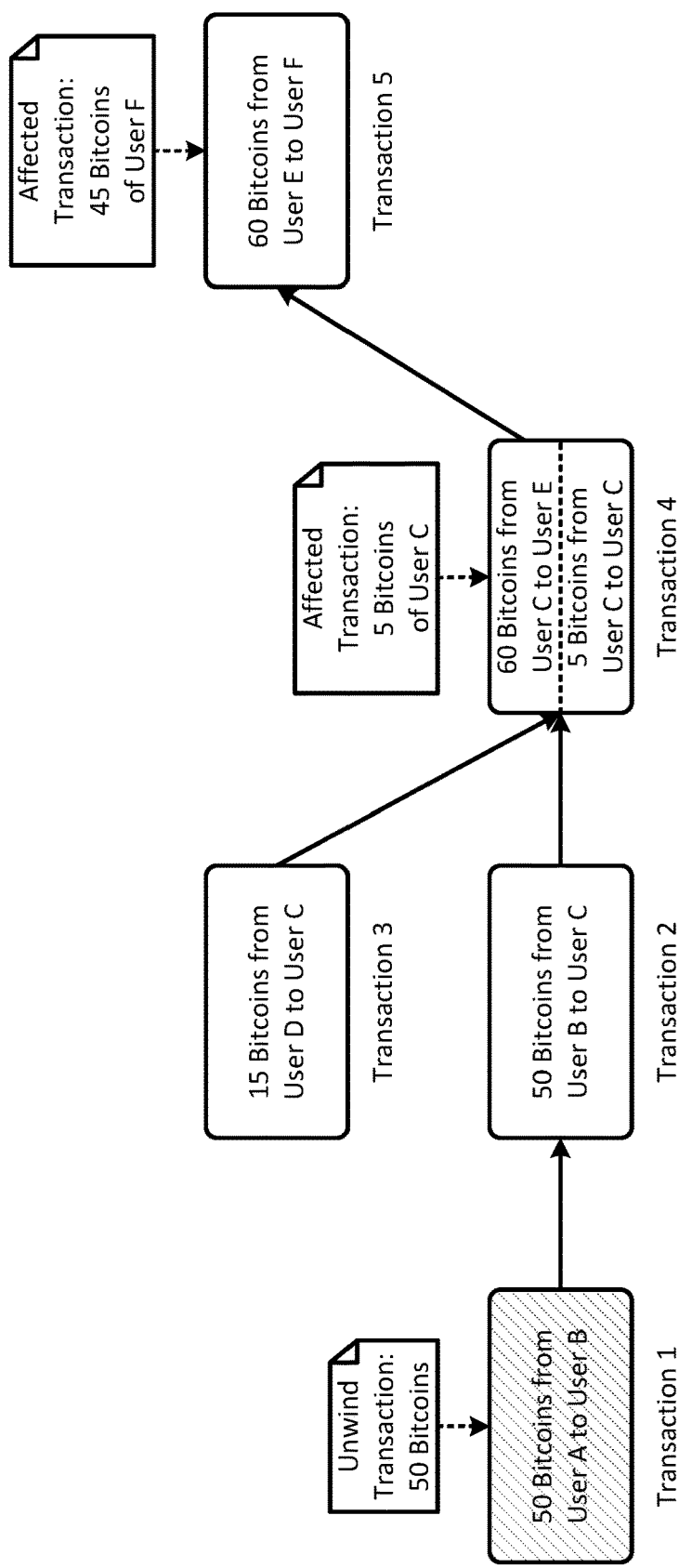
FIGURE 11: SDTD USE CASE

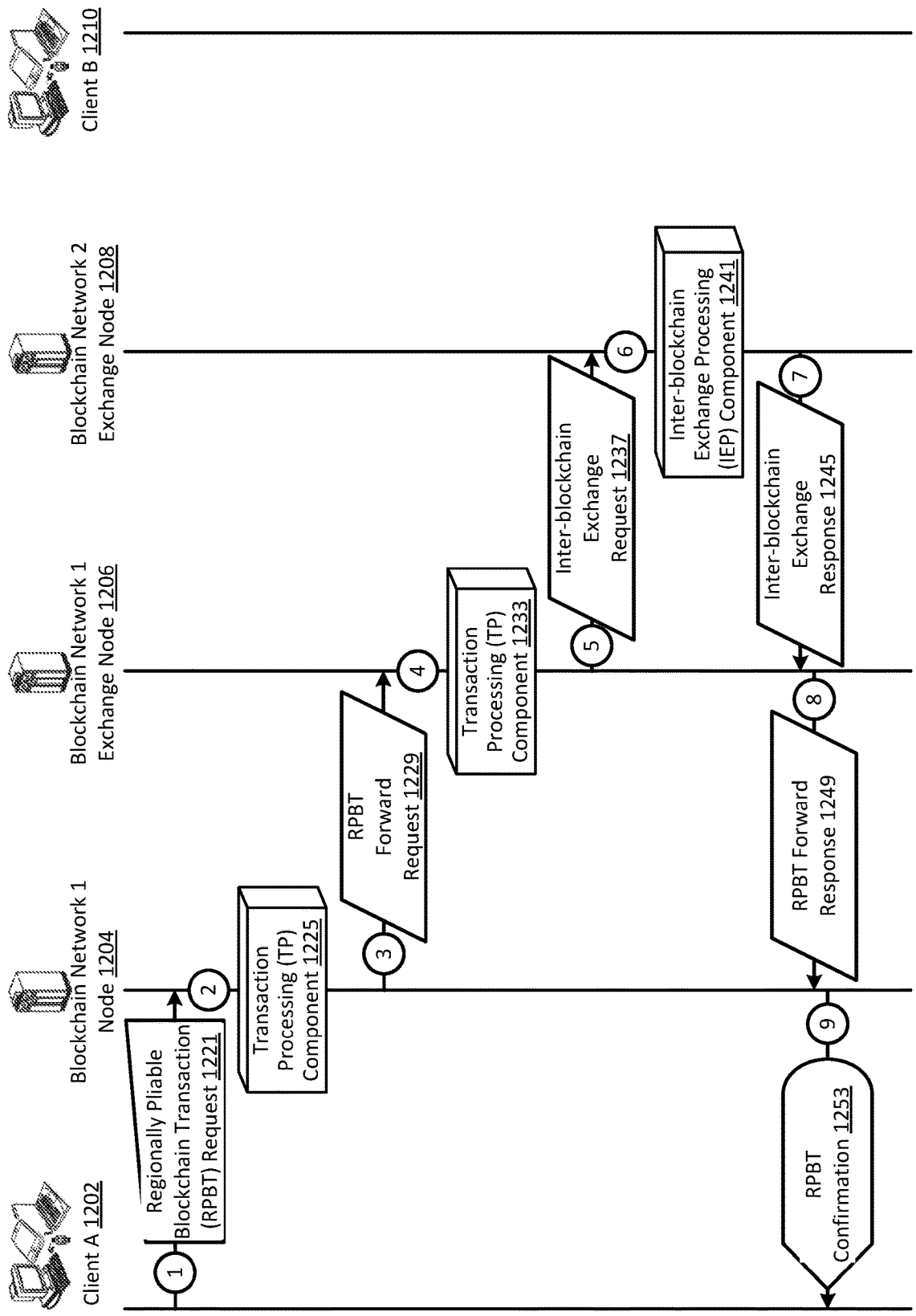
FIGURE 12A: SDTD DATA FLOW

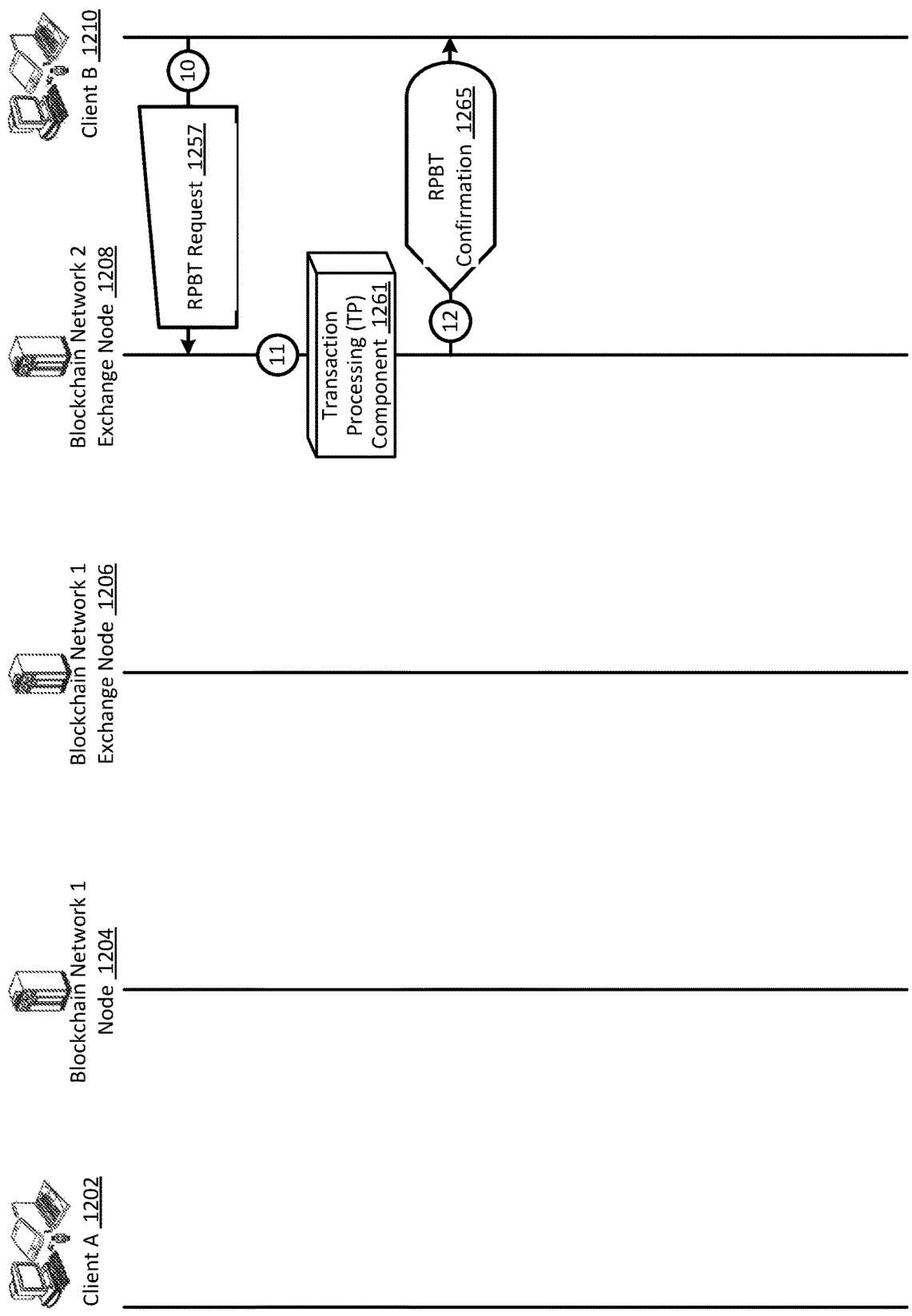
FIGURE 12B: SDTD DATA FLOW

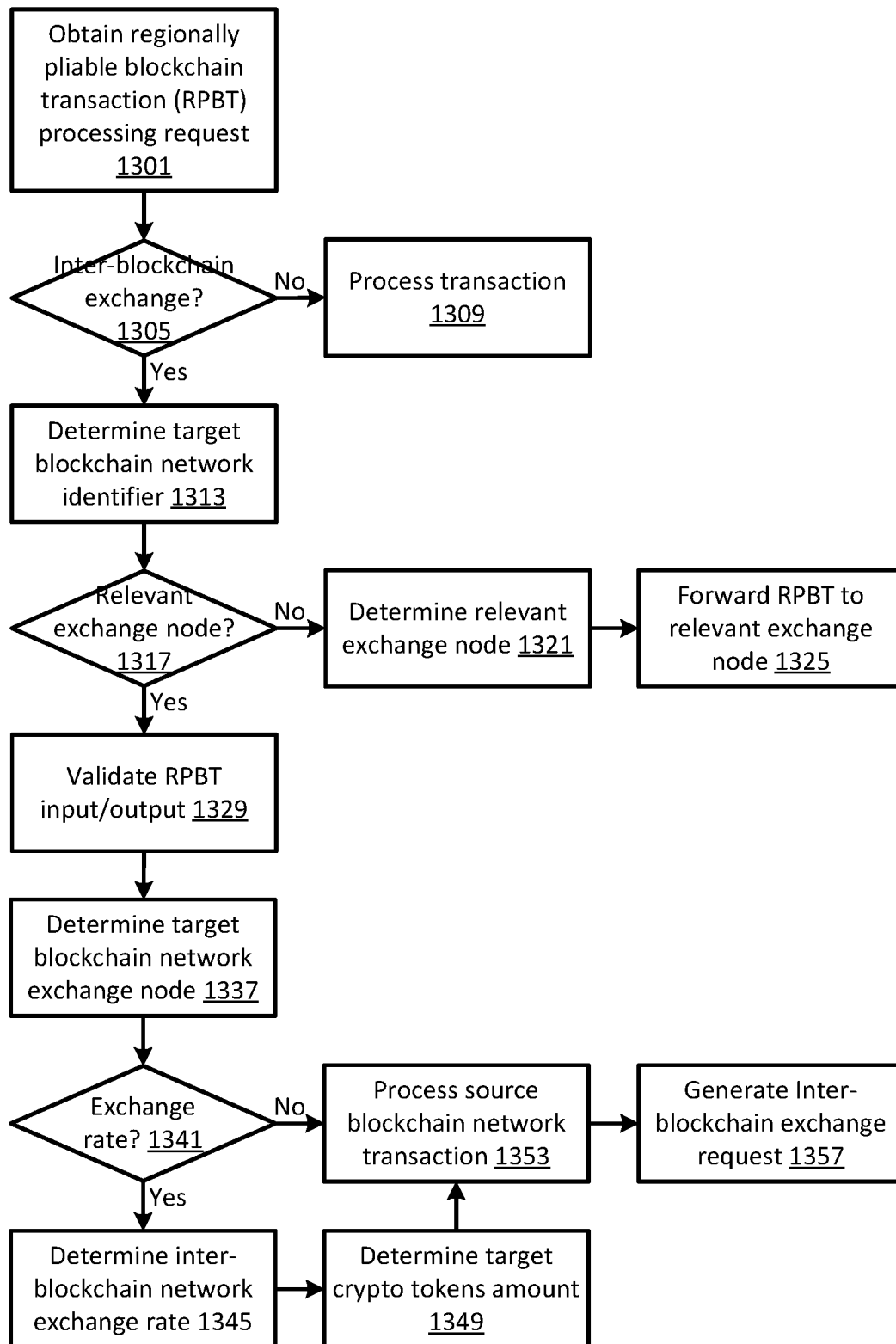
FIGURE 13: SDTD TP COMPONENT

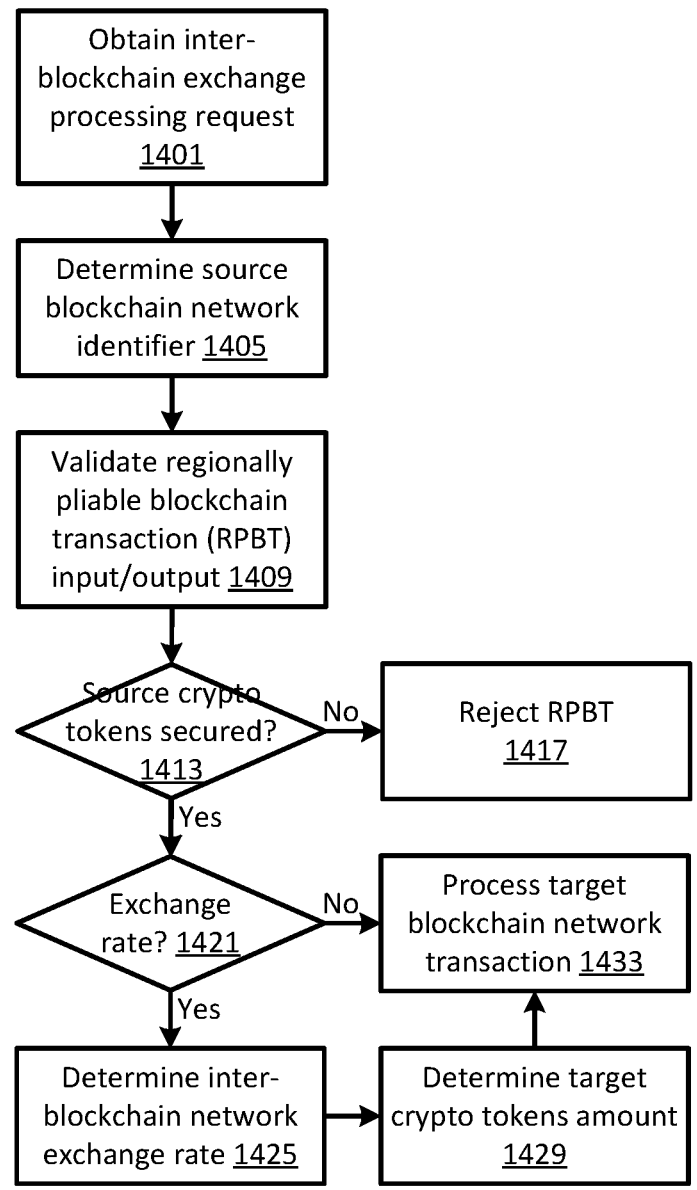
FIGURE 14: SDTD ETP COMPONENT

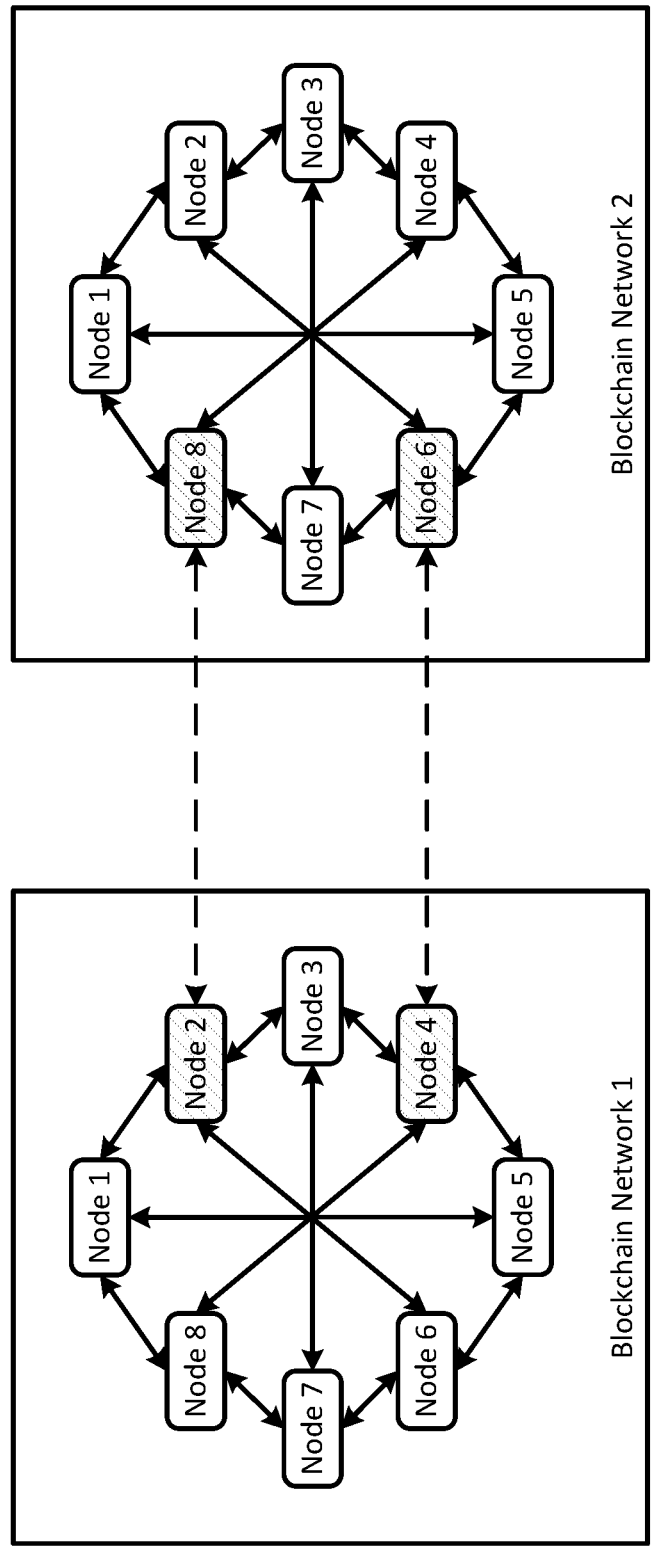
FIGURE 15: SDTD BLOCKCHAIN EXCHANGE MODEL

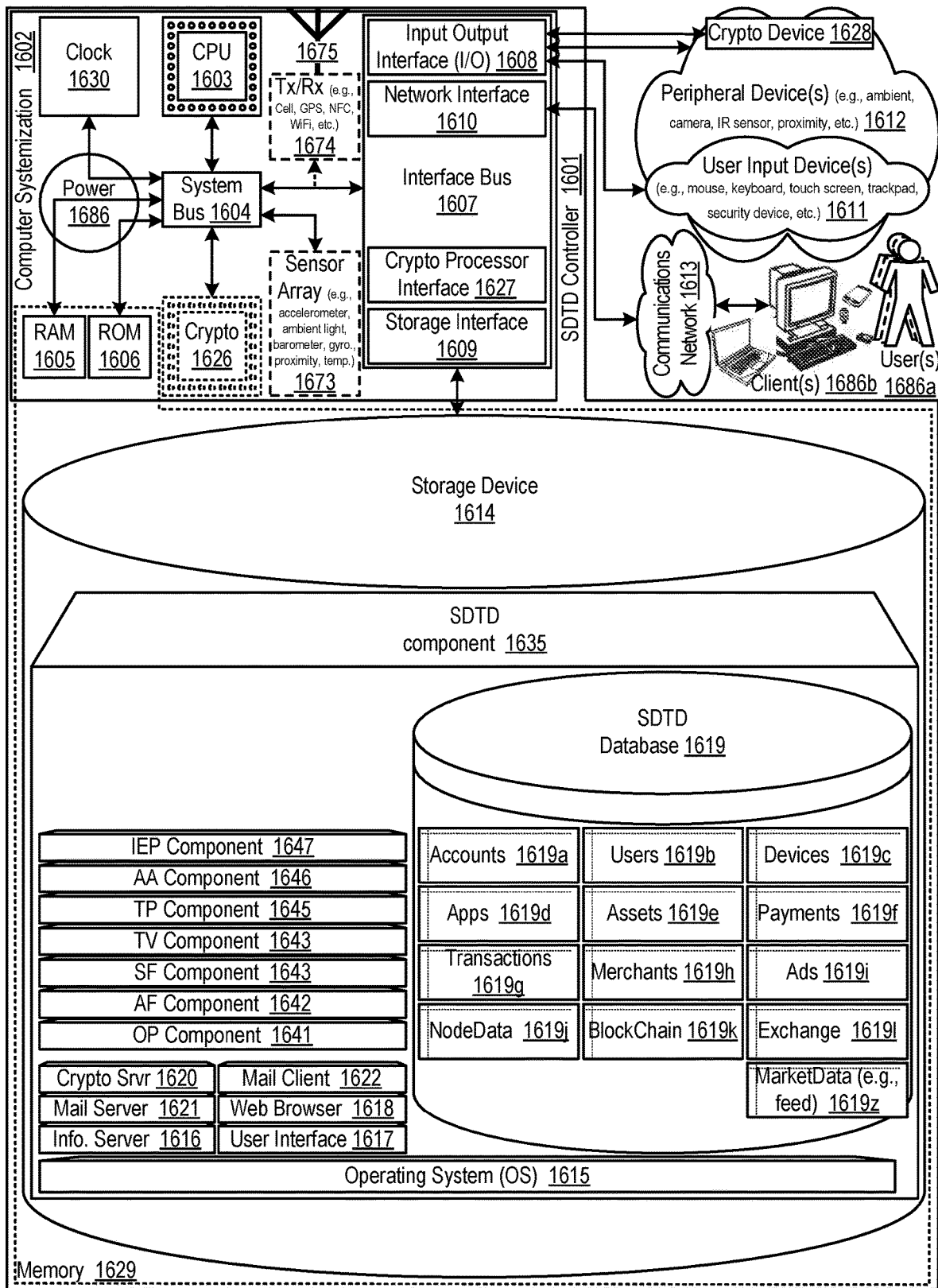
FIGURE 16: SDTD Controller

SOCIAL DATA TRACKING DATASTRUCTURES, APPARATUSES, METHODS AND SYSTEMS

This application for letters patent disclosure document describes inventive aspects that include various novel innovations (hereinafter "disclosure") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

FIELD

The present innovations generally address information technology, and more particularly, include Social Data Tracking Datastructures, Apparatuses, Methods and Systems.

However, in order to develop a reader's understanding of the innovations, disclosures have been compiled into a single description to illustrate and clarify how aspects of these innovations operate independently, interoperate as between individual innovations, and/or cooperate collectively. The application goes on to further describe the interrelations and synergies as between the various innovations; all of which is to further compliance with 35 U.S.C. § 112.

BACKGROUND

Bitcoin is an open source software application and a shared protocol. It allows users to anonymously and instantaneously transact Bitcoin, a digital currency, without needing to trust counterparties or separate intermediaries. Bitcoin achieves this trustless anonymous network using public/private key pairs, a popular encryption technique, cryptographic hash functions and digital signatures.

BRIEF DESCRIPTION OF THE DRAWINGS

Appendices and/or drawings illustrating various, non-limiting, example, innovative aspects of the Social Data Tracking Datastructures, Apparatuses, Methods and Systems (hereinafter "SDTD") disclosure, include:

FIG. 1 shows an exemplary embodiment of a user data model for the SDTD;

FIGS. 2A-2B show exemplary embodiments of transactions and tree state for the SDTD;

FIGS. 3A-3B show a datagraph diagram illustrating embodiments of a data flow for the SDTD;

FIG. 4 shows a logic flow diagram illustrating embodiments of an order processing (OP) component for the SDTD;

FIG. 5 shows a logic flow diagram illustrating embodiments of an access facilitating (AF) component for the SDTD;

FIG. 6 shows a logic flow diagram illustrating embodiments of a storage facilitating (SF) component for the SDTD;

FIG. 7 shows a logic flow diagram illustrating embodiments of a transaction validating (TV) component for the SDTD;

FIGS. 8A-8B show a datagraph diagram illustrating embodiments of a data flow for the SDTD;

FIG. 9 shows a logic flow diagram illustrating embodiments of a transaction processing (TP) component for the SDTD;

FIG. 10 shows a logic flow diagram illustrating embodiments of an agency action (AA) component for the SDTD;

FIG. 11 shows an exemplary use case for the SDTD;

FIGS. 12A-12B show a datagraph diagram illustrating embodiments of a data flow for the SDTD;

FIG. 13 shows a logic flow diagram illustrating embodiments of a transaction processing (TP) component for the SDTD;

FIG. 14 shows a logic flow diagram illustrating embodiments of an inter-blockchain exchange processing (IEP) component for the SDTD;

FIG. 15 shows an exemplary blockchain exchange model for the SDTD;

FIG. 16 shows a block diagram illustrating embodiments of a SDTD controller.

Generally, the leading number of each citation number within the drawings indicates the figure in which that citation number is introduced and/or detailed. As such, a detailed discussion of citation number 101 would be found and/or introduced in FIG. 1. Citation number 201 is introduced in FIG. 2, etc. Any citation and/or reference numbers are not necessarily sequences but rather just example orders that may be rearranged and other orders are contemplated.

DETAILED DESCRIPTION

The Social Data Tracking Datastructures, Apparatuses, Methods and Systems (hereinafter "SDTD") transforms brokerage order request, blockchain transaction request, agency action request inputs, via SDTD components (e.g., OP, AF, SF, TV, TP, AA, IEP, etc. components), into brokerage order confirmation, transaction confirmation, agency action notification outputs. The SDTD components, in various embodiments, implement advantageous features asset forth below.

Introduction

In one embodiment, the SDTD facilitates utilizing user-owned data in a variety of settings while allowing the user to retain access control over the data. In another embodiment, the SDTD provides an agency oversight configured blockchain that allows an agency to unwind blockchain transactions. In another embodiment, the SDTD facilitates inter-blockchain network transactions. For example, a user, who lives on the west coast of the US and utilizes a regional agency oversight configured blockchain network serving the west coast, may utilize the user's user-owned data to make a stock purchase from another user, who lives on the east coast of the US and utilizes a regional agency oversight configured blockchain network serving the east coast, via an inter-blockchain network transaction that transfers the user's crypto tokens (e.g., 50 Bitcoins) to the other user (e.g., in exchange for the purchased stock).

SDTD

FIG. 1 shows an exemplary embodiment of a user data model for the SDTD. In FIG. 1, a tree of user-owned data (e.g., the user retains access control over the data) is illustrated. The data belongs to the user associated with the User ROOT node. The data may include a variety of categories (e.g., medical data, other data, brokerage data) and/or subcategories (e.g., data associated with hospital 1, data associated with hospital 2, data associated with brokerage firm 1, data associated with brokerage firm 2), and/or data (e.g., treatment data, diagnosis data, the user's address, buy order data, sell order data). The user may read data from and/or write data to the tree. The user may also grant others (e.g., institutions such as hospitals and brokerage firms) rights to read data from and/or write data to the tree. For example, the user may grant a hospital the right to write treatment data, diagnostic data, and/or the like to the tree, and the user may grant medical providers (e.g., other hospitals, medical practitioners) the right to read such data (e.g., to give read access to any data nodes specified by the user). In another example, the user may grant a brokerage firm the right to write buy order data to the tree, and the user may grant another brokerage firm the right to read such data from the tree and utilize it to execute a sell order, and/or to write sell order data to the tree. In one implementation, the tree may be implemented using a set of interrelated blockchain nodes that facilitate access control of the user-owned data.

FIGS. 2A-2B show exemplary embodiments of blockchain transactions and corresponding tree state for the SDTD. In FIG. 2A, a set of transactions in a blockchain are shown to illustrate various exemplary embodiments of operations that may be performed via the SDTD.

Root Node Creation

User 1 (e.g., the owner of data associated with root node n) creates an ECDSA private key/public key pair ($pK_n$, $PK_n$). User 1 creates a root node transaction thus announcing a public key ($PK_n$) on the blockchain that can be used to validate further transactions. In some alternative implementations, an encoded public key may be utilized as an address instead of the raw public key. The transaction has the following structure:

Root Node Transaction
Transaction type: ROOT
Public Key/address: $PK_n$
Message: "ROOT"
Signature: SIG=>$pK_n$(HASH(tx_type, "ROOT"))
Txid: HASH(signature)→Node Id: n User 1 may create a signature using the private key $pK_n$ associated with $PK_n$. The signature may be created using a HASH (e.g., SHA-256) of 1) the transaction type (tx_type) and 2) Message field included in the transaction (e.g., "ROOT"). The transaction id (Txid) is a hash of the signature and may be considered the node id and referred to as n. In some alternative implementations, the transaction (Txid) is a hash of the transaction (e.g., including the signature).

User 2 (e.g., a brokerage firm) creates a root node transaction on the blockchain. The transaction is based on a different private key/public key pair ($pK_f$, $PK_f$) created by User 2. User 2's public key is referred to as $PK_f$. The transaction id of the root node transaction may be considered the node id and referred to as f. The transaction has the following structure:

Root Node Transaction
Transaction type: ROOT
Public Key/address: $PK_f$
Message: "ROOT"
Signature: SIG=>$pK_f$(HASH(tx_type,"ROOT"))
Txid: HASH(signature)→Node Id: f These transactions are inserted (e.g., grouped into blocks) on the blockchain. A validator of these root node transactions can validate the signature of a transaction using the public key that is associated with the private key that was used to create the signature for the transaction.

Data Node Creation

User 1 may create a data node, using a data node transaction with the following structure:

Data Node Transaction
Transaction type: Data
Parent node: n
Data: [data blob]
Signature: SIG=>$pK_n$(HASH(tx_type, data, n))
Txid: HASH(signature)→Node Id: $n_0$ User 1 may store a data blob in this node (e.g., encrypted or unencrypted). User 1 may create a signature using the private key $pK_n$ associated with $PK_n$ using as input the hash of: 1) the transaction type (tx_type), 2) the data blob, and 3) the parent node id. The transaction id of this node is a hash of the signature and the node may be referred to by node id: $n_0$.

A validator of this transaction can see that the parent node refers to a root node n. The validator can validate the signature was created using the private key $pK_n$ associated with public key $PK_n$ which is associated with node n. In this way, the validator can validate that the owner (e.g., creator) of the data was n. The validator can validate that this is the first child node of node n because it identifies no sibling node; this is enforced in the signature. In one implementation, once this child node is created, the n node is "spent"; subsequent child nodes of n should refer to this $n_0$ node.

Sibling Data Node Creation

User 1 may create additional children nodes, using a data node transaction which has the following structure:

Data Node Transaction
Transaction type: Data
Parent node: n
Sibling node: $n_0$
Data: [data blob]
Signature: SIG=>$pK_n$(HASH(tx_type, data, n, $n_0$))
Txid: HASH(signature)→Node Id: $n_1$ User 1 may store a data blob in this node (e.g., encrypted or unencrypted). User 1 may create a signature using the private key $pK_n$ associated with $PK_n$ using as an input the HASH of: 1) the transaction type, 2) the data blob, 3) the parent node id, and 4) the previous sibling node. The transaction id of this node is a hash of the signature and the node may be referred to by node id: $n_0$.

A validator of this transaction can see the parent node refers to a root node n. The validator can validate the signature was created using the private key $pK_n$ associated with public key $PK_n$ which is associated with node n. In this way the validator can validate that the creator of the data was n. The validator can validate that this an additional child node of node n because it identifies the previous sibling node, $n_0$; this is enforced in the signature. In one implementation, once this sibling node is created, the $n_0$ node is "spent"; subsequent child nodes of n should refer to this $n_1$ node.

Child Data Node Creation

User 1 may create a data node that uses another data node as a parent using a similar data node transaction with a different parent node id. The transaction has the following structure:

Data Node Transaction
Transaction type: Data
Parent node: $n_0$
Data: [data blob]
Signature: SIG=>$pK_n$(HASH(tx_type, data, $n_0$))
Txid: HASH(signature)→Node Id: $n_2$ User 1 may store a data blob in this node (e.g., encrypted or unencrypted). User 1 may create a signature using the private key $pK_n$ associated with $PK_n$ using as input the hash of: 1) the transaction type, 2) the data blob, and 3) the parent node id. The transaction id of this node is a hash of the signature and the node may be referred to by node id: $n_2$.

A validator of this transaction can see the parent node refers to a data node $n_0$. The validator can see that no refers to a parent node which is root node n. The validator can validate the signature was created using the private key $pK_n$ associated with public key $PK_n$ which is associated with root node n. In this way, the validator can validate that the creator of the data was n. The validator can validate that this is the first child node of node $n_0$ because it identifies no sibling node; this is enforced in the signature. In one implementation, once this child node is created, the $n_0$ node is "spent"; subsequent child nodes of $n_0$ should refer to this $n_2$ node.

By following the tree back up through parent nodes, the root node may be reached. Once the root node is determined, each node step back down the tree can be validated using the public key associated with the root node to validate the signatures included in each data node.

Read Access Grant

User 1 may create a read access grant node which grants User 2 access to read a data node (e.g., and child nodes of that data node). The transaction has the following structure:

Access Node Transaction
Transaction type: Read Access
Parent node: $n_0$
Permissioned node: f
Signature: SIG=>$pK_n$(HASH(tx_type, $n_0$, f))
Txid: HASH(signature)→Node Id: $n_{a\,n0}^{f}$ User 1 may create a read access grant transaction identifying a parent data node and another root node (e.g., f) that is permissioned to read the data node. User 1 may use the private key $pK_n$ associated with $PK_n$ to create a signature using as input the hash of: 1) the transaction type, 2) the parent node id, and 3) the permissioned node id. The transaction id of this node is a hash of the signature and the node may be referred to by node id: $n_{a\,n0}^{f}$.

A validator of this transaction can see the parent node refers to a data node $n_0$. The validator can see that n0 is a data node and refers to a root node n. The validator can validate the signature was created using the private key $pK_n$ associated with public key $PK_n$ which is associated with node n. In this way the validator can validate that access was granted by n to f. In one implementation, once this node is created the $n_0$ node is "spent" for purposes of f node access to the $n_0$ node; subsequent changes to read access to $n_0$ node should refer to this $n_{a\,n0}^{f}$ node.

A Read Access node can be provided at any depth in a data node tree. In one implementation, this transaction type can be submitted once for each data node it refers to.

Read Access Revocation

User 1 may create a read access revocation node which revokes a previously granted access to User 2 to read a data node (e.g., and child nodes of that data node). The transaction has the following structure:

Access Node Transaction
Transaction type: Read Access Revoke
Parent node: $n_0$
Previous access node: $n_{a\,n0}^{f}$
Permissioned node: f
Signature: SIG=>$pK_n$(HASH(tx_type, $n_0$, $n_{a\,n0}^{f}$, f))
Txid: HASH(signature)→Node Id: $n_{a'\,n0}^{f}$ User 1 may create a revoke access node identifying a previous read access grant node and a root node for which the permission to read a data node is revoked. User 1 may use the private key $pK_n$ associated with public key $PK_n$ to create a signature using as input the hash of: 1) the transaction type, 2) the parent data node id, 3) the previous access grant node id, and 4) the node id of the root node whose read access is being revoked. The transaction id of this node is a hash of the signature, and the node may be referred to by node id: $n_{a'\,n0}^{f}$.

A validator of this transaction can see that the parent node refers to a previous read access grant node $n_{a\,n0}^{f}$. The validator can see that $n_{a\,n0}^{f}$ is access granted to a data node $n_0$. The validator can see that $n_0$ is a data node and refers to a root node n. The validator can validate that the signature of the read access revoke transaction was created using the private key $pK_n$ associated with public key $PK_n$ which is associated with node n. In this way, the validator can validate that revocation of access is requested by n for f. In one implementation, once this node is created, the $n_{a\,n0}^{f}$ node is "spent" for purposes of f node read access to the $n_0$ node; subsequent changes to read access to $n_0$ node should refer to this $n_{a'\,n0}^{f}$ node.

Read Access Reinstatement

This is similar to the read access revocation transaction, but the transaction type is read access reinstatement. The previous access node should refer to a read access revocation node (transaction).

Write Access Node Creation

User 1 may create an access node which grants User 2 access to write child nodes of this access node on behalf of User 1. The transaction has the following structure:

Access Node Transaction
Transaction type: Write Access
Parent node: n
Permissioned node: f
Signature: SIG=>$pK_n$(HASH(tx_type, n, f))
Txid: HASH(signature)→Node Id: $n'_0$ User 1 may use the private key $pK_n$ associated with $PK_n$ to create a signature using as input the hash of: 1) the transaction type, 2) the root node id identifying the grantor, and 3) the permissioned node id. The transaction id of this node is a hash of the signature and the node may be referred to by node id: $n'_0$.

A validator of this transaction can use the public key seen in the parent node transaction n to validate the signature indicating the owner of node n allowed the owner of node f write access. In one implementation, once this node is created the n node is "spent" for purposes of f node write access to the n node; subsequent changes to write access to n node should refer to this $n'_0$ node.

Another data node in the tree that originates with root node n can be used as parent node; the data node can be traced back to the root node.

Permissioned Data Node Creation

User 2, having been given permission, may create a data node with the Write Access Node as parent. The transaction has the following structure:

Data Node Transaction
Transaction type: Data
Parent node: $n'_0$
Data: [data blob]
Signature: SIG=>$pK_f$(HASH(tx_type, data, $n'_0$))
Txid: HASH(signature)→Node Id: $f''_0$ User 2 may store data in this node (e.g., encrypted or unencrypted as agreed upon with User 1). User 2 may create a signature using the private key $pK_f$ associated with $PK_f$ using as input the hash of: 1) the transaction type (tx_type), 2) the data blob, and 3) the parent access node. The transaction id of this node is a hash of the signature and the node may be referred to by node id: $f''_0$.

A validator of this transaction can see that the parent node refers to an access node that refers to two root nodes n and f, where n grants permission to f. The validator can validate the signature was created using the private key $pK_f$ associated with public key $PK_f$ which is associated with node f. In this way it can validate that the creator of the data was f. It can validate that this is the first child node of node $n^f_0$ because it identifies no sibling node; this is enforced in the signature. In one implementation, once this child node is created, the $n^f_0$ node is "spent"; subsequent child nodes of $n^f_0$ should refer to this $f''_0$ node.

Sibling nodes can be created in a similar manner as other data nodes.

Write Access Revocation

User 1 may create a write access revocation transaction which revokes a previously granted write access to User 2 to write a data node that is a child of a previous write access node. The transaction has the following structure:

Access Node Transaction
Transaction type: Write Access Revoke
Parent node: n
Previous access node: $n^f_0$
Permissioned node: f
Signature: $SIG \Rightarrow pK_n(HASH(tx\_type, n, f, n^f_0))$
Txid: $HASH(signature) \rightarrow Node\ Id: n^f_{0'}$ User 1 may create a revoke write access node identifying a previous write access grant node and a root node for which the permission to write a data node is revoked. User 1 may use the private key $pK_n$ associated with public key $PK_n$ to create a signature using as input the hash of: 1) transaction type, 2) the parent data node id, 3) the previous access grant node id, and 4) the node id of the root node whose write access is being revoked. The transaction id of this node is a hash of the signature, and the node may be referred to by node id: $n^f_{0'}$.

A validator of this transaction can see that the parent node refers to a previous write access grant node $n^f_0$. The validator can see that $n^f_0$ is access granted to a data node $n_0$. The validator can see that no is a data node and refers to a root node n. The validator can validate that the signature of the revoke access transaction was created using the private key $pK_n$ associated with public key $PK_n$ which is associated with node n. In this way, the validator can validate that revocation of access is requested by n for f. In one implementation, once this node is created the $n^f_0$ node is "spent" for purposes of f node write access to the n node; subsequent changes to write access to n node should refer to this $n^f_{0'}$ node.

In the presence of the revocation, the blockchain transaction validator should invalidate a transaction where f attempts to create a data node with the original write access node as a parent.

Write Access Reinstatement

This is similar to the write access revocation transaction, but the transaction type is write access reinstatement. The previous access node should refer to a write access revocation node (transaction).

FIGS. 3A-3B show a datagraph diagram illustrating embodiments of a data flow for the SDTD. In FIGS. 3A-3B, dashed lines indicate data flow elements that may be more likely to be optional. In FIGS. 3A-3B, a user's client 302 may send a brokerage order request 321 to a brokerage server 304 to request that a brokerage order (e.g., a stock purchase) be executed. For example, the client may be a desktop, a laptop, a tablet, a smartphone, and/or the like that is executing a client application. In one implementation, the brokerage order request may include data such as a request identifier, user data information, a security identifier, an order action, an order type, a quantity, and/or the like. In one embodiment, the client may provide the following example brokerage order request, substantially in the form of a (Secure) Hypertext Transfer Protocol ("HTTP(S)") POST message including eXtensible Markup Language ("XML") formatted data, as provided below:

```
POST /authrequest.php HTTP/1.1
Host: www.server.com
Content-Type: Application/XML
Content-Length: 667
<?XML version = "1.0" encoding = "UTF-8"?>
<auth_request>
    <timestamp>2020-12-31 23:59:59</timestamp>
    <user_accounts_details>
        <user_account_credentials>
            <user_name>JohnDaDoeDoeDoooe@gmail.com</account_name>
            <password>abc123</password>
            //OPTIONAL <cookie>cookieID</cookie>
            //OPTIONAL <digital_cert_link>www.mydigitalcertificate.com/
JohnDoeDaDoeDoe@gmail.com/mycertifcate.dc</digital_cert_link>
            //OPTIONAL <digital_certificate>_DATA_</digital_certificate>
        </user_account_credentials>
    </user_accounts_details>
    <client_details> //iOS Client with App and Webkit
            //it should be noted that although several client details
            //sections are provided to show example variants of client
            //sources, further messages will include only on to save
            //space
        <client_IP>10.0.0.123</client_IP>
        <user_agent_string>Mozilla/5.0 (iPhone; CPU iPhone OS 7_1_1 like Mac OS
X) AppleWebKit/537.51.2 (KHTML, like Gecko) Version/7.0 Mobile/11D201
Safari/9537.53</user_agent_string>
        <client_product_type>iPhone6,1</client_product_type>
        <client_serial_number>DNXXX1X1XXXX</client_serial_number>
        <client_UDID>3XXXXXXXXXXXXXXXXXXXXXXXXD</client_UDID>
        <client_OS>iOS</client_OS>
        <client_OS_version>7.1.1</client_OS_version>
        <client_app_type>app with webkit</client_app_type>
        <app_installed_flag>true</app_installed_flag>
        <app_name>SDTD.app</app_name>
```

```
            <app_version>1.0 </app_version>
            <app_webkit_name>Mobile Safari</client_webkit_name>
            <client_version>537.51.2</client_version>
    </client_details>
    <client_details> //iOS Client with Webbrowser
            <client_IP>10.0.0.123</client_IP>
            <user_agent_string>Mozilla/5.0 (iPhone; CPU iPhone OS 7_1_1 like Mac OS
X) AppleWebKit/537.51.2 (KHTML, like Gecko) Version/7.0 Mobile/11D201
Safari/9537.53</user_agent_string>
            <client_product_type>iPhone6,1</client_product_type>
            <client_serial_number>DNXXX1X1XXXX</client_serial_number>
            <client_UDID>3XXXXXXXXXXXXXXXXXXXXXXXXD</client_UDID>
            <client_OS>iOS</client_OS>
            <client_OS_version>7.1.1</client_OS_version>
            <client_app_type>web browser</client_app_type>
            <client_name>Mobile Safari</client_name>
            <client_version>9537.53</client_version>
    </client_details>
    <client_details> //Android Client with Webbrowser
            <client_IP>10.0.0.123</client_IP>
            <user_agent_string>Mozilla/5.0 (Linux; U; Android 4.0.4; en-us; Nexus S
Build/IMM76D) AppleWebKit/534.30 (KHTML, like Gecko) Version/4.0 Mobile
Safari/534.30</user_agent_string>
            <client_product_type>Nexus S</client_product_type>
            <client_serial_number>YXXXXXXXXZ</client_serial_number>
            <client_UDID>FXXXXXXXXX-XXXX-XXXX-XXXX-XXXXXXXXXXXX</client_UDID>
            <client_OS>Android</client_OS>
            <client_OS_version>4.0.4</client_OS_version>
            <client_app_type>web browser</client_app_type>
            <client_name>Mobile Safari</client_name>
            <client_version>534.30</client_version>
    </client_details>
    <client_details> //Mac Desktop with Webbrowser
            <client_IP>10.0.0.123</client_IP>
            <user_agent_string>Mozilla/5.0 (Macintosh; Intel Mac OS X 10_9_3)
AppleWebKit/537.75.14 (KHTML, like Gecko) Version/7.0.3
Safari/537.75.14</user_agent_string>
            <client_product_type>MacPro5,1</client_product_type>
            <client_serial_number>YXXXXXXXXZ</client_serial_number>
            <client_UDID>FXXXXXXXXX-XXXX-XXXX-XXXX-XXXXXXXXXXXX</client_UDID>
            <client_OS>Mac OS X</client_OS>
            <client_OS_version>10.9.3</client_OS_version>
            <client_app_type>web browser</client_app_type>
            <client_name>Mobile Safari</client_name>
            <client_version>537.75.14</client_version>
    </client_details>
    <brokerage_order_request>
            <request_identifier>ID_request_1</request_identifier>
            <user_data_information>
                    <user_root_node_identifier>n</user_root_node_identifier>
                    <authentication_data>data signed with n's private
key</authentication_data>
    <access_control_node>www.access_control_node.com</access_control_node>
                    <read_access>
                            <data_node>$n_3$</data_node>
                            <read_access_grant_node>$n_{d\,n_3}^f$</read_access_grant_node>
                    </read_access>
                    <write_access>
                            <write_access_node>$n_{4\,0}^f$</write_access_node>
                    </write_access>
            </user_data_information>
            <security>NYSE:IBM</security>
            <order_action>BUY</order_action>
            <order_type>Limit</order_type>
            <quantity>100</quantity>
            <price>$150</price>
    </brokerage_order_request>
</auth_request>
```

An order processing (OP) component 325 may utilize data provided in the brokerage order request to facilitate processing the brokerage order. See FIG. 4 for additional details regarding the OP component.

The brokerage server may send a distributed controlled (DC) data read request 329 to an access control node 306 (e.g., specified in the brokerage order request) to obtain user data, to which the brokerage server was granted read access by the user, that the brokerage server utilizes to facilitate processing the brokerage order. In one implementation, the DC data read request may include data such as a request identifier, brokerage server authentication data, a data node identifier, a read access grant node identifier (e.g., for the data node), a requested data subset, and/or the like. In one embodiment, the brokerage server may provide the following example DC data read request, substantially in the form of a HTTP(S) POST message including XML-formatted data, as provided below:

```
POST /DC_data_read_request.php HTTP/1.1
Host: www.server.com
Content-Type: Application/XML
Content-Length: 667
<?XML version = "1.0" encoding = "UTF-8"?>
<DC_data_read_request>
    <request_identifier>ID_request_2</request_identifier>
    <brokerage_server_authentication_data>
    <brokerage_server_root_node_identifier>f
    </brokerage_server_root_node_identifier>
        <authentication_data>data signed with f's private key</authentication_data>
    </brokerage_server_authentication_data>
    <data_node>n$_3$</data_node>
    <read_access_grant_node>n$_d^f{}_{n3}$</read_access_grant_node>
    <requested_data_subset>address</requested_data_subset>
</DC_data_read_request>
```

An access facilitating (AF) component 333 may utilize data provided in the data read request to facilitate providing the requested data to the brokerage server. See FIG. 5 for additional details regarding the AF component.

The access control node may send a data retrieval request 337 to a backing repository 308 (e.g., if the requested data is stored in the backing repository). In one implementation, the data retrieval request may comprise one or more SQL statements. The backing repository may provide the requested data to the access control node via a data retrieval response 341.

The access control node may send a DC data read response 345 to the brokerage server to provide the requested data to the brokerage server. In one implementation, the DC data read response may include data such as a response identifier, the requested data, and/or the like. In one embodiment, the access control node may provide the following example DC data read response, substantially in the form of a HTTP(S) POST message including XML-formatted data, as provided below:

```
POST /DC_data_read_response.php HTTP/1.1
Host: www.server.com
Content-Type: Application/XML
Content-Length: 667
<?XML version = "1.0" encoding = "UTF-8"?>
<DC_data_read_response>
    <response_identifier>ID_response_2</response_identifier>
    <requested_data>user's mailing address</requested_data>
</DC_data_read_response>
```

The brokerage server may send a DC data write request 349 to the access control node (e.g., this access control node may be the same as or different from the access control node utilized for the DC data read request) to facilitate storing data (e.g., decryption key data, backing repository data) associated with a newly created blockchain data node (e.g., that stores data regarding the stock purchase). In one implementation, the DC data write request may include data such as a request identifier, brokerage server authentication data, a write access node identifier, a data node identifier, data node write data (e.g., contents of the newly created blockchain data node), data node decryption key, backing repository data (e.g., data to be stored in a backing repository), and/or the like. In one embodiment, the brokerage server may provide the following example DC data write request, substantially in the form of a HTTP(S) POST message including XML-formatted data, as provided below:

```
POST /DC_data_write_request.php HTTP/1.1
Host: www.server.com
Content-Type: Application/XML
Content-Length: 667
<?XML version = "1.0" encoding = "UTF-8"?>
<DC_data_write_request>
    <request_identifier>ID_request_3</request_identifier>
    <brokerage_server_authentication_data>
    <brokerage_server_root_node_identifier>f
    </brokerage_server_root_node_identifier>
        <authentication_data>data signed with f's private key</authentication_data>
    </brokerage_server_authentication_data>
    <write_access_node>n$_d^f{}_0$</write_access_node>
    <data_node>f$^n{}_4$</data_node>
    <data_node_decryption_key>decryption key<data_node_decryption_key>
    <backing_repository_data>data contents</backing_repository_data>
</DC_data_write_request>
```

A storage facilitating (SF) component 353 may utilize data provided in the DC data write request to facilitate storing the specified data. See FIG. 6 for additional details regarding the SF component.

The access control node may send a data storage request 357 to the backing repository (e.g., if the specified data should be stored in the backing repository; this backing repository may be the same as or different from the backing repository utilized for the DC data read request). In one implementation, the data storage request may comprise one or more SQL statements. The backing repository may store the specified data, and/or may inform the access control node via a data storage response 361 that the specified data was stored.

The access control node may send a DC data write response 365 to the brokerage server to provide a data write confirmation to the brokerage server. In one implementation, the DC data write response may include data such as a response identifier, a status, and/or the like. In one embodiment, the access control node may provide the following example DC data write response, substantially in the form of a HTTP(S) POST message including XML-formatted data, as provided below:

```
POST /DC_data_write_response.php HTTP/1.1
Host: www.server.com
Content-Type: Application/XML
Content-Length: 667
<?XML version = "1.0" encoding = "UTF-8"?>
<DC_data_write_response>
    <response_identifier>ID_response_3</response_identifier>
    <status>Data Written Successfully</status>
</DC_data_write_response>
```

The brokerage server may send a transaction validation request 369 to a validator node 310 to facilitate storing (e.g., by validating a blockchain transaction to create a data node with the write access node, to which the brokerage server was granted write access by the user, as parent) data (e.g., stock purchase data) on the blockchain In one implementation, the transaction validation request may include data such as a request identifier, a data node identifier, contents of the newly created blockchain data node, and/or the like. In one embodiment, the brokerage server may provide the following example transaction validation request, substantially in the form of a HTTP(S) POST message including XML-formatted data, as provided below:

```
POST /transaction_validation_request.php HTTP/1.1
Host: www.server.com
Content-Type: Application/XML
Content-Length: 667
<?XML version = "1.0" encoding = "UTF-8"?>
<transaction_validation_request>
    <request_identifier>ID_request_4</request_identifier>
    <data_node>f'_4</data_node>
</transaction_validation_request>
```

A transaction validating (TV) component 373 may utilize data provided in the transaction validation request to facilitate validating the associated blockchain transaction. See FIG. 6 for additional details regarding the TV component.

The validator node may send a transaction validation response 377 to the brokerage server to confirm whether the associated blockchain transaction was validated. In one implementation, the transaction validation response may include data such as a response identifier, a status, and/or the like. In one embodiment, the validator node may provide the following example transaction validation response, substantially in the form of a HTTP(S) POST message including XML-formatted data, as provided below:

```
POST /transaction_validation_response.php HTTP/1.1
Host: www.server.com
Content-Type: Application/XML
Content-Length: 667
<?XML version = "1.0" encoding = "UTF-8"?>
<transaction_validation_response>
    <response_identifier>ID_response_4</response_identifier>
    <status>Transaction Validated</status>
</transaction_validation_response>
```

The brokerage server may send a brokerage order confirmation 381 to the client to inform the user that the brokerage order has been processed. In one implementation, the brokerage order confirmation may include data such as a response identifier, a status, and/or the like. In one embodiment, the brokerage server may provide the following example brokerage order confirmation, substantially in the form of a HTTP(S) POST message including XML-formatted data, as provided below:

```
POST /brokerage_order_confirmation.php HTTP/1.1
Host: www.server.com
Content-Type: Application/XML
Content-Length: 667
<?XML version = "1.0" encoding = "UTF-8"?>
<brokerage_order_confirmation>
    <response_identifier>ID_response_1</response_identifier>
    <status>Order Processed Successfully</status>
</brokerage_order_confirmation>
```

FIG. 4 shows a logic flow diagram illustrating embodiments of an order processing (OP) component for the SDTD. In FIG. 4, a brokerage order request may be received at 401. For example, a user may send the brokerage order request to request that a brokerage order (e.g., a stock purchase) be executed.

Brokerage order instructions may be determined at 405. In one implementation, the brokerage order request may be parsed (e.g., using PHP commands) to determine the brokerage order instructions. For example, the user may wish to place an order to buy 100 shares of IBM stock with a limit price of $150 per share.

The user associated with the brokerage order request may be determined at 409. In one implementation, the brokerage order request may be parsed (e.g., using PHP commands) to determine the user's user root node identifier (e.g., n). In another implementation, authentication data (e.g., specified data signed with n's private key) may be validated (e.g., decrypted with n's public key) to confirm that the brokerage order request was sent by the user (e.g., n).

User data to read may be determined at 411. In one implementation, such data may be determined based on information utilized to process the brokerage order. For example, such data may include the user's mailing address, the user's name, the user's funds (e.g., Bitcoins) used to pay for the stock purchase, and/or the like.

Associated readable blockchain nodes utilized to obtain the user data to read may be determined at 413. In one implementation, the brokerage order request may be parsed (e.g., using PHP commands) to determine the read access data nodes provided by the user. In another implementation, the brokerage order request may be parsed (e.g., using PHP commands) to also determine read access grant nodes associated with the read access data nodes (e.g., to make the process of finding the associated read access grant nodes more efficient for access control nodes).

A determination may be made at 417 whether there remain readable blockchain data nodes to read. In one implementation, any readable blockchain data node specified by the user may be read. In another implementation, readable blockchain data nodes that include the user data to read may be determined and read. If there remain readable blockchain data nodes to read, the next readable blockchain data node may be selected at 421.

An access control node associated with the selected readable blockchain data node may be determined at 425. In one embodiment, an access control node may be utilized to obtain user data specified in a blockchain data node (e.g., the access control node may verify that a read access grant node grants a requestor access to the blockchain data node, and/or may provide the requestor with the specified user data). In one implementation, the brokerage order request may be parsed (e.g., using PHP commands) to determine the associated access control node. For example, a URI utilized to send data read requests to the access control node may be determined. In another implementation, the associated access control node may be determined by retrieving a user setting that specifies an access control node utilized by the user from a database.

A distributed controlled (DC) data read request may be sent to the associated access control node at 429 to obtain user data specified in the selected readable blockchain data node. In one implementation, the DC data read request may be sent (e.g., via an API call) to the URI associated with the access control node, and the user data may be obtained from the access control node via a DC data read response.

The obtained user data may be processed at 433. In one implementation, the obtained user data may be utilized to generate the brokerage order. For example, order information (e.g., the user's mailing address) may be filled out using the obtained user data. In another example, availability of funds to pay for the brokerage order may be verified.

The brokerage order may be executed at 437. In one implementation, the brokerage order may be sent to a stock exchange for execution. User data to write may be determined at 441. In one implementation, such data may be determined based on information that should be recorded to document the brokerage order (e.g., the stock purchase). For example, a brokerage firm may write data that indicates that the user owns 100 shares of IBM stock.

Associated write access blockchain nodes utilized to write the user data to write may be determined at 445. In one implementation, the brokerage order request may be parsed (e.g., using PHP commands) to determine the write access blockchain nodes provided by the user. For example, a write access blockchain node may grant the brokerage firm (e.g., based on the brokerage firm's user root node identifier f) permission to create data nodes with the write access blockchain node as parent (e.g., the brokerage firm may write data to the user's tree of user-owned data).

A determination may be made at 449 whether there remain blockchain data nodes to write. In one implementation, the user data to write may be written to a blockchain data node with the determined write access blockchain node as parent. In another implementation, the user data to write associated with a category and/or subcategory may be written to a blockchain data node with determined parent write access blockchain node associated with the corresponding category and/or subcategory. If there remain blockchain data nodes to write, the next write access blockchain node may be selected at 453.

A blockchain data node with relevant user data to write and with the selected write access blockchain node as parent may be created at 457. In one embodiment, the newly created blockchain data node may be signed with the brokerage firm's signature (e.g., using the brokerage firm's private key $pK_f$). In one implementation, the user data to write may be stored in the newly created blockchain data node (e.g., encrypted or unencrypted). In another implementation, the user data to write may be stored in a backing repository, and the newly created blockchain data node may store data (e.g., an identifier of a database and/or database record) that may be utilized to retrieve the user data to write.

An access control node associated with the newly created blockchain data node may be determined at 461. In one embodiment, an access control node may be utilized to store a decryption key associated with a blockchain data node. In another embodiment, an access control node may be utilized to store data (e.g., the user data to write) in a backing repository. In one implementation, the brokerage order request may be parsed (e.g., using PHP commands) to determine the associated access control node. For example, a URI utilized to send data write requests to the access control node may be determined. In another implementation, the associated access control node may be determined by retrieving a user setting that specifies an access control node utilized by the user from a database.

A DC data write request may be sent to the associated access control node at 465. For example, the associated access control node may verify that a write access node grants a requestor (e.g., the brokerage firm with user root node identifier f) access to create a child blockchain data node, may store the associated decryption key, may store data in a backing repository, and/or the like. In one implementation, the DC data write request may be sent (e.g., via an API call) to the URI associated with the access control node.

A transaction validation request may be sent to a validator node at 469. For example, the validator node may verify that the signature of the newly created blockchain data node is valid, may add the newly created blockchain data node to the blockchain, and/or the like. In one implementation, the validator node may be a peer in a network (e.g., a miner in the Bitcoin network).

An order confirmation for the brokerage order may be generated for the user at 473. For example, the user may be informed that the brokerage order has been processed. The information associated with the processed brokerage order (e.g., the user owns 100 shares of IBM stock) is stored in a blockchain data node (e.g., in the user's tree of user-owned data) that is signed by the brokerage firm. As such, other brokerage firms (e.g., in a network of trusted brokerage firms), to which the user grants read access, may trust this information because it is signed by a trusted member brokerage firm.

FIG. 5 shows a logic flow diagram illustrating embodiments of an access facilitating (AF) component for the SDTD. In FIG. 5, a distributed controlled (DC) data read request may be obtained at 501. For example, a user (e.g., via a client) may send the DC data read request to access the user's data. In another example, a brokerage firm (e.g., via a brokerage server) may send the DC data read request to access the user's data.

A requestor (e.g., the user, the brokerage firm) associated with the DC data read request may be determined at 505. In one implementation, the DC data read request may be parsed (e.g., using PHP commands) to determine the requestor's (e.g., the brokerage firm's) user root node identifier (e.g., f). In another implementation, authentication data (e.g., specified data signed with f's private key) may be validated (e.g., decrypted with f's public key) to confirm that the DC data read request was sent by the requestor (e.g., f).

A blockchain data node (e.g., or a set of blockchain data nodes) associated with the DC data read request may be determined at 509. In one implementation, the DC data read request may be parsed (e.g., using PHP commands) to determine the blockchain data node specified by the requestor (e.g., the blockchain data node with node identifier $n_3$).

The owner (e.g., the user with user root node identifier n) of the blockchain data node may be determined at 513. In one implementation, the blockchain data node may be parsed (e.g., using PHP commands) to determine the value of the "parent node" field. The "parent node" field may be used to iteratively traverse the owner's tree of user-owned data to reach the root node, which specifies the owner's user root node identifier (e.g., n).

A read access grant node (e.g., the read access grant node with node identifier $n_{a\,n_3}^{f}$) associated with the blockchain data node may be determined at 517. In one implementation, the blockchain may be analyzed (e.g., searched through) to determine the associated read access grant node. In another implementation, the DC data read request may be parsed (e.g., using PHP commands) to determine the associated read access grant node.

A determination may be made at 521 whether read access to the blockchain data node has been granted to the requestor. In one implementation, the requestor's user root node identifier may be compared with the owner's user root node identifier to make this determination (e.g., if the requestor is the owner, the requestor has read access). In another implementation, the requestor's user root node identifier may be compared with the value of the "permissioned node" field of the associated read access grant node (e.g., to check if the requestor was granted read access by the owner). If it is determined that read access has not been granted, the DC data read request may be denied at 525. For example, the requestor may be informed that the requestor does not have read access to the blockchain data node.

If it is determined that read access has been granted, a determination may be made at 529 whether data in the blockchain data node is encrypted. In one implementation, the blockchain data node data may be parsed (e.g., using PHP commands) to make this determination. In another implementation, a database record (e.g., stored in a backing repository) associated with the blockchain data node (e.g., based on the node identifier of the blockchain data node) may be checked to make this determination.

If it is determined that the blockchain data node data is encrypted, the decryption key associated with the blockchain data node data may be retrieved at 533. In one implementation, the decryption key may be retrieved (e.g., based on the node identifier of the blockchain data node) from the backing repository. The blockchain data node data may be decrypted using the retrieved decryption key at 537.

A determination may be made at 541 regarding the storage location of the data (e.g., the owner's mailing address) requested by the requestor. In one embodiment, the requested data may be stored in the backing repository. Accordingly, the requested data may be retrieved from the backing repository at 545. For example, the blockchain data node data may include a database record identifier that may be used to retrieve the requested data via a MySQL database command similar to the following:

SELECT mailingAddress
FROM DataNode
WHERE dataNodeID=ID_database_record;

In another embodiment, the requested data may be stored in the blockchain data node. Accordingly, the requested data may be determined (e.g., parsed) from the blockchain data node data. For example, the decrypted blockchain data node data may be parsed to determine the owner's mailing address.

The requested data may be provided to the requestor at 549. In one implementation, the requested data may be provided via a DC data read response.

FIG. 6 shows a logic flow diagram illustrating embodiments of a storage facilitating (SF) component for the SDTD. In FIG. 6, a distributed controlled (DC) data write request may be obtained at 601. For example, a user (e.g., via a client) may send the DC data write request to store data, associated with a blockchain data node in the user's tree of user-owned data, in a backing repository. In another example, a brokerage firm (e.g., via a brokerage server) may send the DC data write request to store data, associated with a blockchain data node created by the brokerage firm in the user's tree of user-owned data, in a backing repository.

A requestor (e.g., the user, the brokerage firm) associated with the DC data write request may be determined at 605. In one implementation, the DC data write request may be parsed (e.g., using PHP commands) to determine the requestor's (e.g., the brokerage firm's) user root node identifier (e.g., f). In another implementation, authentication data (e.g., specified data signed with f's private key) may be validated (e.g., decrypted with f's public key) to confirm that the DC data write request was sent by the requestor (e.g., f).

A write access blockchain node (e.g., or a set of write access blockchain nodes) associated with the DC data write request may be determined at 609. In one implementation, the DC data write request may be parsed (e.g., using PHP commands) to determine the write access blockchain node specified by the requestor (e.g., the write access blockchain node with node identifier $n_4^{f_0}$). In another implementation, the DC data write request may be parsed (e.g., using PHP commands) to determine a blockchain data node created by the requestor (e.g., the blockchain data node with node identifier $f''_4$). The value of the "parent node" field of the blockchain data node created by the requestor may be determined. The "parent node" field may be used to iteratively traverse the owner's tree of user-owned data to reach the associated write access blockchain node (e.g., the write access blockchain node with node identifier $n_4^{f_0}$).

The owner (e.g., the user with user root node identifier n) of the write access blockchain node may be determined at 613. In one implementation, the write access blockchain node may be parsed (e.g., using PHP commands) to determine the value of the "parent node" field. The "parent node" field may be used to iteratively traverse the owner's tree of user-owned data to reach the root node, which specifies the owner's user root node identifier (e.g., n).

A determination may be made at 617 whether write access has been granted to the requestor by the write access blockchain node. In one implementation, the requestor's user root node identifier may be compared with the user root node identifier of the owner of the tree of user-owned data to make this determination (e.g., if the requestor is the owner, the requestor has write access). In another implementation, the requestor's user root node identifier may be compared with the value of the "permissioned node" field of the associated write access blockchain node (e.g., to check if the requestor was granted write access by the owner). If it is determined that write access has not been granted, the DC data write request may be rejected at 621. For example, the requestor may be informed that the requestor does not have write access to create a blockchain data node with the write access blockchain node as parent.

If it is determined that write access has been granted, write data associated with the blockchain data node created by the requestor may be determined at 625. In one implementation, the DC data write request may be parsed (e.g., using PHP commands) to make this determination. For example, the write data may include data stored in the blockchain data node. In another example, the write data may include data associated with the blockchain data node to be stored in the backing repository.

A determination may be made at 629 whether the write data is encrypted. In one implementation, the blockchain data node data may be parsed to make this determination. In another implementation, the DC data write request may be parsed (e.g., using PHP commands) to make this determination.

If it is determined that the write data is encrypted, the decryption key associated with the write data may be determined at 633. In one implementation, the DC data write request may be parsed (e.g., using PHP commands) to determine the decryption key. Decryption key data (e.g., the decryption key, the blockchain data node associated with the decryption key) may be stored at 637 (e.g., in the backing repository).

A determination may be made at 641 regarding the storage location of the write data (e.g., the user owns 100 shares of IBM stock). In one embodiment, the write data should be stored in the backing repository. Accordingly, the write data may be stored in the backing repository at 645. For example, the blockchain data node created by the requestor may include a database record identifier that may be used to store the write data via a MySQL database command similar to the following:

INSERT INTO DataNode (dataNodeID, stockOwnershipData)
VALUES (ID_database_record, "100 shares of IBM stock");

A data write confirmation may be provided to the requestor at 649. In one implementation, the data write confirmation may be provided via a DC data write response to inform the requestor that the DC data write request was processed successfully.

FIG. 7 shows a logic flow diagram illustrating embodiments of a transaction validating (TV) component for the SDTD. In FIG. 7, a transaction validation request may be obtained (e.g., by a validator node) at 701 from a requestor. For example, a user (e.g., via a client) may send the transaction validation request to add a blockchain data node in the user's tree of user-owned data to the blockchain. In another example, a brokerage firm (e.g., via a brokerage server) may send the transaction validation request to add a blockchain data node created by the brokerage firm in the user's tree of user-owned data to the blockchain.

A blockchain data node associated with the transaction validation request may be determined at 705. In one implementation, the transaction validation request may be parsed (e.g., using PHP commands) to determine the blockchain data node (e.g., the blockchain data node with node identifier $f''_4$) to add specified by the requestor (e.g., the user, the brokerage firm).

A write access blockchain node associated with the blockchain data node may be determined at 709. In one implementation, the blockchain data node may be parsed (e.g., using PHP commands) to determine the value of the "parent node" field of the blockchain data node. The "parent node" field may be used to iteratively traverse the user's tree of user-owned data to reach the associated write access blockchain node (e.g., the write access blockchain node with node identifier $n_{4\ 0}^{f}$).

A permissioned node specified by the write access blockchain node may be determined at 713. In one implementation, the write access blockchain node may be parsed (e.g., using PHP commands) to determine the value of the "permissioned node" field (e.g., f) of the write access blockchain node.

A signature associated with the blockchain data node may be determined at 717. In one implementation, the blockchain data node may be parsed (e.g., using PHP commands) to determine the signature.

A determination may be made at 721 whether the signature of the blockchain data node is valid. In one implementation, the public key associated with the permissioned node (e.g., the brokerage firm's public key $PK_f$) may be used with the signature to determine whether the signature is valid. For example, the signature may be decrypted using the public key and compared to the value of a hash of: 1) the transaction type (tx_type), 2) the data blob, and 3) the parent access node, associated with the blockchain data node. If the values of the decrypted signature and the hash match, the signature is valid.

If it is determined that the signature of the blockchain data node is not valid, the transaction validation request may be rejected at 725. For example, the requestor may be informed that the blockchain data node is invalid.

If it is determined that the signature of the blockchain data node is valid, the transaction validation request may be validated at 729. In some implementations, the blockchain data node may be added to the blockchain copy of the validator node and/or sent to other network peers for validation. In some implementations, a transaction validation response may be sent to the requestor to inform the requestor that the transaction was validated successfully.

FIGS. 8A-8B show a datagraph diagram illustrating embodiments of a data flow for the SDTD. In FIGS. 8A-8B, client A 802 (e.g., of user A utilizing an agency oversight configured blockchain) may send a mutable blockchain transaction request 821 to a SDTD server 806 to facilitate processing (e.g., adding to the blockchain) a mutable blockchain transaction (e.g., the transaction may involve transferring crypto tokens (e.g., 50 Bitcoins) from user A to user B associated with client B 804). For example, client A may be a desktop, a laptop, a tablet, a smartphone, and/or the like that is executing a client application. In one implementation, the mutable blockchain transaction request may include data such as a request identifier, blockchain transaction data, and/or the like. In one embodiment, client A may provide the following example mutable blockchain transaction request, substantially in the form of a HTTP(S) POST message including XML-formatted data, as provided below:

```
POST /mutable_blockchain_transaction_request.php HTTP/1.1
Host: www.server.com
Content-Type: Application/XML
Content-Length: 667
<?XML version = "1.0" encoding = "UTF-8"?>
<mutable_blockchain_transaction_request>
    <request_identifier>ID_request_11</request_identifier>
    <blockchain_transaction_data>
        <input>
            <previous_transaction_hash>transaction identifier</previous_transaction_hash>
            <index>0</index>
            <scriptSig>
                <signature>user A's signature</signature>
                <serialized_script>
                    {1 [user A's public key] [agency's public key] 2
                    OP_CHECKMULTISIG}
                </serialized_script>
            </scriptSig>
        </input>
        <output>
            <value>5000000000</value>
            <scriptPubKey>
                OP_HASH160
                [20-byte-hash of {1 [user B's public key] [agency's public key] 2
                OP_CHECKMULTISIG}]
                OP_EQUAL
            </scriptPubKey>
        </output>
    </blockchain_transaction_data>
</mutable_blockchain_transaction_request>
```

A transaction processing (TP) component 825 may verify that a specially formatted mutable blockchain transaction request compatible with the agency oversight configured blockchain was received and/or may facilitate transaction processing. See FIG. 9 for additional details regarding the TP component.

The SDTD server may send a transaction confirmation 829 to client A to inform user A whether the mutable blockchain transaction was processed successfully. In one implementation, the transaction confirmation may include data such as a response identifier, a status, and/or the like. In one embodiment, the SDTD server may provide the following example transaction confirmation, substantially in the form of a HTTP(S) POST message including XML-formatted data, as provided below:

```
POST /transaction_confirmation.php HTTP/1.1
Host: www.server.com
Content-Type: Application/XML
Content-Length: 667
<?XML version = "1.0" encoding = "UTF-8"?>
<transaction_confirmation>
```

```
    <response_identifier>ID_response_11</response_identifier>
    <status>OK</status>
</transaction_confirmation>
```

Client B 804 (e.g., of user B utilizing the agency oversight configured blockchain) may send a mutable blockchain transaction request 831 to the SDTD server to facilitate processing (e.g., adding to the blockchain) a mutable blockchain transaction (e.g., the transaction may involve transferring crypto tokens (e.g., 50 Bitcoins received from user A) from user B to user C). For example, client B may be a desktop, a laptop, a tablet, a smartphone, and/or the like that is executing a client application. In one implementation, the mutable blockchain transaction request may include data such as a request identifier, blockchain transaction data, and/or the like. In one embodiment, client B may provide the following example mutable blockchain transaction request, substantially in the form of a HTTP(S) POST message including XML-formatted data, as provided below:

```
POST /mutable_blockchain_transaction_request.php HTTP/1.1
Host: www.server.com
Content-Type: Application/XML
Content-Length: 667
<?XML version = "1.0" encoding = "UTF-8"?>
<mutable_blockchain_transaction_request>
    <request_identifier>ID_request_12</request_identifier>
    <blockchain_transaction_data>
        <input>
            <previous_transaction_hash>transaction
identifier</previous_transaction_hash>
            <index>0</index>
            <scriptSig>
                <signature>user B's signature</signature>
                <serialized_script>
                    {1 [user B's public key] [agency's public key] 2
                    OP_CHECKMULTISIG}
                </serialized_script>
            </scriptSig>
        </input>
        <output>
            <value>5000000000</value>
            <scriptPubKey>
                OP_HASH160
                [20-byte-hash of {1 [user C's public key] [agency's
public key] 2
                OP_CHECKMULTISIG}]
                OP_EQUAL
            </scriptPubKey>
        </output>
    </blockchain_transaction_data>
</mutable_blockchain_transaction_request>
```

A transaction processing (TP) component 835 may verify that a specially formatted mutable blockchain transaction request compatible with the agency oversight configured blockchain was received and/or may facilitate transaction processing. See FIG. 9 for additional details regarding the TP component.

The SDTD server may send a transaction confirmation 839 to client B to inform user B whether the mutable blockchain transaction was processed successfully. In one implementation, the transaction confirmation may include data such as a response identifier, a status, and/or the like. In one embodiment, the SDTD server may provide the following example transaction confirmation, substantially in the form of a HTTP(S) POST message including XML-formatted data, as provided below:

```
POST /transaction_confirmation.php HTTP/1.1
Host: www.server.com
Content-Type: Application/XML
Content-Length: 667
<?XML version = "1.0" encoding = "UTF-8"?>
<transaction_confirmation>
    <response_identifier>ID_response_12</response_identifier>
    <status>OK</status>
</transaction_confirmation>
```

Client A may send an agency action request 841 to an agency 808 (e.g., the agency providing oversight over the agency oversight configured blockchain) to request that the agency unwind a specified mutable blockchain transaction (e.g., the transaction associated with the mutable blockchain transaction request 821). For example, user A may wish to unwind the specified transaction for a variety of reasons, such as the transaction was made by mistake, the transaction was unauthorized, user B failed to honor the terms of an agreement associated with the transaction, and/or the like. In one implementation, the agency action request may include data such as a request identifier, reason for request, transaction to unwind, unwind amount, unwind address (e.g., address associated with user A where unwound crypto tokens should be deposited), and/or the like. In one embodiment, client A may provide the following example agency action request, substantially in the form of a HTTP(S) POST message including XML-formatted data, as provided below:

```
POST /agency_action_request.php HTTP/1.1
Host: www.server.com
Content-Type: Application/XML
Content-Length: 667
<?XML version = "1.0" encoding = "UTF-8"?>
<agency_action_request>
    <request_identifier>ID_request_13</request_identifier>
    <reason>unauthorized transaction</reason>
    <transaction_to_unwind>
        transaction identifier associated with the mutable blockchain
transaction request 821
    </transaction_to_unwind>
    <unwind_amount>5000000000</unwind_amount>
    <unwind_address>3HnhWpkMHMjgt167kvgcPyurMmsCQ2WPgg
    </unwind_address>
</agency_action_request>
```

An agency action (AA) component 845 may utilize data provided in the agency action request to facilitate unwinding the specified transaction. See FIG. 10 for additional details regarding the AA component.

The agency may send one or more agency blockchain transaction requests 849 to the SDTD server to facilitate unwinding the specified transaction. For example, the agency may transfer crypto tokens associated with the specified transaction to the unwind address. In one implementation, the agency blockchain transaction request may include data such as a request identifier, blockchain transaction data, and/or the like. In one embodiment, the agency may provide the following example agency blockchain transaction request, substantially in the form of a HTTP(S) POST message including XML-formatted data, as provided below:

```
POST /agency_blockchain_transaction_request.php HTTP/1.1
Host: www.server.com
Content-Type: Application/XML
Content-Length: 667
<?XML version = "1.0" encoding = "UTF-8"?>
```

-continued

```
<agency_blockchain_transaction_request>
    <request_identifier>ID_request_14</request_identifier>
    <blockchain_transaction_data>
        <input>
            <previous_transaction_hash>
                transaction identifier associated with the mutable
blockchain transaction
                request 831
            </previous_transaction_hash>
            <index>0</index>
            <scriptSig>
                <signature>agency's signature</signature>
                <serialized_script>
                    {1 [user C's public key] [agency's public key] 2
                    OP_CHECKMULTISIG}
                </serialized_script>
            </scriptSig>
        </input>
        <output>
            <value>5000000000</value>
            <scriptPubKey>
                OP_HASH160
                [20-byte-hash of {1 [unwind address] [agency's public key] 2
                OP_CHECKMULTISIG}]
                OP_EQUAL
            </scriptPubKey>
        </output>
    </blockchain_transaction_data>
</agency_blockchain_transaction_request>
```

A transaction processing (TP) component 853 may verify that a specially formatted agency blockchain transaction request compatible with the agency oversight configured blockchain was received and/or may facilitate transaction processing. See FIG. 9 for additional details regarding the TP component.

The SDTD server may send a transaction confirmation 857 to the agency to inform the agency whether the agency blockchain transaction was processed successfully. In one implementation, the transaction confirmation may include data such as a response identifier, a status, and/or the like. In one embodiment, the SDTD server may provide the following example transaction confirmation, substantially in the form of a HTTP(S) POST message including XML-formatted data, as provided below:

```
POST /transaction_confirmation.php HTTP/1.1
Host: www.server.com
Content-Type: Application/XML
Content-Length: 667
<?XML version = "1.0" encoding = "UTF-8"?>
<transaction_confirmation>
    <response_identifier>ID_response_14</response_identifier>
    <status>OK</status>
</transaction_confirmation>
```

The agency may send an agency action notification 861 to users utilizing the agency oversight configured blockchain who were affected by the agency action. The agency action notification may be used to inform these users (e.g., user A, user B, user C) regarding the agency action (e.g., that the specified transaction was unwound and crypto tokens transferred). For example, the agency action notification may be displayed using a SDTD web site, application (e.g., a mobile app), sent via SMS, sent via email, and/or the like.

FIG. 9 shows a logic flow diagram illustrating embodiments of a transaction processing (TP) component for the SDTD. In FIG. 9, a mutable blockchain transaction processing request may be obtained at 901. For example, the mutable blockchain transaction processing request may be obtained as a result of a user sending a mutable blockchain transaction request to add a transaction to an agency oversight configured blockchain.

A transaction script associated with the transaction may be determined at 905. In one implementation, the mutable blockchain transaction request may be parsed (e.g., using PHP commands) to determine the value of the scriptPubKey field. For example, the scriptPubKey field may include a redeem script (e.g., {1 [user B's public kg] [agency's public key] 2 OP_CHECKMULTISIG}) and a 20 byte hash of the redeem script. In other implementations, Etherium, smart contracts, and/or the like may be utilized, and an analogous transaction script may be determined.

A determination may be made at 909 whether the transaction has a compliant format. In one implementation, this determination may be made based on the redeem script (e.g., whether the redeem script is a 1-of-n multisignature (multisig) script). In other implementations, Etherium, smart contracts, and/or the like may be utilized, and an analogous determination may be made. If the transaction is not in a compliant format, the transaction may be rejected (e.g., not added to the blockchain) at 921.

If the transaction is in a compliant format, specified public keys associated with the redeem script may be determined at 913. In one implementation, the redeem script may be parsed (e.g., using PHP commands) to determine the public keys specified for the 1-of-n multisig.

A determination may be made at 917 whether a public key associated with the agency providing oversight over the agency oversight configured blockchain is one of the specified public keys. For example, having a public key associated with the agency specified for the 1-of-n multisig may ensure that the agency is able to unwind the transaction. In one implementation, this determination may be made by making an API call (e.g., to the agency) to check whether any of the specified public keys is associated with the agency. If none of the specified public keys is associated with the agency, the transaction may be rejected (e.g., not added to the blockchain) at 921.

If one of the specified public keys is associated with the agency, the transaction may be processed at 925. In one implementation, the transaction may be added to the blockchain (e.g., in a similar manner as a Bitcoin transaction). In other implementations, Etherium, smart contracts, and/or the like may be utilized, and the transaction may be processed in an analogous manner.

FIG. 10 shows a logic flow diagram illustrating embodiments of an agency action (AA) component for the SDTD. In FIG. 10, an agency action request may be obtained at 1001. For example, the agency action request may be obtained as a result of a user (e.g., user A) requesting that the agency unwind a specified mutable blockchain transaction (e.g., the transaction associated with the mutable blockchain transaction request 821).

A determination may be made at 1005 whether to grant the agency action request. In one implementation, the agency action request may be parsed (e.g., using PHP commands) to determine the reason for the request. If the reason is legitimate (e.g., the transaction was unauthorized), the request to unwind the transaction may be granted.

The transaction to unwind may be determined at 1009. In one implementation, the agency action request may be parsed (e.g., using PHP commands) to determine a transaction identifier of the unwind transaction (e.g., the transaction identifier associated with the mutable blockchain transaction request 821).

An unwind amount may be determined at 1013. For example, the unwind amount may be the amount of crypto tokens that should be returned to the requesting user (e.g., the full amount associated with the unwind transaction, a partial amount). In one implementation, the agency action request may be parsed (e.g., using PHP commands) to determine the unwind amount.

An unwind address for crypto tokens may be determined at 1015. For example, the unwind address may be an address associated with the requesting user where unwound crypto tokens should be deposited. In one implementation, the agency action request may be parsed (e.g., using PHP commands) to determine the unwind address.

Affected transactions may be determined at 1017. In one embodiment, the crypto tokens associated with the unwind transaction may be unspent. As such, the unwind transaction may be the affected transaction (e.g., user B has not spent the crypto tokens, and the crypto tokens may be transferred from the multisig address associated with the mutable blockchain transaction request 821). In another embodiment, the crypto tokens associated with the unwind transaction may be spent. As such, transactions associated with the crypto tokens being spent (e.g., the transaction associated with the mutable blockchain transaction request 831 in which user B sent the crypto tokens to user C) for which the crypt tokens are unspent may be the affected transactions. In one implementation, the affected transactions may be determined by analyzing the agency oversight configured blockchain to determine transactions with unspent crypt tokens that originated from the unwind transaction. See FIG. 11 for an example of determining affected transactions.

A determination may be made at 1021 whether there remain affected transactions to process. In one implementation, each of the affected transactions may be processed. If there remain affected transactions to process, the next affected transaction may be selected at 1025. For example, the transaction associated with the mutable blockchain transaction request 831 may be selected.

Crypto tokens to transfer may be determined at 1029. In one implementation, the amount of crypto tokens to transfer may be determined based on (e.g., equal to) the amount of crypto tokens associated with the selected affected transaction that originated from the unwind transaction. For example, the amount of crypto tokens to transfer for the transaction associated with the mutable blockchain transaction request 831 may be 50 Bitcoins. See FIG. 11 for an example of determining the amount of crypto tokens to transfer.

An agency blockchain transaction request that facilitates transferring the determined amount of crypto tokens to the unwind address may be sent at 1033. In one implementation, separate agency blockchain transaction requests may be sent for each affected transaction (e.g., if there are multiple affected transactions, a plurality of unwind addresses may be utilized (e.g., an unwind address for each affected transaction) to transfer the crypto tokens). In another implementation, an agency blockchain transaction request may be utilized for the set of the affected transactions (e.g., the agency blockchain transaction request may include a plurality of input fields (e.g., an input field for each affected transaction)).

Affected entities may be notified at 1037. For example, the affected entities (e.g., user A, user B, user C) may be notified that the unwind transaction was unwound and/or how the affected entities were affected (e.g., crypto tokens sent to user C from user B were transferred back to user A because crypto tokens sent to user C originated from an unauthorized transaction).

FIG. 11 shows an exemplary use case for the SDTD. In FIG. 11, an exemplary set of mutable blockchain transactions recorded on an agency oversight configured blockchain is shown. Transaction 1 involved transferring 50 Bitcoins from user A to user B. Transaction 1 was unauthorized, however, and user A sent an agency action request to unwind transaction 1 and to transfer 50 Bitcoins back to user A.

The agency providing oversight over the agency oversight configured blockchain may analyze (e.g., by tracing transactions via previous transaction identifiers of input fields) the blockchain to determine transactions with unspent crypto tokens that originated from the unwind transaction. The agency may determine that the Bitcoins associated with transaction 1 were transferred as follows. Transaction 2 involved transferring 50 Bitcoins from user B to user C. Transaction 4 involved transferring 45 of the 50 Bitcoins (and 15 Bitcoins from transaction 3 for a total of 60 Bitcoins) from user C to user E, and transferring the remaining 5 (e.g., change) of the 50 Bitcoins from one address associated with user C to another address associated with user C. Transaction 5 involved transferring 60 Bitcoins, of which 45 originated from the unwind transaction, from user E to user F.

Accordingly, the agency may determine that the affected transactions are: transaction 4, which involves 5 unspent Bitcoins of user C that originated from the unwind transaction, and transaction 5, which involves 45 unspent Bitcoins of user F that originated from the unwind transaction. The agency may unwind transaction 1 by transferring these 50 Bitcoins associated with the affected transactions to an unwind address associated with user A.

FIGS. 12A-12B show a datagraph diagram illustrating embodiments of a data flow for the SDTD. In FIGS. 12A-12B, client A 1202 (e.g., of user A utilizing blockchain network 1) may send a regionally pliable blockchain transaction (RPBT) request 1221 to a blockchain network 1 node 1204 to facilitate processing (e.g., adding to the blockchains of blockchain network 1 and blockchain network 2) a blockchain transaction (e.g., the transaction may involve transferring crypto tokens (e.g., 50 Bitcoins) from user A to user B, who is utilizing blockchain network 2). For example, client A may be a desktop, a laptop, a tablet, a smartphone, and/or the like that is executing a client application. In one implementation, the RPBT request may include data such as a request identifier, blockchain transaction data, and/or the like. In one embodiment, client A may provide the following example RPBT request, substantially in the form of a HTTP(S) POST message including XML-formatted data, as provided below:

```
POST /RPBT_request.php HTTP/1.1
Host: www.server.com
Content-Type: Application/XML
Content-Length: 667
<?XML version = "1.0" encoding = "UTF-8"?>
<RPBT_request>
    <request_identifier>ID_request_21</request_identifier>
    <blockchain_transaction_data>
        <input>
        <source_blockchain_network>ID_blockchain_network_1
        </source_blockchain_network>
            <previous_transaction_hash>transaction identifier</previous_transaction_hash>
            <index>0</index>
            <scriptSig>
```

```
            <signature>user A's signature</signature>
            <serialized_script>
                {[user A's public key] OP_CHECKSIG}
            </serialized_script>
        </scriptSig>
    </input>
    <output>
<target_blockchain_network>ID_blockchain_network_2
</target_blockchain_network>
        <exchange_node>ID_exchange_node_4</exchange_node>
        <value>5000000000</value>
        <scriptPubKey>
            OP_HASH160
            [20-byte-hash of {[user B's public key]
            OP_CHECKSIG}]
            OP_EQUAL
        </scriptPubKey>
    </output>
</blockchain_transaction_data>
</RPBT_request>
```

A transaction processing (TP) component 1225 may utilize data provided in the RPBT request to facilitate (e.g., by forwarding the transaction to a relevant exchange node) transaction processing (e.g., transferring crypto tokens from blockchain network 1 to blockchain network 2). See FIG. 13 for additional details regarding the TP component.

The blockchain network 1 node may send a RPBT forward request 1229 to a blockchain network 1 exchange node 1206 to forward the RPBT request to the relevant exchange node.

A transaction processing (TP) component 1233 may utilize data provided in the forwarded RPBT request to facilitate (e.g., by processing the source blockchain network portion of the transaction, and/or by generating an inter-blockchain exchange request for an exchange node of the target blockchain network) transaction processing (e.g., transferring crypto tokens from blockchain network 1 to blockchain network 2). See FIG. 13 for additional details regarding the TP component.

The blockchain network 1 exchange node may send an inter-blockchain exchange request 1237 to a blockchain network 2 exchange node 1208 to facilitate transaction processing. In one implementation, the inter-blockchain exchange request may include data such as a request identifier, blockchain transaction data, and/or the like. In one embodiment, the blockchain network 1 exchange node may provide the following example inter-blockchain exchange request, substantially in the form of a HTTP(S) POST message including XML-formatted data, as provided below:

```
POST /inter-blockchain_exchange_request.php HTTP/1.1
Host: www.server.com
Content-Type: Application/XML
Content-Length: 667
<?XML version = "1.0" encoding = "UTF-8"?>
<inter-blockchain_exchange_request>
    <request_identifier>ID_request_23</request_identifier>
    <blockchain_transaction_data>
        <input>
    <source_blockchain_network>ID_blockchain_network_1
    </source_blockchain_network>
            <source_secured_data>
                proof that source crypto tokens are secured (e.g., sent to
a special address
                from which crypto tokens may not be retrieved)
            </source_secured_data>
            <previous_transaction_hash>transaction
identifier</previous_transaction_hash>
            <index>0</index>
            <scriptSig>
                <signature>user A's signature</signature>
                <serialized_script>
                    {[user A's public key] OP_CHECKSIG}
                </serialized_script>
            </scriptSig>
        </input>
        <output>
    <target_blockchain_network>ID_blockchain_network_2
    </target_blockchain_network>
            <exchange_node>ID_exchange_node_4</exchange_node>
            <value>5000000000</value>
            <converted_value>10000000000</converted_value>
            <scriptPubKey>
                OP_HASH160
                [20-byte-hash of {[user B's public key]
                OP_CHECKSIG}]
                OP_EQUAL
            </scriptPubKey>
        </output>
    </blockchain_transaction_data>
</inter-blockchain_exchange_request>
```

An inter-blockchain exchange processing (IEP) component 1241 may utilize data provided in the inter-blockchain exchange request to facilitate (e.g., by processing the target blockchain network portion of the transaction, and/or by forwarding the transaction to a relevant exchange node (e.g., if the current blockchain network is an intermediary forwarding the transaction to its ultimate destination blockchain network)) transaction processing (e.g., transferring crypto tokens from blockchain network 1 to blockchain network 2). See FIG. 14 for additional details regarding the IEP component.

The blockchain network 2 exchange node may send an inter-blockchain exchange response 1245 to the blockchain network 1 exchange node to provide a transaction confirmation to the blockchain network 1 exchange node. In one implementation, the inter-blockchain exchange response may include data such as a response identifier, a status, and/or the like. In one embodiment, the blockchain network 2 exchange node may provide the following example inter-blockchain exchange response, substantially in the form of a HTTP(S) POST message including XML-formatted data, as provided below:

```
POST /inter-blockchain_exchange_response.php HTTP/1.1
Host: www.server.com
Content-Type: Application/XML
Content-Length: 667
<?XML version = "1.0" encoding = "UTF-8"?>
<inter-blockchain_exchange_response>
    <response_identifier>ID_response_23</response_identifier>
    <status>Transaction Processed Successfully</status>
</inter-blockchain_exchange_response>
```

The blockchain network 1 exchange node may send a RPBT forward response 1249 to the blockchain network 1 node to forward the inter-blockchain exchange response to the blockchain network 1 node.

The blockchain network 1 node may send a RPBT confirmation 1253 to client A to inform user A whether the RPBT was processed successfully. In one implementation, the RPBT confirmation may include data such as a response identifier, a status, and/or the like. In one embodiment, the blockchain network 1 node may provide the following example RPBT confirmation, substantially in the form of a HTTP(S) POST message including XML-formatted data, as provided below:

```
POST /RPBT_confirmation.php HTTP/1.1
Host: www.server.com
Content-Type: Application/XML
Content-Length: 667
<?XML version = "1.0" encoding = "UTF-8"?>
<RPBT_confirmation>
    <response_identifier>ID_response_21</response_identifier>
    <status>OK</status>
</RPBT_confirmation>
```

```
POST /RPBT_confirmation.php HTTP/1.1
Host: www.server.com
Content-Type: Application/XML
Content-Length: 667
<?XML version = "1.0" encoding = "UTF-8"?>
<RPBT_confirmation>
    <response_identifier>ID_response_24</response_identifier>
    <status>OK</status>
</RPBT_confirmation>
```

Client B 1210 (e.g., of user B utilizing blockchain network 2) may send a RPBT request 1257 to the blockchain network 2 exchange node to facilitate processing (e.g., adding to the blockchain of blockchain network 2) a blockchain transaction (e.g., the transaction may involve transferring crypto tokens (e.g., 50 Bitcoins received from user A) from user B to user C, who is also utilizing blockchain network 2). For example, client B may be a desktop, a laptop, a tablet, a smartphone, and/or the like that is executing a client application. In one implementation, the RPBT request may include data such as a request identifier, blockchain transaction data, and/or the like. In one embodiment, client B may provide the following example RPBT request, substantially in the form of a HTTP(S) POST message including XML-formatted data, as provided below:

```
POST /RPBT_request.php HTTP/1.1
Host: www.server.com
Content-Type: Application/XML
Content-Length: 667
<?XML version = "1.0" encoding = "UTF-8"?>
<RPBT_request>
    <request_identifier>ID_request_24</request_identifier>
    <blockchain_transaction_data>
        <input>
            <previous_transaction_hash>transaction
identifier</previous_transaction_hash>
            <index>0</index>
            <scriptSig>
                <signature>user B's signature</signature>
                <serialized_script>
                    {[user B's public key] OP_CHECKSIG}
                </serialized_script>
            </scriptSig>
        </input>
        <output>
            <value>5000000000</value>
            <scriptPubKey>
                OP_HASH160
                [20-byte-hash of {[user C's public key]
                OP_CHECKSIG}]
                OP_EQUAL
            </scriptPubKey>
        </output>
    </blockchain_transaction_data>
</RPBT_request>
```

A transaction processing (TP) component 1261 may utilize data provided in the RPBT request to facilitate transaction processing (e.g., processing an ordinary transaction on blockchain network 2). See FIG. 13 for additional details regarding the TP component.

The blockchain network 2 exchange node may send a RPBT confirmation 1265 to client B to inform user B whether the RPBT was processed successfully. In one implementation, the RPBT confirmation may include data such as a response identifier, a status, and/or the like. In one embodiment, the blockchain network 2 exchange node may provide the following example RPBT confirmation, substantially in the form of a HTTP(S) POST message including XML-formatted data, as provided below:

FIG. 13 shows a logic flow diagram illustrating embodiments of a transaction processing (TP) component for the SDTD. In FIG. 13, a regionally pliable blockchain transaction (RPBT) processing request may be obtained at 1301. For example, the RPBT processing request may be obtained as a result of a user sending a RPBT request for a transaction to transfer crypto tokens to another user, who is utilizing a different blockchain network (e.g., a blockchain network serving a different region (e.g., geographic area, unit in an organization, sidechain)).

A determination may be made at 1305 whether the transaction involves an inter-blockchain exchange (e.g., an inter-blockchain network transaction). In one embodiment, the transaction involves an inter-blockchain exchange if crypto tokens are transferred from a source blockchain network to a target blockchain network. In one implementation, this determination may be made by parsing (e.g., using PHP commands) the RPBT request to determine whether the transaction is in an inter-blockchain network transaction format (e.g., the transaction specifies a source blockchain network identifier of the source blockchain network and a target blockchain network identifier of the target blockchain network). If the transaction is not an inter-blockchain network transaction, the transaction may be processed at as an ordinary transaction. In one implementation, the transaction may be added to the blockchain (e.g., in a similar manner as a Bitcoin transaction).

If the transaction is an inter-blockchain network transaction, a target blockchain network identifier may be determined at 1313. In one implementation, the RPBT request may be parsed (e.g., using PHP commands) to determine the target blockchain network identifier (e.g., ID_blockchain_network_2).

A determination may be made at 1317 whether the node executing the TP component is a relevant exchange node. In one embodiment, the node is a relevant exchange node if the node, of the source blockchain network, is configured to interact with an exchange node of the target blockchain network to facilitate crypto tokens exchange between the two networks. In one implementation, the node may check a configuration setting to determine whether it is configured to interact with an exchange node of the blockchain network identified by the target blockchain network identifier. In another embodiment, the node is a relevant exchange node if the node is specified as the exchange point between the source blockchain network and the target blockchain network. In one implementation, the RPBT request may be parsed (e.g., using PHP commands) to determine whether the exchange_node field specifies the node identifier of the node.

If the node is not a relevant exchange node, a relevant exchange node may be determined at 1321. In one implementation, a relevant exchange node may be determined based on the target blockchain network identifier (e.g., the closest (e.g., in terms of network proximity) relevant exchange node configured to interact with the target blockchain network). In another implementation, a relevant exchange node may be determined based on the value of the exchange_node field in the RPBT request. The transaction may be forwarded to the relevant exchange node at 1325. In one implementation, a network addressing table may be consulted to determine the next hop node, on a route to the relevant exchange node, to which the transaction should be forwarded. In another implementation, the transaction may be forwarded to the relevant exchange node identified by the exchange_node field.

If the node is a relevant exchange node, input and/or output associated with the RPBT transaction may be validated at 1329. In one implementation, input data (e.g., input field in the RPBT request) may be validated to confirm that the input is valid (e.g., to confirm that the user has the authority to transfer the source crypto tokens). In another implementation, output data (e.g., output field in the RPBT request) may be validated to confirm that the output is valid (e.g., includes a valid script in the scriptPubKey field) on the target blockchain network.

A target blockchain network exchange node on the target blockchain network may be determined at 1337. In one implementation, the node may check a configuration setting to determine the target blockchain network exchange node (e.g., the node may be configured to communicate with a specific exchange node on the target blockchain network). In another implementation, the node may determine the target blockchain network exchange node dynamically (e.g., determine exchange node with the best latency, determine exchange node with the best crypto tokens exchange rate).

A determination may be made at 1341, whether there is an inter-blockchain network exchange rate (e.g., other than 1 to 1) between crypto tokens of the source blockchain network and crypto tokens of the target blockchain network, and/or whether the node is responsible for determining the inter-blockchain network exchange rate. In one implementation, the node may check a configuration setting to make this determination. If so, the inter-blockchain network exchange rate may be determined at 1345. In one implementation, a request may be sent to a third party market maker to determine the inter-blockchain network exchange rate. A target crypto tokens amount to be provided to the other user on the target blockchain network may be determined at 1349. In one implementation, the crypto tokens amount on the source blockchain network specified in the value field of the output may be converted to a crypto tokens amount on the target blockchain network using a calculation based on the inter-blockchain network exchange rate.

The portion of the transaction associated with the source blockchain network may be processed at 1353. In one embodiment, a securing transaction may be made on the source blockchain network to ensure that the source crypto tokens may not be reused on the source blockchain network. In one implementation, a transaction entry that transfers the source crypto tokens to an address on the source blockchain network from which crypto tokens may not be transferred (e.g., by anyone, by anyone except an agency providing oversight) may be utilized (e.g., added to the blockchain of the source blockchain network).

An inter-blockchain exchange request may be generated at 1357. In one embodiment, the inter-blockchain exchange request may be configured to allow the target blockchain network exchange node to verify that the portion of the transaction associated with the source blockchain network was processed, and/or to process the portion of the transaction associated with the target blockchain network. In one implementation, the inter-blockchain exchange request may include data such as data provided in the RPBT request, proof that the source crypto tokens may not be reused on the source blockchain network (e.g., the transaction identifier of the securing transaction), the calculated crypto tokens amount on the target blockchain network, and/or the like.

FIG. 14 shows a logic flow diagram illustrating embodiments of an inter-blockchain exchange processing (IEP) component for the SDTD. In FIG. 14, an inter-blockchain exchange processing request may be obtained at 1401. For example, the inter-blockchain exchange processing request may be obtained by an exchange node of a target blockchain network as a result of obtaining an inter-blockchain exchange request from an exchange node of a source blockchain network for a regionally pliable blockchain transaction (RPBT) to transfer crypto tokens from a user utilizing the source blockchain network to another user utilizing the target blockchain network.

A source blockchain network identifier of a source blockchain network may be determined at 1405. In one implementation, the inter-blockchain exchange request may be parsed (e.g., using PHP commands) to determine the source blockchain network identifier (e.g., ID_blockchain_network_1).

Input and/or output associated with the RPBT transaction may be validated at 1409. In one implementation, input data (e.g., input field in the inter-blockchain exchange request) may be validated to confirm that the input is valid (e.g., to confirm that the user has the authority to transfer the source crypto tokens). In another implementation, output data (e.g., output field in the inter-blockchain exchange request) may be validated to confirm that the output is valid (e.g., includes a valid script in the scriptPubKey field) on the target blockchain network.

A determination may be made at 1413 whether the source crypto tokens were secured (e.g., to confirm that the source crypto tokens may not be reused on the source blockchain network). In one embodiment, proof that the source crypto tokens may not be reused on the source blockchain network may be verified. In one implementation, the inter-blockchain exchange request may be parsed (e.g., using PHP commands) to determine an identifier of a securing transaction that ensures that the source crypto tokens may not be reused on the source blockchain network. The identifier of the securing transaction may be utilized to obtain associated transaction data to confirm that the securing transaction is a valid transaction on the source blockchain network that secures the source crypto tokens. If the source crypto tokens were not secured, the transaction may be rejected (e.g., not added to the blockchain of the target blockchain network) at 1417.

If the source crypto tokens were secured, a determination may be made at 1421, whether there is an inter-blockchain network exchange rate (e.g., other than 1 to 1) between crypto tokens of the source blockchain network and crypto tokens of the target blockchain network, and/or whether the exchange node of the target blockchain network is responsible for determining the inter-blockchain network exchange rate (e.g., instead of the exchange node of the source blockchain network, to confirm the converted value provided by the exchange node of the source blockchain network). In one implementation, the exchange node of the target blockchain network may check a configuration setting to make this determination. If so, the inter-blockchain network exchange rate may be determined at 1425. In one implementation, a request may be sent to a third party market maker to determine the inter-blockchain network exchange rate. A target crypto tokens amount to be provided to the other user on the target blockchain network may be determined at 1429. In one implementation, the crypto tokens amount on the source blockchain network specified in the value field of the output may be converted to a crypto tokens amount on the target blockchain network using a calculation based on the inter-blockchain network exchange rate. In another implementation, the calculated crypto tokens amount on the target blockchain network may be compared to the converted value specified by the exchange node of the source blockchain network in the converted_value field to verify the provided converted value.

The portion of the transaction associated with the target blockchain network may be processed at 1433. In one embodiment, the exchange node of the target blockchain network may be configured to recognize the secured source crypto tokens as valid transaction input. Accordingly, the transaction to transfer crypto tokens (e.g., the specified value amount, the converted value amount) to the other user may be added to the blockchain of the target blockchain network. In one implementation, the transaction may be added to the blockchain of the target blockchain network in its original form. For example, other nodes in the target blockchain network may be configured to be able to validate such exchange transactions. In another implementation, the transaction may be added to the blockchain of the target blockchain network in a modified form in accordance with the rules of the target blockchain network. For example, the exchange node of the target blockchain network may add a cryptographic signature to the input to indicate that the input was validated by the exchange node, and other nodes in the target blockchain network may be configured to utilize the cryptographic signature to validate the input when validating such inter-blockchain exchange transactions. In some embodiments, the target blockchain network may be an intermediary blockchain network (e.g., blockchain network 3) utilized to transfer crypto tokens (e.g., from blockchain network 1 to blockchain network 2 via blockchain network 3) to the ultimate destination blockchain network (e.g., blockchain network 2). Accordingly, the intermediary blockchain network may process the transaction (e.g., add to the blockchain of the intermediary blockchain network) and generate an inter-blockchain exchange request to the next hop blockchain network on a route to the ultimate destination blockchain network.

FIG. 15 shows an exemplary blockchain exchange model for the SDTD. In FIG. 15, two blockchain networks, blockchain network 1 and blockchain network 2, are illustrated. Each of the two blockchain networks operates with different nodes (e.g., nodes 1 through 8 of blockchain network 1 are different from nodes 1 through 8 of blockchain network 2) and entities (e.g., blockchain network 1 serves one region (e.g., eastern) and blockchain network 2 serves another region (e.g., western)), and maintains a separate digital ledger (e.g., blockchain) Blockchain network 1 contains eight nodes with each node having a reasonable level of interconnections with other peers (e.g., represented by solid lines). For simplicity, blockchain network 2 also contains eight nodes with each node having a reasonable level of interconnections with other peers (e.g., represented by solid lines), but representing different assets, valuations, rules of governance, and/or the like. Each node validates transactions and maintains a copy of the digital ledger for their respective blockchain network. Node 2 and node 4 of blockchain network 1, and node 6 and node 8 of blockchain network 2 are exchange nodes that facilitate inter-blockchain network transactions between the two blockchain networks (e.g., via pathways represented by dashed lines).

Additional Alternative Embodiment Examples

The following alternative example embodiments provide a number of variations of some of the core principles already discussed for expanded color on the abilities of the SDTD.

Dynamic Blockchain Asset Interchange

As a public or private ledger, a blockchain is an immutable record of transactions between entities organized into larger blocks of data, recorded in a linear order using cryptographic techniques and maintained in a distributed fashion by multiple computer nodes accessible through the public internet. It is of great interest to develop a single, universally useable and scalable digital currency using blockchain technology to maintain an immutable history of all transactions.

Different organizations/entities support one or another implementation of incompatible blockchain ledger solutions to record value transfer quickly between participating parties and to maintain an immutable record of transactions specific to their business. Any data or representation of value may be recorded in a transaction on these systems and once recorded in the blockchain it becomes an ironclad record of everything that happens to that asset and data.

The various implementations exhibit technical limitations in computing capability, network bandwidth, and transaction storage resulting in issues of scalability based on a premise of a single blockchain. Each has some concept or desirability of maintaining privacy of the data. Scalability is a major technical challenge and instead of a single all-encompassing blockchain to store digital assets, hundreds or thousands of such systems that interact automatically through exchange mechanisms would be more robust.

The SDTD creates multiple points of exchange on different blockchains, containing one or more nodes that establish contact with at least one node from another blockchain network. Transactions designated for the external blockchain(s) contain agreed upon source and destination blockchain network identifiers as part of transaction source and recipient addressing information in addition to appropriate data values for assets being transferred. The source network transaction provides attestation of ownership, identifies the exchange point between the two networks and includes additional information to allow the creation of a new transaction on the destination network attesting to the new owner relationship.

The SDTD may create a transaction entry on the source digital ledger to ensure that the asset cannot be reused on that blockchain while creating a new transaction on the destination ledger that can continue to be used within that system. In addition to straight forward transfer of asset information between systems, the SDTD may also utilize third party market makers to implement exchange rates between the different digital ledger systems.

In one embodiment, the multitude of blockchains (e.g., public and private) may be thought of as a system of bubbles with some immediately adjacent to each other and others spanning some distance across the system. In addition to adjacency it is possible that some bubbles are enclosed within larger bubbles. Like bubbles, minor adjustments to one bubble directly affect neighboring bubbles and those subsequently interact with other bubbles further away or contained within other bubbles. Each bubble behaves according to its individual attributes of size, composition and other characteristics. Without a central bubble controlling the interactions, an equilibrium is reached based on the characteristics of each bubble. This automatic adjustment would be a result of improved interaction between blockchains.

As a simple illustration, two blockchains are shown in FIG. 15 that operate with completely different nodes and entities, maintaining separate digital ledgers. The first blockchain contains eight nodes with each node having a reasonable level of interconnections with other peers. For simplicity, the second blockchain also contains eight nodes with each node acting in much the same way as the first blockchain described above, but representing different assets, valuations and possibly different rules of governance.

Each node is validating transactions, the cryptographically secure blocks, and maintaining a copy of the digital ledger for their respective blockchain network. The nodes in the network are exchanging this information with typical pathways depicted by solid lines on the diagram. The four shaded exchange nodes are exchanging additional information and data (dashed lines) between nodes in the two separate networks as directed by the SDTD as described above.

Transactions contain cryptographic signature information referencing one or more input values and assets as the source for the transaction with directions on how to unlock the source value. In addition, one or more output cryptographic references and directions on how to validate the output is included for use in a later transaction. The directions to validate input and output operations could utilize single or multiparty cryptographic signatures, smart contracts, and/or the like for secure use and security such as for escrow requirements.

For exchange between the two networks, the inputs for these transaction have to be valid entries on the source blockchain and one or more outputs could be directed for transfer to the other blockchain. The exchange node(s) may advertise the ability to interact with one or more additional blockchains and coordinate the completion of a transaction input on one blockchain and initiate the transaction output on a separate blockchain. The structure of transactions to accomplish the exchange may effectively remain the same with the addition of agreed to identifiers that relate cryptographic addresses of different blockchain networks.

Each network may have a registered identifier or address that may allow the exchange nodes that interconnect different blockchains to recognize a transaction that is destined to another blockchain In addition, these nodes may maintain a network addressing table that indicates multiple routing pathways across the broader structure of blockchains for improved efficiency.

SDTD Controller

FIG. 16 shows a block diagram illustrating embodiments of a SDTD controller. In this embodiment, the SDTD controller 1601 may serve to aggregate, process, store, search, serve, identify, instruct, generate, match, and/or facilitate interactions with a computer through information technology technologies, and/or other related data.

Typically, users, which may be people and/or other systems, may engage information technology systems (e.g., computers) to facilitate information processing. In turn, computers employ processors to process information; such processors 1603 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory 1629 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the SDTD controller 1601 may be connected to and/or communicate with entities such as, but not limited to: one or more users from peripheral devices 1612 (e.g., user input devices 1611); an optional cryptographic processor device 1628; and/or a communications network 1613.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The SDTD controller 1601 may be based on computer systems that may comprise, but are not limited to, components such as: a computer systemization 1602 connected to memory 1629.

Computer Systemization

A computer systemization 1602 may comprise a clock 1630, central processing unit ("CPU(s)" and/or "processor(s)" (these terms are used interchangeable throughout the disclosure unless noted to the contrary)) 1603, a memory 1629 (e.g., a read only memory (ROM) 1606, a random access memory (RAM) 1605, etc.), and/or an interface bus 1607, and most frequently, although not necessarily, are all interconnected and/or communicating through a system bus 1604 on one or more (mother)board(s) 1602 having conductive and/or otherwise transportive circuit pathways through which instructions (e.g., binary encoded signals) may travel to effectuate communications, operations, storage, etc. The computer systemization may be connected to a power source 1686; e.g., optionally the power source may be internal. Optionally, a cryptographic processor 1626 may be connected to the system bus. In another embodiment, the cryptographic processor, transceivers (e.g., ICs) 1674, and/or sensor array (e.g., accelerometer, altimeter, ambient light, barometer, global positioning system (GPS) (thereby allowing SDTD controller to determine its location), gyroscope, magnetometer, pedometer, proximity, ultra-violet sensor, etc.) 1673 may be connected as either internal and/or external peripheral devices 1612 via the interface bus I/O 1608 (not pictured) and/or directly via the interface bus 1607. In turn, the transceivers may be connected to antenna(s) 1675, thereby effectuating wireless transmission and reception of various communication and/or sensor protocols; for example the antenna(s) may connect to various transceiver chipsets (depending on deployment needs), including: Broadcom BCM4329FKUBG transceiver chip (e.g., providing 802.11n, Bluetooth 2.1+EDR, FM, etc.); a Broadcom BCM4752 GPS receiver with accelerometer, altimeter, GPS, gyroscope, magnetometer; a Broadcom BCM4335 transceiver chip (e.g., providing 2G, 3G, and 4G long-term evolution (LTE) cellular communications; 802.11ac, Bluetooth 4.0 low energy (LE) (e.g., beacon features)); a Broadcom BCM43341 transceiver chip (e.g., providing 2G, 3G and 4G LTE cellular communications; 802.11 g/, Bluetooth 4.0, near field communication (NFC), FM radio); an Infineon Technologies X-Gold 618-PMB9800 transceiver chip (e.g., providing 2G/3G HSDPA/HSUPA communications); a MediaTek MT6620 transceiver chip (e.g., providing 802.11a/ac/b/g/n, Bluetooth 4.0 LE, FM, GPS; a Lapis Semiconductor ML8511 UV sensor; a maxim integrated MAX44000 ambient light and infrared proximity sensor; a Texas Instruments WiLink WL1283 transceiver chip (e.g., providing 802.11n, Bluetooth 3.0, FM, GPS); and/or the like. The system clock typically has a crystal oscillator and generates a base signal through the computer systemization's circuit pathways. The clock is typically coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. The CPU is often packaged in a number of formats varying from large super-computer(s) and mainframe(s) computers, down to mini computers, servers, desktop computers, laptops, thin clients (e.g., Chromebooks), netbooks, tablets (e.g., Android, iPads, and Windows tablets, etc.), mobile smartphones (e.g., Android, iPhones, Nokia, Palm and Windows phones, etc.), wearable device(s) (e.g., watches, glasses, goggles (e.g., Google Glass), etc.), and/or the like. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 1629 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon, Duron and/or Opteron; Apple's A series of processors (e.g., A5, A6, A7, A8, etc.); ARM's application, embedded and secure processors; IBM and/or Motorola's DragonBall and PowerPC; IBM's and Sony's Cell processor; Intel's 80X86 series (e.g., 80386, 80486), Pentium, Celeron, Core (2) Duo, i series (e.g., i3, i5, i7, etc.), Itanium, Xeon, and/or XScale; Motorola's 680X0 series (e.g., 68020, 68030, 68040, etc.); and/or the like processor(s). The CPU interacts with memory through instruction passing through conductive and/or transportive conduits (e.g., (printed) electronic and/or optic circuits) to execute stored instructions (i.e., program code) according to conventional data processing techniques. Such instruction passing facilitates communication within the SDTD controller and beyond through various interfaces. Should processing requirements dictate a greater amount speed and/or capacity, distributed processors (e.g., see Distributed SDTD below), mainframe, multi-core, parallel, and/or super-computer architectures may similarly be employed. Alternatively, should deployment requirements dictate greater portability, smaller mobile devices (e.g., Personal Digital Assistants (PDAs)) may be employed.

Depending on the particular implementation, features of the SDTD may be achieved by implementing a microcontroller such as CAST's R8051XC2 microcontroller; Intel's MCS 51 (i.e., 8051 microcontroller); and/or the like. Also, to implement certain features of the SDTD, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the SDTD component collection (distributed or otherwise) and/or features may be implemented via the microprocessor and/or via embedded components; e.g., via ASIC, coprocessor, DSP, FPGA, and/or the like. Alternately, some implementations of the SDTD may be implemented with embedded components that are configured and used to achieve a variety of features or signal processing.

Depending on the particular implementation, the embedded components may include software solutions, hardware solutions, and/or some combination of both hardware/software solutions. For example, SDTD features discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects can be programmed by the customer or designer, after the FPGA is manufactured, to implement any of the SDTD features. A hierarchy of programmable interconnects allow logic blocks to be interconnected as needed by the SDTD system designer/administrator, somewhat like a one-chip programmable breadboard. An FPGA's logic blocks can be programmed to perform the operation of basic logic gates such as AND, and XOR, or more complex combinational operators such as decoders or mathematical operations. In most FPGAs, the logic blocks also include memory elements, which may be circuit flip-flops or more complete blocks of memory. In some circumstances, the SDTD may be developed on regular FPGAs and then migrated into a fixed version that more resembles ASIC implementations. Alternate or coordinating implementations may migrate SDTD controller features to a final ASIC instead of or in addition to FPGAs. Depending on the implementation all of the aforementioned embedded components and microprocessors may be considered the "CPU" and/or "processor" for the SDTD.

Power Source

The power source 1686 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 1686 is connected to at least one of the interconnected subsequent components of the SDTD thereby providing an electric current to all subsequent components. In one example, the power source 1686 is connected to the system bus component 1604. In an alternative embodiment, an outside power source 1686 is provided through a connection across the I/O 1608 interface. For example, a USB and/or IEEE 1394 connection carries both data and power across the connection and is therefore a suitable source of power.

Interface Adapters

Interface bus(ses) 1607 may accept, connect, and/or communicate to a number of interface adapters, conventionally although not necessarily in the form of adapter cards, such as but not limited to: input output interfaces (I/O) 1608, storage interfaces 1609, network interfaces 1610, and/or the like. Optionally, cryptographic processor interfaces 1627 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 1609 may accept, communicate, and/or connect to a number of storage devices such as, but not limited to: storage devices 1614, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 1610 may accept, communicate, and/or connect to a communications network 1613. Through a communications network 1613, the SDTD controller is accessible through remote clients 1633*b* (e.g., computers with web browsers) by users 1633*a*. Network interfaces may employ connection protocols such as, but not limited to: direct connect, Ethernet (thick, thin, twisted pair 10/100/1000/10000 Base T, and/or the like), Token Ring, wireless connection such as IEEE 802.11a-x, and/or the like. Should processing requirements dictate a greater amount speed and/or capacity, distributed network controllers (e.g., see Distributed SDTD below), architectures may similarly be employed to pool, load balance, and/or otherwise decrease/increase the communicative bandwidth required by the SDTD controller. A communications network may be any one and/or the combination of the following: a direct interconnection; the Internet; Interplanetary Internet (e.g., Coherent File Distribution Protocol (CFDP), Space Communications Protocol Specifications (SCPS), etc.); a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a cellular, WiFi, Wireless Application Protocol (WAP), I-mode, and/or the like); and/or the like. A network interface may be regarded as a specialized form of an input output interface. Further, multiple network interfaces 1610 may be used to engage with various communications network types 1613. For example, multiple network interfaces may be employed to allow for the communication over broadcast, multicast, and/or unicast networks.

Input Output interfaces (I/O) 1608 may accept, communicate, and/or connect to user, peripheral devices 1612 (e.g., input devices 1611), cryptographic processor devices 1628, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; touch interfaces: capacitive, optical, resistive, etc. displays; video interface: Apple Desktop Connector (ADC), BNC, coaxial, component, composite, digital, Digital Visual Interface (DVI), (mini) displayport, high-definition multimedia interface (HDMI), RCA, RF antennae, S-Video, VGA, and/or the like; wireless transceivers: 802.11a/ac/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One typical output device may include a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.).

Peripheral devices 1612 may be connected and/or communicate to I/O and/or other facilities of the like such as network interfaces, storage interfaces, directly to the interface bus, system bus, the CPU, and/or the like. Peripheral devices may be external, internal and/or part of the SDTD controller. Peripheral devices may include: antenna, audio devices (e.g., line-in, line-out, microphone input, speakers, etc.), cameras (e.g., gesture (e.g., Microsoft Kinect) detection, motion detection, still, video, webcam, etc.), dongles (e.g., for copy protection, ensuring secure transactions with a digital signature, and/or the like), external processors (for added capabilities; e.g., crypto devices 528), force-feedback devices (e.g., vibrating motors), infrared (IR) transceiver, network interfaces, printers, scanners, sensors/sensor arrays and peripheral extensions (e.g., ambient light, GPS, gyroscopes, proximity, temperature, etc.), storage devices, transceivers (e.g., cellular, GPS, etc.), video devices (e.g., goggles, monitors, etc.), video sources, visors, and/or the like. Peripheral devices often include types of input devices (e.g., cameras).

User input devices 1611 often are a type of peripheral device 512 (see above) and may include: card readers, dongles, finger print readers, gloves, graphics tablets, joysticks, keyboards, microphones, mouse (mice), remote controls, security/biometric devices (e.g., fingerprint reader, iris reader, retina reader, etc.), touch screens (e.g., capacitive, resistive, etc.), trackballs, trackpads, styluses, and/or the like.

It should be noted that although user input devices and peripheral devices may be employed, the SDTD controller may be embodied as an embedded, dedicated, and/or monitor-less (i.e., headless) device, wherein access would be provided over a network interface connection.

Cryptographic units such as, but not limited to, microcontrollers, processors 1626, interfaces 1627, and/or devices 1628 may be attached, and/or communicate with the SDTD controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other commercially available specialized cryptographic processors include: Broadcom's CryptoNetX and other Security Processors; nCipher's nShield; SafeNet's Luna PCI (e.g., 7100) series; Semaphore Communications' 40 MHz Roadrunner 184; Sun's Cryptographic Accelerators (e.g., Accelerator 6000 PCIe Board, Accelerator 500 Daughtercard); Via Nano Processor (e.g., L2100, L2200, U2400) line, which is capable of performing 500+MB/s of cryptographic instructions; VLSI Technology's 33 MHz 6868; and/or the like.

Memory

Generally, any mechanization and/or embodiment allowing a processor to affect the storage and/or retrieval of information is regarded as memory 1629. However, memory is a fungible technology and resource, thus, any number of memory embodiments may be employed in lieu of or in concert with one another. It is to be understood that the SDTD controller and/or a computer systemization may employ various forms of memory 1629. For example, a computer systemization may be configured wherein the operation of on-chip CPU memory (e.g., registers), RAM, ROM, and any other storage devices are provided by a paper punch tape or paper punch card mechanism; however, such an embodiment would result in an extremely slow rate of operation. In a typical configuration, memory 1629 will include ROM 1606, RAM 1605, and a storage device 1614. A storage device 1614 may be any conventional computer system storage. Storage devices may include: an array of devices (e.g., Redundant Array of Independent Disks (RAID)); a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); RAM drives; solid state memory devices (USB memory, solid state drives (SSD), etc.); other processor-readable storage mediums; and/or other devices of the like. Thus, a computer systemization generally requires and makes use of memory.

Component Collection

The memory 1629 may contain a collection of program and/or database components and/or data such as, but not limited to: operating system component(s) 1615 (operating system); information server component(s) 1616 (information server); user interface component(s) 1617 (user interface); Web browser component(s) 1618 (Web browser); database(s) 1619; mail server component(s) 1621; mail client component(s) 1622; cryptographic server component(s) 1620 (cryptographic server); the SDTD component(s) 1635; and/or the like (i.e., collectively a component collection). These components may be stored and accessed from the storage devices and/or from storage devices accessible through an interface bus. Although non-conventional program components such as those in the component collection, typically, are stored in a local storage device 1614, they may also be loaded and/or stored in memory such as: peripheral devices, RAM, remote storage facilities through a communications network, ROM, various forms of memory, and/or the like.

Operating System

The operating system component 1615 is an executable program component facilitating the operation of the SDTD controller. Typically, the operating system facilitates access of I/O, network interfaces, peripheral devices, storage devices, and/or the like. The operating system may be a highly fault tolerant, scalable, and secure system such as: Apple's Macintosh OS X (Server); AT&T Plan 9; Be OS; Blackberry's QNX; Google's Chrome; Microsoft's Windows 7/8; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/ CE/Millenium/Mobile/NT/Vista/XP (Server), Palm OS, and/or the like. Additionally, for robust mobile deployment applications, mobile operating systems may be used, such as: Apple's iOS; China Operating System COS; Google's Android; Microsoft Windows RT/Phone; Palm's WebOS; Samsung/Intel's Tizen; and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the SDTD controller to communicate with other entities through a communications network 1613. Various communication protocols may be used by the SDTD controller as a subcarrier transport mechanism for interaction, such as, but not limited to: multicast, TCP/IP, UDP, unicast, and/or the like.

Information Server

An information server component 1616 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the SDTD controller based on the remainder of the HTTP request. For example, a request such as http:// 123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the SDTD database 1619, operating systems, other program components, user interfaces, Web browsers, and/or the like.

Access to the SDTD database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the SDTD. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the SDTD as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as check boxes, cursors, menus, scrollers, and windows (collectively and commonly referred to as widgets) similarly facilitate the access, capabilities, operation, and display of data and computer hardware and operating system resources, and status. Operation interfaces are commonly called user interfaces. Graphical user interfaces (GUIs) such as the Apple's iOS, Macintosh Operating System's Aqua; IBM's OS/2; Google's Chrome (e.g., and other webbrowser/ cloud based client OSs); Microsoft's Windows varied UIs 2000/2003/3.1/95/98/CE/Millenium/Mobile/NT/Vista/XP (Server) (i.e., Aero, Surface, etc.); Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery(UI), MooTools, Prototype, script.aculo.us, SWFObject, Yahoo! User Interface, any of which may be used and) provide a baseline and means of accessing and displaying information graphically to users.

A user interface component 1617 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 1618 is a stored program component that is executed by a CPU. The Web browser may be a conventional hypertext viewing application such as Apple's (mobile) Safari, Google's Chrome, Microsoft Internet Explorer, Mozilla's Firefox, Netscape Navigator, and/or the like. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Also, in place of a Web browser and information server, a combined application may be developed to perform similar operations of both. The combined application would similarly affect the obtaining and the provision of information to users, user agents, and/or the like from the SDTD enabled nodes. The combined application may be nugatory on systems employing standard Web browsers.

Mail Server

A mail server component 1621 is a stored program component that is executed by a CPU 1603. The mail server may be a conventional Internet mail server such as, but not limited to: dovecot, Courier IMAP, Cyrus IMAP, Maildir, Microsoft Exchange, sendmail, and/or the like. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the SDTD. Alternatively, the mail server component may be distributed out to mail service providing entities such as Google's cloud services (e.g., Gmail and notifications may alternatively be provided via messenger services such as AOL's Instant Messenger, Apple's iMessage, Google Messenger, SnapChat, etc.).

Access to the SDTD mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 1622 is a stored program component that is executed by a CPU 1603. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 1620 is a stored program component that is executed by a CPU 1603, cryptographic processor 1626, cryptographic processor interface 1627, cryptographic processor device 1628, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash operation), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), Transport Layer Security (TLS), and/or the like. Employing such encryption security protocols, the SDTD may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the SDTD component to engage in secure transactions if so desired. The cryptographic component facilitates the secure accessing of resources on the SDTD and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The SDTD Database

The SDTD database component 1619 may be embodied in a database and its stored data. The database is a stored program component, which is executed by the CPU; the stored program component portion configuring the CPU to process the stored data. The database may be a conventional, fault tolerant, relational, scalable, secure database such as MySQL, Oracle, Sybase, etc. may be used. Additionally, optimized fast memory and distributed databases such as IBM's Netezza, MongoDB's MongoDB, opensource Hadoop, opensource VoltDB, SAP's Hana, etc. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. Alternative key fields may be used from any of the fields having unique value sets, and in some alternatives, even non-unique values in combinations with other fields. More precisely, they uniquely identify rows of a table on the "one" side of a one-to-many relationship.

Alternatively, the SDTD database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. If the SDTD database is implemented as a data-structure, the use of the SDTD database 1619 may be integrated into another component such as the SDTD component 1635. Also, the database may be implemented as a mix of data structures, objects, and relational structures. Databases may be consolidated and/or distributed in countless variations (e.g., see Distributed SDTD below). Portions of databases, e.g., tables, may be exported and/or imported and thus decentralized and/or integrated.

In one embodiment, the database component 1619 includes several tables 1619a-z:

An accounts table 1619a includes fields such as, but not limited to: an accountID, accountOwnerID, accountContactID, assetIDs, deviceIDs, paymentIDs, transactionIDs, userIDs, accountType (e.g., agent, entity (e.g., corporate, non-profit, partnership, etc.), individual, etc.), accountCreationDate, accountUpdateDate, accountName, accountNumber, routingNumber, linkWalletsID, accountPrioritAccaountRatio, accountAddress, accountState, accountZIPcode, accountCountry, accountEmail, accountPhone, accountAuthKey, accountIPaddress, accountURLAccessCode, accountPortNo, accountAuthorizationCode, accountAccessPrivileges, accountPreferences, accountRestrictions, and/or the like;

A users table 1619b includes fields such as, but not limited to: a userID, userSSN, taxID, userContactID, accountID, assetIDs, deviceIDs, paymentIDs, transactionIDs, userType (e.g., agent, entity (e.g., corporate, non-profit, partnership, etc.), individual, etc.), namePrefix, firstName, middleName, lastName, nameSuffix, DateOfBirth, userAge, userName, userEmail, userSocialAccountID, contactType, contactRelationship, userPhone, userAddress, userCity, userState, userZIPCode, userCountry, userAuthorizationCode, userAccessPrivileges, userPreferences, userRestrictions, and/or the like (the user table may support and/or track multiple entity accounts on a SDTD);

An devices table 1619c includes fields such as, but not limited to: deviceID, sensorIDs, accountID, assetIDs, paymentIDs, deviceType, deviceName, deviceManufacturer, deviceModel, deviceVersion, deviceSerialNo, deviceIPaddress, deviceMACaddress, device_ECID, deviceUUID, deviceLocation, deviceCertificate, deviceOS, appIDs, deviceResources, deviceSession, authKey, deviceSecureKey, walletAppInstalledFlag, deviceAccessPrivileges, devicePreferences, deviceRestrictions, hardware_config, software_config, storage_location, sensor_value, pin_reading, data_length, channel_requirement, sensor_name, sensor_model_no, sensor_manufacturer, sensor_type, sensor_serial_number, sensor_power_requirement, device_power_requirement, location, sensor_associated_tool, sensor_dimensions, device_dimensions, sensor_communications_type, device_communications_type, power_percentage, power_condition, temperature_setting, speed_adjust, hold_duration, part_actuation, and/or the like. Device table may, in some embodiments, include fields corresponding to one or more Bluetooth profiles, such as those published at https://www.bluetooth.org/en-us/specification/adopted-specifications, and/or other device specifications, and/or the like;

An apps table 1619d includes fields such as, but not limited to: appID, appName, appType, appDependencies, accountID, deviceIDs, transactionID, userID, appStoreAuthKey, appStoreAccountID, appStoreIPaddress, appStoreURLaccessCode, appStorePortNo, appAccessPrivileges, appPreferences, appRestrictions, portNum, access_API_call, linked_wallets_list, and/or the like;

An assets table 1619e includes fields such as, but not limited to: assetID, accountID, userID, distributorAccountID, distributorPaymentID, distributorOnwerID, assetOwnerID, assetType, assetSourceDeviceID, assetSourceDeviceType, assetSourceDeviceName, assetSourceDistributionChannelID, assetSourceDistributionChannelType, assetSourceDistributionChannelName, assetTargetChannelID, assetTargetChannelType, assetTargetChannelName, assetName, assetSeriesName, assetSeriesSeason, assetSeriesEpisode, assetCode, assetQuantity, assetCost, assetPrice, assetValue, assetManufactuer, assetModelNo, assetSerialNo, assetLocation, assetAddress, assetState, assetZIPcode, assetState, assetCountry, assetEmail, assetIPaddress, assetURLaccessCode, assetOwnerAccountID, subscriptionIDs, assetAuthroizationCode, assetAccessPrivileges, assetPreferences, assetRestrictions, assetAPI, assetAPIconnectionAddress, and/or the like;

A payments table 1619f includes fields such as, but not limited to: paymentID, accountID, userID, couponID, couponValue, couponConditions, couponExpiration, paymentType, paymentAccountNo, paymentAccountName, paymentAccountAuthorizationCodes, paymentExpirationDate, paymentCCV, paymentRoutingNo, paymentRoutingType, paymentAddress, paymentState, paymentZIPcode, paymentCountry, paymentEmail, paymentAuthKey, paymentIPaddress, paymentURLaccessCode, paymentPortNo, paymentAccessPrivileges, paymentPreferences, paymentRestrictions, and/or the like;

An transactions table 1619g includes fields such as, but not limited to: transactionID, accountID, assetIDs, deviceIDs, paymentIDs, transactionIDs, userID, merchantID, transactionType, transactionDate, transactionTime, transactionAmount, transactionQuantity, transactionDetails, productsList, productType, productTitle, productsSummary, productParamsList, transactionNo, transactionAccessPrivileges, transactionPreferences, transactionRestrictions, merchantAuthKey, merchantAuthCode, and/or the like;

An merchants table 1619h includes fields such as, but not limited to: merchantID, merchantTaxID, merchanteName, merchantContactUserID, accountID, issuerID, acquirerID, merchantEmail, merchantAddress, merchantState, merchantZIPcode, merchantCountry, merchantAuthKey, merchantIPaddress, portNum, merchantURLaccessCode, merchantPortNo, merchantAccessPrivileges, merchantPreferences, merchantRestrictions, and/or the like;

An ads table 1619i includes fields such as, but not limited to: adID, advertiserID, adMerchantID, adNetworkID, adName, adTags, advertiserName, adSponsor, adTime, adGeo, adAttributes, adFormat, adProduct, adText, adMedia, adMediaID, adChannelID, adTagTime, adAudioSignature, adHash, adTemplateID, adTemplateData, adSourceID, adSourceName, adSourceServerIP, adSourceURL, adSourceSecurityProtocol, adSourceFTP, adAuthKey, adAccessPrivileges, adPreferences, adRestrictions, adNetworkXchangeID, adNetworkXchangeName, adNetworkXchangeCost, adNetworkXchangeMetricType (e.g., CPA, CPC, CPM, CTR, etc.), adNetworkXchangeMetricValue, adNetworkXchangeServer, adNetworkXchangePortNumber, publisherID, publisherAddress, publisherURL, publisherTag, publisherIndustry, publisherName, publisherDescription, siteDomain, siteURL, siteContent, siteTag, siteContext, siteImpression, siteVisits, siteHeadline, sitePage, siteAdPrice, sitePlacement, sitePosition, bidID, bidExchange, bidOS, bidTarget, bidTimestamp, bidPrice, bidImpressionID, bidType, bidScore, adType (e.g., mobile, desktop, wearable, largescreen, interstitial, etc.), assetID, merchantID, deviceID, userID, accountID, impressionID, impressionOS, impressionTimeStamp, impressionGeo, impressionAction, impressionType, impressionPublisherID, impressionPublisherURL, and/or the like;

A NodeData table 1619j includes fields such as, but not limited to: nodeID, nodeBackingRepositoryData, nodeDecryptionKey, and/or the like;

A blockchain table 1619k includes fields such as, but not limited to: block(1), . . . , block(n), and/or the like. The blockchain table 1619k may be used to store blocks that form blockchains of transactions.

An exchange table 16191 includes fields such as, but not limited to: blockchainNetworkID, exchangeNodesIDs, remoteBlockchainNetworksIDs, remoteBlockchainExchangeNodeIDs, blockchainExchangeRates, and/or the like;

A market_data table 1619z includes fields such as, but not limited to: market_data_feed_ID, asset_ID, asset_symbol, asset_name, spot_price, bid_price, ask_price, and/or the like; in one embodiment, the market data table is populated through a market data feed (e.g., Bloomberg's PhatPipe, Consolidated Quote System (CQS), Consolidated Tape Association (CTA), Consolidated Tape System (CTS), Dun & Bradstreet, OTC Montage Data Feed (OMDF), Reuter's Tib, Triarch, US equity trade and quote market data, Unlisted Trading Privileges (UTP) Trade Data Feed (UTDF), UTP Quotation Data Feed (UQDF), and/or the like feeds, e.g., via ITC 2.1 and/or respective feed protocols), for example, through Microsoft's Active Template Library and Dealing Object Technology's real-time toolkit Rtt.Multi.

In one embodiment, the SDTD database may interact with other database systems. For example, employing a distributed database system, queries and data access by search SDTD component may treat the combination of the SDTD database, an integrated data security layer database as a single database entity (e.g., see Distributed SDTD below).

In one embodiment, user programs may contain various user interface primitives, which may serve to update the SDTD. Also, various accounts may require custom database tables depending upon the environments and the types of clients the SDTD may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 1619a-z. The SDTD may be configured to keep track of various settings, inputs, and parameters via database controllers.

The SDTD database may communicate to and/or with other components in a component collection, including itself, and/or facilities of the like. Most frequently, the SDTD database communicates with the SDTD component, other program components, and/or the like. The database may contain, retain, and provide information regarding other nodes and data.

The SDTDs

The SDTD component 1635 is a stored program component that is executed by a CPU. In one embodiment, the SDTD component incorporates any and/or all combinations of the aspects of the SDTD that was discussed in the previous figures. As such, the SDTD affects accessing, obtaining and the provision of information, services, transactions, and/or the like across various communications networks. The features and embodiments of the SDTD discussed herein increase network efficiency by reducing data transfer requirements the use of more efficient data structures and mechanisms for their transfer and storage. As a consequence, more data may be transferred in less time, and latencies with regard to transactions, are also reduced. In many cases, such reduction in storage, transfer time, bandwidth requirements, latencies, etc., will reduce the capacity and structural infrastructure requirements to support the SDTD's features and facilities, and in many cases reduce the costs, energy consumption/requirements, and extend the life of SDTD's underlying infrastructure; this has the added benefit of making the SDTD more reliable. Similarly, many of the features and mechanisms are designed to be easier for users to use and access, thereby broadening the audience that may enjoy/employ and exploit the feature sets of the SDTD; such ease of use also helps to increase the reliability of the SDTD. In addition, the feature sets include heightened security as noted via the Cryptographic components 1620, 1626, 1628 and throughout, making access to the features and data more reliable and secure The SDTD transforms brokerage order request, blockchain transaction request, agency action request inputs, via SDTD components (e.g., OP, AF, SF, TV, TP, AA, IEP), into brokerage order confirmation, transaction confirmation, agency action notification outputs.

The SDTD component enabling access of information between nodes may be developed by employing standard development tools and languages such as, but not limited to: Apache components, Assembly, ActiveX, binary executables, (ANSI) (Objective-) C (++), C# and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery(UI); MooTools; Prototype; script.aculo.us; Simple Object Access Protocol (SOAP); SWFObject; Yahoo! User Interface; and/or the like), WebObjects, and/or the like. In one embodiment, the SDTD server employs a cryptographic server to encrypt and decrypt communications. The SDTD component may communicate to and/or with other components in a component collection, including itself, and/or facilities of the like. Most frequently, the SDTD component communicates with the SDTD database, operating systems, other program components, and/or the like. The SDTD may contain, communicate, generate, obtain, and/or provide program component, system, user, and/or data communications, requests, and/or responses.

Distributed SDTDs

The structure and/or operation of any of the SDTD node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion. As such a combination of hardware may be distributed within a location, within a region and/or globally where logical access to a controller may be abstracted as a singular node, yet where a multitude of private, semiprivate and publically accessible node controllers (e.g., via dispersed data centers) are coordinated to serve requests (e.g., providing private cloud, semi-private cloud, and public cloud computing resources) and allowing for the serving of such requests in discrete regions (e.g., isolated, local, regional, national, global cloud access).

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the SDTD controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like. For example, cloud services such as Amazon Data Services, Microsoft Azure, Hewlett Packard Helion, IBM Cloud services allow for SDTD controller and/or SDTD component collections to be hosted in full or partially for varying degrees of scale.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using development tools such as lex, yacc, XML, and/or the like, which allow for grammar generation and parsing capabilities, which in turn may form the basis of communication messages within and between components.

For example, a grammar may be arranged to recognize the tokens of an HTTP post command, e.g.:

w3c -post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., JSON, SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment.

For example, in some implementations, the SDTD controller may be executing a PHP script implementing a Secure Sockets Layer ("SSL") socket server via the information server, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data from a client device via a SSL connection, parse the data to extract variables, and store the data to a database, is provided below:

```
<?PHP
header('Content-Type: text/plain');
// set ip address and port to listen to for incoming data
$address = '192.168.0.100';
$port = 255;
// create a server-side SSL socket, listen for/accept incoming
communication
$sock = socket_create(AF_INET, SOCK_STREAM, 0);
socket_bind($sock, $address, $port) or die('Could not bind to address');
socket_listen($sock);
$client = socket_accept($sock);
// read input data from client device in 1024 byte blocks until end of
message
do {
  $input = "";
  $input = socket_read($client, 1024);
  $data .= $input;
} while($input != "");
// parse data to extract variables
$obj = json_decode($data, true);
// store input data in a database
mysql_connect("201.408.185.132",$DBserver,$password); // access
database server
```

```
mysql_select("CLIENT_DB.SQL"); // select database to append
mysql_query("INSERT INTO UserTable (transmission)
VALUES ($data)"); // add data to UserTable table in a CLIENT database
mysql_close("CLIENT_DB.SQL"); // close connection to database
?>
```

Also, the following resources may be used to provide example embodiments regarding SOAP parser implementation:

http://www.xav.com/perl/site/lib/SOAP/Parser.html
http://publib.boulder.ibm.com/infocenter/tivihelp/v2r1/index.jsp?topic=/com.ibm.IBMDI.doc/referenceguide295.htm and other parser implementations:

http://publib.boulder.ibm.com/infocenter/tivihelp/v2r1/index.jsp?topic=/com.ibm.IBMDI.doc/referenceguide259.htm all of which are hereby expressly incorporated by reference. Additional embodiments may include:

1. An order processing apparatus, comprising:
a memory;
a component collection in the memory, including:
an order processing component,
a processor disposed in communication with the memory, and configured to issue a plurality of processing instructions from the component collection stored in the memory,
wherein the processor issues instructions from the order processing component, stored in the memory, to:
obtain, via at least one processor, an order of a user for an order processing entity;
determine, via at least one processor, a blockchain data node associated with the order, wherein the blockchain data node facilitates access to user-owned read data of the user;
determine, via at least one processor, an access control node associated with the blockchain data node;
provide, via at least one processor, a blockchain identifier of the blockchain data node and a blockchain identifier of the order processing entity to the access control node;
obtain, via at least one processor, the user-owned read data from the access control node;
execute, via at least one processor, the order using the user-owned read data;
determine, via at least one processor, a write access blockchain node associated with the order, wherein the write access blockchain node grants the order processing entity permission from the user to create one or more blockchain data nodes with the write access blockchain node as parent;
determine, via at least one processor, user-owned write data to store with regard to the executed order;
create, via at least one processor, a new blockchain data node with the write access blockchain node as parent, wherein the new blockchain data node facilitates access to the user-owned write data, wherein the new blockchain data node is cryptographically signed by the order processing entity.

2. The apparatus of embodiment 1, wherein the user-owned read data is a subset of user-owned data stored via the blockchain data node.

3. The apparatus of embodiment 1, further comprising:
the processor issues instructions from the order processing component, stored in the memory, to:
determine, via at least one processor, a read access grant node associated with the blockchain data node; and
provide, via at least one processor, a blockchain identifier of the read access grant node to the access control node.
4. The apparatus of embodiment 1, wherein the access control node is specific to the order.
5. The apparatus of embodiment 1, wherein the access control node is specific to the user.
6. The apparatus of embodiment 1, wherein the user-owned read data includes information regarding funds used to pay for the order.
7. The apparatus of embodiment 1, wherein the blockchain data node is cryptographically signed by another order processing entity that is a member in a network of trusted order processing entities.
8. The apparatus of embodiment 1, wherein the user-owned write data is associated with a category of user-owned data, and the write access blockchain node is associated with the category of user-owned data.
9. The apparatus of embodiment 1, wherein the user can revoke the order processing entity's read access to the blockchain data node.
10. The apparatus of embodiment 9, wherein the user can reinstate the order processing entity's read access to the blockchain data node.
11. The apparatus of embodiment 1, further comprising:
the processor issues instructions from the order processing component, stored in the memory, to:
provide, via at least one processor, a blockchain identifier of the new blockchain data node to a validator node.
12. The apparatus of embodiment 1, further comprising:
the processor issues instructions from the order processing component, stored in the memory, to:
provide, via at least one processor, a blockchain identifier of the new blockchain data node to a second access control node.
13. The apparatus of embodiment 12, wherein the access control node and the second access control node are the same node.
14. The apparatus of embodiment 12, further comprising:
the processor issues instructions from the order processing component, stored in the memory, to:
provide, via at least one processor, a decryption key to the second access control node, wherein the user-owned write data is encrypted and can be decrypted using the decryption key.
15. The apparatus of embodiment 1, further comprising:
the processor issues instructions from the order processing component, stored in the memory, to:
provide, via at least one processor, backing repository data to be stored in a backing repository to the second access control node, wherein the new blockchain data node facilitates access to the stored backing repository data.
16. An order processing non-transient physical medium storing processor-executable components, the components, comprising:
a component collection stored in the medium, including:
an order processing component;
wherein the order processing component, stored in the medium, includes processor-issuable instructions to:
obtain, via at least one processor, an order of a user for an order processing entity;
determine, via at least one processor, a blockchain data node associated with the order, wherein the blockchain data node facilitates access to user-owned read data of the user;
determine, via at least one processor, an access control node associated with the blockchain data node;
provide, via at least one processor, a blockchain identifier of the blockchain data node and a blockchain identifier of the order processing entity to the access control node;
obtain, via at least one processor, the user-owned read data from the access control node;
execute, via at least one processor, the order using the user-owned read data;
determine, via at least one processor, a write access blockchain node associated with the order, wherein the write access blockchain node grants the order processing entity permission from the user to create one or more blockchain data nodes with the write access blockchain node as parent;
determine, via at least one processor, user-owned write data to store with regard to the executed order;
create, via at least one processor, a new blockchain data node with the write access blockchain node as parent, wherein the new blockchain data node facilitates access to the user-owned write data, wherein the new blockchain data node is cryptographically signed by the order processing entity.
17. The medium of embodiment 16, wherein the user-owned read data is a subset of user-owned data stored via the blockchain data node.
18. The medium of embodiment 16, further comprising:
the order processing component, stored in the medium, includes processor-issuable instructions to:
determine, via at least one processor, a read access grant node associated with the blockchain data node; and
provide, via at least one processor, a blockchain identifier of the read access grant node to the access control node.
19. The medium of embodiment 16, wherein the access control node is specific to the order.
20. The medium of embodiment 16, wherein the access control node is specific to the user.
21. The medium of embodiment 16, wherein the user-owned read data includes information regarding funds used to pay for the order.
22. The medium of embodiment 16, wherein the blockchain data node is cryptographically signed by another order processing entity that is a member in a network of trusted order processing entities.
23. The medium of embodiment 16, wherein the user-owned write data is associated with a category of user-owned data, and the write access blockchain node is associated with the category of user-owned data.
24. The medium of embodiment 16, wherein the user can revoke the order processing entity's read access to the blockchain data node.
25. The medium of embodiment 24, wherein the user can reinstate the order processing entity's read access to the blockchain data node.
26. The medium of embodiment 16, further comprising:
the order processing component, stored in the medium, includes processor-issuable instructions to:
provide, via at least one processor, a blockchain identifier of the new blockchain data node to a validator node.

27. The medium of embodiment 16, further comprising:
the order processing component, stored in the medium, includes processor-issuable instructions to:
provide, via at least one processor, a blockchain identifier of the new blockchain data node to a second access control node.
28. The medium of embodiment 27, wherein the access control node and the second access control node are the same node.
29. The medium of embodiment 27, further comprising:
the order processing component, stored in the medium, includes processor-issuable instructions to:
provide, via at least one processor, a decryption key to the second access control node, wherein the user-owned write data is encrypted and can be decrypted using the decryption key.
30. The medium of embodiment 16, further comprising:
the order processing component, stored in the medium, includes processor-issuable instructions to:
provide, via at least one processor, backing repository data to be stored in a backing repository to the second access control node, wherein the new blockchain data node facilitates access to the stored backing repository data.
31. A processor-implemented order processing system, comprising:
an order processing component means, to:
obtain, via at least one processor, an order of a user for an order processing entity;
determine, via at least one processor, a blockchain data node associated with the order, wherein the blockchain data node facilitates access to user-owned read data of the user;
determine, via at least one processor, an access control node associated with the blockchain data node;
provide, via at least one processor, a blockchain identifier of the blockchain data node and a blockchain identifier of the order processing entity to the access control node;
obtain, via at least one processor, the user-owned read data from the access control node;
execute, via at least one processor, the order using the user-owned read data;
determine, via at least one processor, a write access blockchain node associated with the order, wherein the write access blockchain node grants the order processing entity permission from the user to create one or more blockchain data nodes with the write access blockchain node as parent;
determine, via at least one processor, user-owned write data to store with regard to the executed order;
create, via at least one processor, a new blockchain data node with the write access blockchain node as parent, wherein the new blockchain data node facilitates access to the user-owned write data, wherein the new blockchain data node is cryptographically signed by the order processing entity.
32. The system of embodiment 31, wherein the user-owned read data is a subset of user-owned data stored via the blockchain data node.
33. The system of embodiment 31, further comprising:
the order processing component means, to:
determine, via at least one processor, a read access grant node associated with the blockchain data node; and
provide, via at least one processor, a blockchain identifier of the read access grant node to the access control node.
34. The system of embodiment 31, wherein the access control node is specific to the order.
35. The system of embodiment 31, wherein the access control node is specific to the user.
36. The system of embodiment 31, wherein the user-owned read data includes information regarding funds used to pay for the order.
37. The system of embodiment 31, wherein the blockchain data node is cryptographically signed by another order processing entity that is a member in a network of trusted order processing entities.
38. The system of embodiment 31, wherein the user-owned write data is associated with a category of user-owned data, and the write access blockchain node is associated with the category of user-owned data.
39. The system of embodiment 31, wherein the user can revoke the order processing entity's read access to the blockchain data node.
40. The system of embodiment 39, wherein the user can reinstate the order processing entity's read access to the blockchain data node.
41. The system of embodiment 31, further comprising:
the order processing component means, to:
provide, via at least one processor, a blockchain identifier of the new blockchain data node to a validator node.
42. The system of embodiment 31, further comprising:
the order processing component means, to:
provide, via at least one processor, a blockchain identifier of the new blockchain data node to a second access control node.
43. The system of embodiment 42, wherein the access control node and the second access control node are the same node.
44. The system of embodiment 42, further comprising:
the order processing component means, to:
provide, via at least one processor, a decryption key to the second access control node, wherein the user-owned write data is encrypted and can be decrypted using the decryption key.
45. The system of embodiment 31, further comprising:
the order processing component means, to:
provide, via at least one processor, backing repository data to be stored in a backing repository to the second access control node, wherein the new blockchain data node facilitates access to the stored backing repository data.
46. A processor-implemented order processing method, comprising:
executing processor-implemented order processing component instructions to:
obtain, via at least one processor, an order of a user for an order processing entity;
determine, via at least one processor, a blockchain data node associated with the order, wherein the blockchain data node facilitates access to user-owned read data of the user;
determine, via at least one processor, an access control node associated with the blockchain data node;
provide, via at least one processor, a blockchain identifier of the blockchain data node and a blockchain identifier of the order processing entity to the access control node;
obtain, via at least one processor, the user-owned read data from the access control node;
execute, via at least one processor, the order using the user-owned read data;

determine, via at least one processor, a write access blockchain node associated with the order, wherein the write access blockchain node grants the order processing entity permission from the user to create one or more blockchain data nodes with the write access blockchain node as parent;

determine, via at least one processor, user-owned write data to store with regard to the executed order;

create, via at least one processor, a new blockchain data node with the write access blockchain node as parent, wherein the new blockchain data node facilitates access to the user-owned write data, wherein the new blockchain data node is cryptographically signed by the order processing entity.

47. The method of embodiment 46, wherein the user-owned read data is a subset of user-owned data stored via the blockchain data node.

48. The method of embodiment 46, further comprising: executing processor-implemented order processing component instructions to:

determine, via at least one processor, a read access grant node associated with the blockchain data node; and provide, via at least one processor, a blockchain identifier of the read access grant node to the access control node.

49. The method of embodiment 46, wherein the access control node is specific to the order.

50. The method of embodiment 46, wherein the access control node is specific to the user.

51. The method of embodiment 46, wherein the user-owned read data includes information regarding funds used to pay for the order.

52. The method of embodiment 46, wherein the blockchain data node is cryptographically signed by another order processing entity that is a member in a network of trusted order processing entities.

53. The method of embodiment 46, wherein the user-owned write data is associated with a category of user-owned data, and the write access blockchain node is associated with the category of user-owned data.

54. The method of embodiment 46, wherein the user can revoke the order processing entity's read access to the blockchain data node.

55. The method of embodiment 54, wherein the user can reinstate the order processing entity's read access to the blockchain data node.

56. The method of embodiment 46, further comprising: executing processor-implemented order processing component instructions to:

provide, via at least one processor, a blockchain identifier of the new blockchain data node to a validator node.

57. The method of embodiment 46, further comprising: executing processor-implemented order processing component instructions to:

provide, via at least one processor, a blockchain identifier of the new blockchain data node to a second access control node.

58. The method of embodiment 57, wherein the access control node and the second access control node are the same node.

59. The method of embodiment 57, further comprising: executing processor-implemented order processing component instructions to:

provide, via at least one processor, a decryption key to the second access control node, wherein the user-owned write data is encrypted and can be decrypted using the decryption key.

60. The method of embodiment 46, further comprising: executing processor-implemented order processing component instructions to:

provide, via at least one processor, backing repository data to be stored in a backing repository to the second access control node, wherein the new blockchain data node facilitates access to the stored backing repository data.

101. A transaction unwinding apparatus, comprising:
a memory;
a component collection in the memory, including:
an agency action component,
a processor disposed in communication with the memory, and configured to issue a plurality of processing instructions from the component collection stored in the memory,
wherein the processor issues instructions from the agency action component, stored in the memory, to:

obtain, via at least one processor, an agency action request from a user of an agency oversight configured blockchain;

determine, via at least one processor, a transaction identifier of an unwind transaction associated with the agency action request;

determine, via at least one processor, an unwind address associated with the agency action request;

analyze, via at least one processor, the agency oversight configured blockchain to determine an affected transaction for the unwind transaction, wherein the affected transaction involves unspent crypto tokens that originated from the unwind transaction; and generate, via at least one processor, an agency blockchain transaction request that facilitates transferring crypto tokens from an address associated with the affected transaction to the unwind address.

102. The apparatus of embodiment 101, wherein each transaction stored on the agency oversight configured blockchain is in a compliant format that allows an agency providing oversight over the agency oversight configured blockchain to unwind the transaction.

103. The apparatus of embodiment 102, wherein a transaction is in a compliant format when a redeem script associated with the transaction is a 1-of-n multisig script.

104. The apparatus of embodiment 103, wherein the transaction is in a compliant format when the redeem script includes a public key associated with the agency.

105. The apparatus of embodiment 101, further comprising: the processor issues instructions from the agency action component, stored in the memory, to:

determine, via at least one processor, an unwind amount associated with the agency action request;

wherein, the agency blockchain transaction request facilitates transferring the unwind amount of crypto tokens.

106. The apparatus of embodiment 101, wherein the unwind address is associated with the user.

107. The apparatus of embodiment 101, wherein crypto tokens associated with the unwind transaction are unspent, and the unwind transaction is the affected transaction.

108. The apparatus of embodiment 101, wherein a plurality of affected transactions are determined, and wherein each affected transaction in the plurality of affected transactions involves a portion of unspent crypto tokens that originated from the unwind transaction.

109. The apparatus of embodiment 108, wherein the agency blockchain transaction request includes a plurality of input fields, and wherein each input field corresponds to an affected transaction in the plurality of affected transactions.

110. The apparatus of embodiment 108, wherein a plurality of unwind addresses are determined, wherein a plurality of agency blockchain transaction requests are generated, and wherein each of the plurality of agency blockchain transaction requests corresponds to an affected transaction in the plurality of affected transactions and to an unwind addresses in the plurality of unwind addresses.

111. A processor-readable transaction unwinding non-transient physical medium storing processor-executable components, the components, comprising:
a component collection stored in the medium, including:
an agency action component;
wherein the agency action component, stored in the medium, includes processor-issuable instructions to:
obtain, via at least one processor, an agency action request from a user of an agency oversight configured blockchain;
determine, via at least one processor, a transaction identifier of an unwind transaction associated with the agency action request;
determine, via at least one processor, an unwind address associated with the agency action request;
analyze, via at least one processor, the agency oversight configured blockchain to determine an affected transaction for the unwind transaction, wherein the affected transaction involves unspent crypto tokens that originated from the unwind transaction; and
generate, via at least one processor, an agency blockchain transaction request that facilitates transferring crypto tokens from an address associated with the affected transaction to the unwind address.

112. The medium of embodiment 111, wherein each transaction stored on the agency oversight configured blockchain is in a compliant format that allows an agency providing oversight over the agency oversight configured blockchain to unwind the transaction.

113. The medium of embodiment 112, wherein a transaction is in a compliant format when a redeem script associated with the transaction is a 1-of-n multisig script.

114. The medium of embodiment 113, wherein the transaction is in a compliant format when the redeem script includes a public key associated with the agency.

115. The medium of embodiment 111, further comprising:
the agency action component, stored in the medium, includes processor-issuable instructions to:
determine, via at least one processor, an unwind amount associated with the agency action request;
wherein, the agency blockchain transaction request facilitates transferring the unwind amount of crypto tokens.

116. The medium of embodiment 111, wherein the unwind address is associated with the user.

117. The medium of embodiment 111, wherein crypto tokens associated with the unwind transaction are unspent, and the unwind transaction is the affected transaction.

118. The medium of embodiment 111, wherein a plurality of affected transactions are determined, and wherein each affected transaction in the plurality of affected transactions involves a portion of unspent crypto tokens that originated from the unwind transaction.

119. The medium of embodiment 118, wherein the agency blockchain transaction request includes a plurality of input fields, and wherein each input field corresponds to an affected transaction in the plurality of affected transactions.

120. The medium of embodiment 118, wherein a plurality of unwind addresses are determined, wherein a plurality of agency blockchain transaction requests are generated, and wherein each of the plurality of agency blockchain transaction requests corresponds to an affected transaction in the plurality of affected transactions and to an unwind addresses in the plurality of unwind addresses.

121. A processor-implemented transaction unwinding system, comprising:
an agency action component means, to:
obtain, via at least one processor, an agency action request from a user of an agency oversight configured blockchain;
determine, via at least one processor, a transaction identifier of an unwind transaction associated with the agency action request;
determine, via at least one processor, an unwind address associated with the agency action request;
analyze, via at least one processor, the agency oversight configured blockchain to determine an affected transaction for the unwind transaction, wherein the affected transaction involves unspent crypto tokens that originated from the unwind transaction; and
generate, via at least one processor, an agency blockchain transaction request that facilitates transferring crypto tokens from an address associated with the affected transaction to the unwind address.

122. The system of embodiment 121, wherein each transaction stored on the agency oversight configured blockchain is in a compliant format that allows an agency providing oversight over the agency oversight configured blockchain to unwind the transaction.

123. The system of embodiment 122, wherein a transaction is in a compliant format when a redeem script associated with the transaction is a 1-of-n multisig script.

124. The system of embodiment 123, wherein the transaction is in a compliant format when the redeem script includes a public key associated with the agency.

125. The system of embodiment 121, further comprising:
the agency action component means, to:
determine, via at least one processor, an unwind amount associated with the agency action request;
wherein, the agency blockchain transaction request facilitates transferring the unwind amount of crypto tokens.

126. The system of embodiment 121, wherein the unwind address is associated with the user.

127. The system of embodiment 121, wherein crypto tokens associated with the unwind transaction are unspent, and the unwind transaction is the affected transaction.

128. The system of embodiment 121, wherein a plurality of affected transactions are determined, and wherein each affected transaction in the plurality of affected transactions involves a portion of unspent crypto tokens that originated from the unwind transaction.

129. The system of embodiment 128, wherein the agency blockchain transaction request includes a plurality of input fields, and wherein each input field corresponds to an affected transaction in the plurality of affected transactions.

130. The system of embodiment 128, wherein a plurality of unwind addresses are determined, wherein a plurality of agency blockchain transaction requests are generated, and wherein each of the plurality of agency blockchain transaction requests corresponds to an affected transaction in the plurality of affected transactions and to an unwind addresses in the plurality of unwind addresses.

131. A processor-implemented transaction unwinding method, comprising:

executing processor-implemented agency action component instructions to:

obtain, via at least one processor, an agency action request from a user of an agency oversight configured blockchain;

determine, via at least one processor, a transaction identifier of an unwind transaction associated with the agency action request;

determine, via at least one processor, an unwind address associated with the agency action request;

analyze, via at least one processor, the agency oversight configured blockchain to determine an affected transaction for the unwind transaction, wherein the affected transaction involves unspent crypto tokens that originated from the unwind transaction; and generate, via at least one processor, an agency blockchain transaction request that facilitates transferring crypto tokens from an address associated with the affected transaction to the unwind address.

132. The method of embodiment 131, wherein each transaction stored on the agency oversight configured blockchain is in a compliant format that allows an agency providing oversight over the agency oversight configured blockchain to unwind the transaction.

133. The method of embodiment 132, wherein a transaction is in a compliant format when a redeem script associated with the transaction is a 1-of-n multisig script.

134. The method of embodiment 133, wherein the transaction is in a compliant format when the redeem script includes a public key associated with the agency.

135. The method of embodiment 131, further comprising:

executing processor-implemented agency action component instructions to:

determine, via at least one processor, an unwind amount associated with the agency action request;

wherein, the agency blockchain transaction request facilitates transferring the unwind amount of crypto tokens.

136. The method of embodiment 131, wherein the unwind address is associated with the user.

137. The method of embodiment 131, wherein crypto tokens associated with the unwind transaction are unspent, and the unwind transaction is the affected transaction.

138. The method of embodiment 131, wherein a plurality of affected transactions are determined, and wherein each affected transaction in the plurality of affected transactions involves a portion of unspent crypto tokens that originated from the unwind transaction.

139. The method of embodiment 138, wherein the agency blockchain transaction request includes a plurality of input fields, and wherein each input field corresponds to an affected transaction in the plurality of affected transactions.

140. The method of embodiment 138, wherein a plurality of unwind addresses are determined, wherein a plurality of agency blockchain transaction requests are generated, and wherein each of the plurality of agency blockchain transaction requests corresponds to an affected transaction in the plurality of affected transactions and to an unwind addresses in the plurality of unwind addresses.

201. A inter-blockchain network transaction facilitating apparatus, comprising:

a memory;

a component collection in the memory, including:

a transaction processing component;

a processor disposed in communication with the memory, and configured to issue a plurality of processing instructions from the component collection stored in the memory, wherein the processor issues instructions from the transaction processing component, stored in the memory, to:

obtain, via an exchange node of a source blockchain network, an inter-blockchain network transaction to transfer crypto tokens from a first user of the source blockchain network to a second user of a target blockchain network;

validate, via at least one processor, input data associated with the inter-blockchain network transaction to confirm that the first user is authorized to transfer the crypto tokens;

add, via at least one processor, a securing transaction to the source blockchain network's blockchain, wherein the securing transaction ensures that the crypto tokens may not be reused on the source blockchain network;

determine, via at least one processor, an exchange node of the target blockchain network configured to facilitate inter-blockchain network transactions with the exchange node of the source blockchain network; and generate, via the exchange node of the source blockchain network, an inter-blockchain exchange request for the determined exchange node of the target blockchain network, wherein the inter-blockchain exchange request facilitates processing of the inter-blockchain network transaction on the target blockchain network.

202. The apparatus of embodiment 201, wherein the source blockchain network is configured to serve a first region, and the target blockchain network is configured to serve a second region.

203. The apparatus of embodiment 202, wherein a region is one of: a geographic region, a unit of an organization, a sidechain.

204. The apparatus of embodiment 201, wherein the exchange node of the source blockchain network is specified as the exchange point between the source blockchain network and the target blockchain network in the inter-blockchain network transaction by the first user.

205. The apparatus of embodiment 201, wherein the securing transaction transfers the crypto tokens to an address on the source blockchain network from which the crypto tokens cannot be transferred.

206. The apparatus of embodiment 201, wherein the exchange node of the target blockchain network is specified by a configuration setting of the exchange node of the source blockchain network.

207. The apparatus of embodiment 201, wherein the exchange node of the target blockchain network is determined dynamically based on the best crypto token exchange rate between crypto tokens of the source blockchain network and crypto tokens of the target blockchain network from crypto token exchange rates offered by exchange nodes of the target blockchain network.

208. The apparatus of embodiment 201, wherein there is an inter-blockchain network exchange rate, other than one to one, between crypto tokens of the source blockchain network and crypto tokens of the target blockchain network, and wherein the exchange node of the source blockchain network is configured to determine the inter-blockchain network exchange rate.
209. The apparatus of embodiment 208, wherein the inter-blockchain network exchange rate is determined by querying a third party market maker.
210. The apparatus of embodiment 208, wherein the inter-blockchain exchange request includes a converted crypto tokens amount to be provided to the second user of the target blockchain network, and wherein the converted crypto tokens amount is calculated based on the determined inter-blockchain network exchange rate.
211. The apparatus of embodiment 201, wherein the inter-blockchain exchange request includes proof that the source crypto tokens cannot be reused on the source blockchain network.
212. The apparatus of embodiment 211, wherein the proof includes a transaction identifier of the securing transaction.
213. The apparatus of embodiment 201, further, comprising:
an inter-blockchain exchange processing component;
wherein the processor issues instructions from the inter-blockchain exchange processing component, stored in the memory, to:
obtain, via the exchange node of the target blockchain network, the inter-blockchain exchange request;
validate, via at least one processor, that the crypto tokens may not be reused on the source blockchain network; and
add, via at least one processor, the inter-blockchain network transaction to the target blockchain network's blockchain.
214. The apparatus of embodiment 213, wherein the inter-blockchain network transaction is added to the target blockchain network's blockchain in an unmodified form.
215. The apparatus of embodiment 213, wherein the inter-blockchain network transaction is added to the target blockchain network's blockchain in a modified form that includes a cryptographic signature of the exchange node of the target blockchain network.
216. A processor-readable inter-blockchain network transaction facilitating non-transient physical medium storing processor-executable components, the components, comprising:
a component collection stored in the medium, including:
a transaction processing component;
wherein the transaction processing component, stored in the medium, includes processor-issuable instructions to:
obtain, via an exchange node of a source blockchain network, an inter-blockchain network transaction to transfer crypto tokens from a first user of the source blockchain network to a second user of a target blockchain network;
validate, via at least one processor, input data associated with the inter-blockchain network transaction to confirm that the first user is authorized to transfer the crypto tokens;
add, via at least one processor, a securing transaction to the source blockchain network's blockchain, wherein the securing transaction ensures that the crypto tokens may not be reused on the source blockchain network;
determine, via at least one processor, an exchange node of the target blockchain network configured to facilitate inter-blockchain network transactions with the exchange node of the source blockchain network; and
generate, via the exchange node of the source blockchain network, an inter-blockchain exchange request for the determined exchange node of the target blockchain network, wherein the inter-blockchain exchange request facilitates processing of the inter-blockchain network transaction on the target blockchain network.
217. The medium of embodiment 216, wherein the source blockchain network is configured to serve a first region, and the target blockchain network is configured to serve a second region.
218. The medium of embodiment 217, wherein a region is one of: a geographic region, a unit of an organization, a sidechain.
219. The medium of embodiment 216, wherein the exchange node of the source blockchain network is specified as the exchange point between the source blockchain network and the target blockchain network in the inter-blockchain network transaction by the first user.
220. The medium of embodiment 216, wherein the securing transaction transfers the crypto tokens to an address on the source blockchain network from which the crypto tokens cannot be transferred.
221. The medium of embodiment 216, wherein the exchange node of the target blockchain network is specified by a configuration setting of the exchange node of the source blockchain network.
222. The medium of embodiment 216, wherein the exchange node of the target blockchain network is determined dynamically based on the best crypto token exchange rate between crypto tokens of the source blockchain network and crypto tokens of the target blockchain network from crypto token exchange rates offered by exchange nodes of the target blockchain network.
223. The medium of embodiment 216, wherein there is an inter-blockchain network exchange rate, other than one to one, between crypto tokens of the source blockchain network and crypto tokens of the target blockchain network, and wherein the exchange node of the source blockchain network is configured to determine the inter-blockchain network exchange rate.
224. The medium of embodiment 223, wherein the inter-blockchain network exchange rate is determined by querying a third party market maker.
225. The medium of embodiment 223, wherein the inter-blockchain exchange request includes a converted crypto tokens amount to be provided to the second user of the target blockchain network, and wherein the converted crypto tokens amount is calculated based on the determined inter-blockchain network exchange rate.
226. The medium of embodiment 216, wherein the inter-blockchain exchange request includes proof that the source crypto tokens cannot be reused on the source blockchain network.
227. The medium of embodiment 226, wherein the proof includes a transaction identifier of the securing transaction.
228. The medium of embodiment 216, further, comprising:
an inter-blockchain exchange processing component in the component collection;
wherein the inter-blockchain exchange processing component, stored in the medium, includes processor-issuable instructions to:

obtain, via the exchange node of the target blockchain network, the inter-blockchain exchange request;

validate, via at least one processor, that the crypto tokens may not be reused on the source blockchain network; and add, via at least one processor, the inter-blockchain network transaction to the target blockchain network's blockchain.

229. The medium of embodiment 228, wherein the inter-blockchain network transaction is added to the target blockchain network's blockchain in an unmodified form.

230. The medium of embodiment 228, wherein the inter-blockchain network transaction is added to the target blockchain network's blockchain in a modified form that includes a cryptographic signature of the exchange node of the target blockchain network.

231. A processor-implemented inter-blockchain network transaction facilitating system, comprising:

a transaction processing component means, to:

obtain, via an exchange node of a source blockchain network, an inter-blockchain network transaction to transfer crypto tokens from a first user of the source blockchain network to a second user of a target blockchain network;

validate, via at least one processor, input data associated with the inter-blockchain network transaction to confirm that the first user is authorized to transfer the crypto tokens;

add, via at least one processor, a securing transaction to the source blockchain network's blockchain, wherein the securing transaction ensures that the crypto tokens may not be reused on the source blockchain network;

determine, via at least one processor, an exchange node of the target blockchain network configured to facilitate inter-blockchain network transactions with the exchange node of the source blockchain network; and generate, via the exchange node of the source blockchain network, an inter-blockchain exchange request for the determined exchange node of the target blockchain network, wherein the inter-blockchain exchange request facilitates processing of the inter-blockchain network transaction on the target blockchain network.

232. The system of embodiment 231, wherein the source blockchain network is configured to serve a first region, and the target blockchain network is configured to serve a second region.

233. The system of embodiment 232, wherein a region is one of: a geographic region, a unit of an organization, a sidechain.

234. The system of embodiment 231, wherein the exchange node of the source blockchain network is specified as the exchange point between the source blockchain network and the target blockchain network in the inter-blockchain network transaction by the first user.

235. The system of embodiment 231, wherein the securing transaction transfers the crypto tokens to an address on the source blockchain network from which the crypto tokens cannot be transferred.

236. The system of embodiment 231, wherein the exchange node of the target blockchain network is specified by a configuration setting of the exchange node of the source blockchain network.

237. The system of embodiment 231, wherein the exchange node of the target blockchain network is determined dynamically based on the best crypto token exchange rate between crypto tokens of the source blockchain network and crypto tokens of the target blockchain network from crypto token exchange rates offered by exchange nodes of the target blockchain network.

238. The system of embodiment 231, wherein there is an inter-blockchain network exchange rate, other than one to one, between crypto tokens of the source blockchain network and crypto tokens of the target blockchain network, and wherein the exchange node of the source blockchain network is configured to determine the inter-blockchain network exchange rate.

239. The system of embodiment 238, wherein the inter-blockchain network exchange rate is determined by querying a third party market maker.

240. The system of embodiment 238, wherein the inter-blockchain exchange request includes a converted crypto tokens amount to be provided to the second user of the target blockchain network, and wherein the converted crypto tokens amount is calculated based on the determined inter-blockchain network exchange rate.

241. The system of embodiment 231, wherein the inter-blockchain exchange request includes proof that the source crypto tokens cannot be reused on the source blockchain network.

242. The system of embodiment 241, wherein the proof includes a transaction identifier of the securing transaction.

243. The system of embodiment 231, further, comprising:

an inter-blockchain exchange processing component means, to:

obtain, via the exchange node of the target blockchain network, the inter-blockchain exchange request;

validate, via at least one processor, that the crypto tokens may not be reused on the source blockchain network; and add, via at least one processor, the inter-blockchain network transaction to the target blockchain network's blockchain.

244. The system of embodiment 243, wherein the inter-blockchain network transaction is added to the target blockchain network's blockchain in an unmodified form.

245. The system of embodiment 243, wherein the inter-blockchain network transaction is added to the target blockchain network's blockchain in a modified form that includes a cryptographic signature of the exchange node of the target blockchain network.

246. A processor-implemented inter-blockchain network transaction facilitating method, comprising:

executing processor-implemented transaction processing component instructions to:

obtain, via an exchange node of a source blockchain network, an inter-blockchain network transaction to transfer crypto tokens from a first user of the source blockchain network to a second user of a target blockchain network;

validate, via at least one processor, input data associated with the inter-blockchain network transaction to confirm that the first user is authorized to transfer the crypto tokens;

add, via at least one processor, a securing transaction to the source blockchain network's blockchain, wherein the securing transaction ensures that the crypto tokens may not be reused on the source blockchain network;

determine, via at least one processor, an exchange node of the target blockchain network configured to facilitate inter-blockchain network transactions with the exchange node of the source blockchain network; and generate, via the exchange node of the source blockchain network, an inter-blockchain exchange request for the determined exchange node of the target blockchain network, wherein the inter-blockchain exchange request facilitates processing of the inter-blockchain network transaction on the target blockchain network.

247. The method of embodiment 246, wherein the source blockchain network is configured to serve a first region, and the target blockchain network is configured to serve a second region.

248. The method of embodiment 247, wherein a region is one of: a geographic region, a unit of an organization, a sidechain.

249. The method of embodiment 246, wherein the exchange node of the source blockchain network is specified as the exchange point between the source blockchain network and the target blockchain network in the inter-blockchain network transaction by the first user.

250. The method of embodiment 246, wherein the securing transaction transfers the crypto tokens to an address on the source blockchain network from which the crypto tokens cannot be transferred.

251. The method of embodiment 246, wherein the exchange node of the target blockchain network is specified by a configuration setting of the exchange node of the source blockchain network.

252. The method of embodiment 246, wherein the exchange node of the target blockchain network is determined dynamically based on the best crypto token exchange rate between crypto tokens of the source blockchain network and crypto tokens of the target blockchain network from crypto token exchange rates offered by exchange nodes of the target blockchain network.

253. The method of embodiment 246, wherein there is an inter-blockchain network exchange rate, other than one to one, between crypto tokens of the source blockchain network and crypto tokens of the target blockchain network, and wherein the exchange node of the source blockchain network is configured to determine the inter-blockchain network exchange rate.

254. The method of embodiment 253, wherein the inter-blockchain network exchange rate is determined by querying a third party market maker.

255. The method of embodiment 253, wherein the inter-blockchain exchange request includes a converted crypto tokens amount to be provided to the second user of the target blockchain network, and wherein the converted crypto tokens amount is calculated based on the determined inter-blockchain network exchange rate.

256. The method of embodiment 246, wherein the inter-blockchain exchange request includes proof that the source crypto tokens cannot be reused on the source blockchain network.

257. The method of embodiment 256, wherein the proof includes a transaction identifier of the securing transaction.

258. The method of embodiment 246, further, comprising: executing processor-implemented inter-blockchain exchange processing component instructions to:
obtain, via the exchange node of the target blockchain network, the inter-blockchain exchange request;
validate, via at least one processor, that the crypto tokens may not be reused on the source blockchain network; and
add, via at least one processor, the inter-blockchain network transaction to the target blockchain network's blockchain.

259. The method of embodiment 258, wherein the inter-blockchain network transaction is added to the target blockchain network's blockchain in an unmodified form.

260. The method of embodiment 258, wherein the inter-blockchain network transaction is added to the target blockchain network's blockchain in a modified form that includes a cryptographic signature of the exchange node of the target blockchain network.

In order to address various issues and advance the art, the entirety of this application for Social Data Tracking Datastructures, Apparatuses, Methods and Systems (including the Cover Page, Title, Headings, Field, Background, Summary, Brief Description of the Drawings, Detailed Description, Claims, Abstract, Figures, Appendices, and otherwise) shows, by way of illustration, various embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Further and to the extent any financial and/or investment examples are included, such examples are for illustrative purpose(s) only, and are not, nor should they be interpreted, as investment advice. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components, data flow order, logic flow order, and/or any present feature sets as described in the figures and/or throughout are not limited to a fixed operating order and/or arrangement, but rather, any disclosed order is exemplary and all equivalents, regardless of order, are contemplated by the disclosure. Similarly, descriptions of embodiments disclosed throughout this disclosure, any reference to direction or orientation is merely intended for convenience of description and is not intended in any way to limit the scope of described embodiments. Relative terms such as "lower," "upper," "horizontal," "vertical," "above," "below," "up," "down," "top" and "bottom" as well as derivative thereof (e.g., "horizontally," "downwardly," "upwardly," etc.) should not be construed to limit embodiments, and instead, again, are offered for convenience of description of orientation. These relative descriptors are for convenience of description only and do not require that any embodiments be constructed or operated in a particular orientation unless explicitly indicated as such. Terms such as "attached," "affixed," "connected," "coupled," "interconnected," and similar may refer to a relationship wherein structures are secured or attached to one another either directly or indirectly through intervening structures, as well as both movable or rigid attachments or relationships, unless expressly described otherwise. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations including the right to claim such innovations, file additional applications, continuations, continuations in part, divisions, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of a SDTD individual and/or enterprise user, database configuration and/or relational model, data type, data transmission and/or network framework, syntax structure, and/or the like, various embodiments of the SDTD, may be implemented that enable a great deal of flexibility and customization. For example, aspects of the SDTD may be adapted for non-financial transactions (e.g., medical data). While various embodiments and discussions of the SDTD have included information technology, however, it is to be understood that the embodiments described herein may be readily configured and/or customized for a wide variety of other applications and/or implementations.

What is claimed is:

1. An order processing apparatus, comprising:
   at least one memory;
   a component collection stored in the at least one memory;
   at least one processor disposed in communication with the at least one memory, the at least one processor executing processor-executable instructions from the component collection, the component collection storage structured with processor-executable instructions comprising:
      obtain, via at least one processor of the at least one processor, a transaction of a first user for an order processing entity;
      determine, via at least one processor of the at least one processor, a blockchain data node associated with the transaction, in which the blockchain data node is structured facilitating access to user-owned read data of the first user;
      determine, via at least one processor of the at least one processor, an access control node associated with the blockchain data node;
      provide, via at least one processor of the at least one processor, a blockchain identifier of the blockchain data node and a blockchain identifier of the order processing entity to the access control node;
      obtain, via at least one processor of the at least one processor, the user-owned read data from the access control node;
      execute, via at least one processor of the at least one processor, the transaction using the user-owned read data;
      determine, via at least one processor of the at least one processor, a write access blockchain node associated with the transaction, in which the determination of the write access blockchain node associated with the transaction includes:
         creation of a private public key pair ($pK_n$, $PK_n$) for the first user;
         creation of a root node transaction by the first user announcing the public key ($PK_n$);
         creation of a signature using the private key ($pK_n$) associated with the public key ($PK_n$) in which the signature is created using:
            a hash of a transaction type (tx_type), and
            a message field included in the transaction (ROOT);
         creation of a first transaction id (Txid) comprising any of: a hash of the signature having a node id (n), and a hash of the transaction including the signature;
         creation of a private public key pair ($pK_f$, $PK_f$) for a second user;
         creation of a root node transaction by the second user announcing the public key ($PK_f$);
         creation of a signature using the private key ($pK_f$) associated with the public key ($PK_f$) in which the signature is created using:
            a hash of a transaction type (tx_type), and
            a message field included in the transaction (ROOT); and
         creation of a second transaction id (Txid) comprising any of: a hash of the signature having a node id (f), and a hash of the transaction including the signature;
      determine, via at least one processor of the at least one processor, user-owned write data to store with regard to the executed order; and
      create, via at least one processor of the at least one processor, a new blockchain data node with the write access blockchain node as parent, in which the new blockchain data node is structured facilitating access to the user-owned write data, in which the new blockchain data node is cryptographically signed by the order processing entity.

2. The apparatus of claim 1, in which the user-owned read data is a subset of user-owned data stored via the blockchain data node.

3. The apparatus of claim 1, further comprising:
   determine, via at least one processor, a read access grant node associated with the blockchain data node; and
   provide, via at least one processor, a blockchain identifier of the read access grant node to the access control node.

4. The apparatus of claim 1, in which the access control node is specific to the order.

5. The apparatus of claim 1, in which the access control node is specific to the user.

6. The apparatus of claim 1, in which the user-owned read data includes information regarding funds used to pay for the order.

7. The apparatus of claim 1, in which the blockchain data node is cryptographically signed by another order processing entity that is a member in a network of trusted order processing entities.

8. The apparatus of claim 1, in which the user-owned write data is associated with a category of user-owned data, and the write access blockchain node is associated with the category of user-owned data.

9. The apparatus of claim 1, is structured allowing the user to revoke an order processing entity's read access to the blockchain data node.

10. The apparatus of claim 9, is structured allowing the user to reinstate the order processing entity's read access to the blockchain data node.

11. The apparatus of claim 1, further comprising:
provide, via at least one processor, a blockchain identifier of the new blockchain data node to a validator node.

12. The apparatus of claim 1, further comprising:
provide, via at least one processor, a blockchain identifier of the new blockchain data node to a second access control node.

13. The apparatus of claim 12, in which the access control node and the second access control node are the same node.

14. The apparatus of claim 12, further comprising:
the processor issues instructions from the order processing component, stored in the memory, to:
provide, via at least one processor, a decryption key to the second access control node, in which the user-owned write data is encrypted and can be decrypted using the decryption key.

15. The apparatus of claim 1, further comprising:
provide, via at least one processor, backing repository data to be stored in a backing repository to the second access control node, in which the new blockchain data node facilitates access to the stored backing repository data.

16. The apparatus of claim 1, in which the determination of the write access blockchain node associated with the transaction further includes the first user granting the second user writing of nodes on behalf of the first user including:
creation of a signature by the private key $pK_n$, and hashing the transaction type (tx_type) and a root node identifying the grantor and permissioned node id (f), in which a transaction id of a resulting node is a hash of the signature having a node id of ($n'_0$), including:
having a write access node transaction creation structure:
Transaction type: Write Access;
Parent node: n;
Permissioned node: f;
Signature: SIG=>$pK_n$(HASH(tx_type, n, f)); and
Txid: HASH(signature)→Node Id: $n'_0$.

17. An order processing non-transient medium, the medium storing a component collection, the component collection storing processor-executable instructions, that when executed by at least one processor, causes the at least one processor to:
obtain an order of a user for an order processing entity;
determine a blockchain data node associated with a transaction, in which the blockchain data node facilitates access to user-owned read data of the first user;
determine an access control node associated with the blockchain data node;
provide a blockchain identifier of the blockchain data node and a blockchain identifier of the order processing entity to the access control node;
obtain the user-owned read data from the access control node;
execute the transaction using the user-owned read data;
determine a write access blockchain node associated with the transaction, in which the determination of the write access blockchain node associated with the transaction includes:
creation of a private public key pair ($pK_n$, $PK_n$) for the first user;
creation of a root node transaction by the first user announcing the public key ($PK_n$);
creation of a signature using the private key ($pK_n$) associated with the public key ($PK_n$) in which the signature is created using:
a hash of a transaction type (tx_type), and
a message field included in the transaction (ROOT);
creation of a first transaction id (Txid) comprising any of: a hash of the signature having a node id (n), and a hash of the transaction including the signature;
creation of a private public key pair ($pK_f$, $PK_f$) for a second user;
creation of a root node transaction by the second user announcing the public key ($PK_f$);
creation of a signature using the private key ($pK_f$) associated with the public key ($PK_f$) in which the signature is created using:
a hash of a transaction type (tx_type), and
a message field included in the transaction (ROOT); and
creation of a second transaction id (Txid) comprising any of: a hash of the signature having a node id (f), and a hash of the transaction including the signature;
determine user-owned write data to store with regard to the executed order; and
create a new blockchain data node with the write access blockchain node as parent, in which the new blockchain data node is structured facilitating access to the user-owned write data, in which the new blockchain data node is cryptographically signed by the order processing entity.

18. A processor-implemented order processing system, comprising:
means to store a component collection;
at least one processor, that when executing instructions from the component collection, causes the at least one processor to:
obtain, via at least one processor of the at least one processor, a transaction of a first user for an order processing entity;
determine, via at least one processor of the at least one processor, a blockchain data node associated with the transaction, in which the blockchain data node facilitates access to user owned read data of the first user;
determine, via at least one processor of the at least one processor, an access control node associated with the blockchain data node;
provide, via at least one processor, a blockchain identifier of the blockchain data node and a blockchain identifier of the order processing entity to the access control node;
obtain, via at least one processor of the at least one processor, the user-owned read data from the access control node;
execute, via at least one processor of the at least one processor, the transaction using the user-owned read data;

determine, via at least one processor of the at least one processor, a write access blockchain node associated with the transaction, in which the determination of the write access blockchain node associated with the transaction includes:
  creation of a private public key pair ($pK_n$, $PK_n$) for the first user;
  creation of a root node transaction by the first user announcing the public key ($PK_n$);
  creation of a signature using the private key ($pK_n$) associated with the public key ($PK_n$) in which the signature is created using:
    a hash of a transaction type (tx_type), and
    a message field included in the transaction (ROOT);
  creation of a first transaction id (Txid) comprising any of: a hash of the signature having a node id (n), and a hash of the transaction including the signature;
  creation of a private public key pair ($pK_f$, $PK_f$) for a second user;
  creation of a root node transaction by the second user announcing the public key ($PK_f$);
  creation of a signature using the private key ($pK_f$) associated with the public key ($PK_f$) in which the signature is created using:
    a hash of a transaction type (tx_type), and
    a message field included in the transaction (ROOT); and
  creation of a second transaction id (Txid) comprising any of: a hash of the signature having a node id (f), and a hash of the transaction including the signature;
determine, via at least one processor of the at least one processor, user-owned write data to store with regard to the executed order; and
create, via at least one processor of the at least one processor, a new blockchain data node with the write access blockchain node as parent, in which the new blockchain data node is structured facilitating facilitates access to the user-owned write data, in which the new blockchain data node is cryptographically signed by the order processing entity.

19. A processor-implemented order processing process comprising:
  obtaining, via at least one processor, a transaction of a first user for an order processing entity;
  determining, via at least one processor of the at least one processor, a blockchain data node associated with the transaction, in which the blockchain data node facilitates access to user owned read data of the first user;
  determining, via at least one processor of the at least one processor, an access control node associated with the blockchain data node;
  providing, via at least one processor of the at least one processor, a blockchain identifier of the blockchain data node and a blockchain identifier of the order processing entity to the access control node;
  obtaining, via at least one processor of the at least one processor, the user-owned read data from the access control node;
  executing, via at least one processor of the at least one processor, the transaction using the user-owned read data;
  determining, via at least one processor of the at least one processor, a write access blockchain node associated with the transaction, in which the determining of the write access blockchain node associated with the transaction includes:
    creating a private public key pair ($pK_n$, $PK_n$) for the first user;
    creating a root node transaction by the first user announcing the public key ($PK_n$);
    creating a signature using the private key ($pK_n$) associated with the public key ($PK_n$) in which the signature is created using:
      a hash of a transaction type (tx_type), and
      a message field included in the transaction (ROOT);
    creating a first transaction id (Txid) comprising any of: a hash of the signature having a node id (n), and a hash of the transaction including the signature;
    creating a private public key pair ($pK^f$, $PK^f$) for a second user;
    creating a root node transaction by the second user announcing the public key ($PK_f$);
    creating a signature using the private key ($pK_f$) associated with the public key ($PK_f$) in which the signature is created using:
      a hash of a transaction type (tx_type), and
      a message field included in the transaction (ROOT); and
    creating a second transaction id (Txid) comprising any of: a hash of the signature having a node id (f), and a hash of the transaction including the signature;
  determining, via at least one processor of the at least one processor, user-owned write data to store with regard to the executed order; and
  creating, via at least one processor of the at least one processor, a new blockchain data node with the write access blockchain node as parent, in which the new blockchain data node is structured facilitating facilitates access to the user-owned write data, in which the new blockchain data node is cryptographically signed by the order processing entity.

* * * * *